United States Patent [19]

Kotake et al.

[11] Patent Number: 5,203,073
[45] Date of Patent: Apr. 20, 1993

[54] APPARATUS FOR ASSEMBLING EXTERIOR PARTS OF A MOTORCAR

[75] Inventors: Katuo Kotake; Michihiro Kitahama; Keizaburo Otaki; Akira Miyazaki; Masayuki Abe; Shoji Okahara; Manabu Tuchida; Yukihiro Yaguchi; Hiroyuki Furuya; Takeshi Nakamura, all of Sayama, Japan

[73] Assignee: Honda Engineering Kabushiki Kaisha, Sayama, Japan

[21] Appl. No.: 900,710

[22] Filed: Jun. 15, 1992

Related U.S. Application Data

[62] Division of Ser. No. 628,880, Dec. 18, 1990, Pat. No. 5,150,506.

[30] Foreign Application Priority Data

| Dec. 20, 1989 | [JP] | Japan | 1-328397 |
| Feb. 22, 1990 | [JP] | Japan | 2-39753 |
| Mar. 5, 1990 | [JP] | Japan | 2-51796 |
| Mar. 15, 1990 | [JP] | Japan | 2-64771 |
| Mar. 17, 1990 | [JP] | Japan | 2-67764 |
| Mar. 26, 1990 | [JP] | Japan | 2-75932 |

[51] Int. Cl.$^5$ .............................................. B23P 21/00
[52] U.S. Cl. ................................... 29/784; 29/771; 29/791; 29/822
[58] Field of Search ............... 27/429, 430, 771, 784, 27/791, 822; 228/DIG. 1; 29/787, 795, 786, 793

[56] References Cited

U.S. PATENT DOCUMENTS 4,538,044  8/1985  Kadowaki et al. ........... 228/DIG. 1
5,123,161  6/1992  Kubo et al. ........................ 29/822

Primary Examiner—P. W. Echols
Assistant Examiner—David P. Bryant
Attorney, Agent, or Firm—Nikaido, Marmelstein, Murray & Oram

[57] ABSTRACT

A method and apparatus for assembling exterior parts of a motorcar wherein assembling accuracy errors of a motor car body are determined by measuring positions of a plurality of reference points of said motorcar body. Correction data is calculated relating to respective assembling positions of plural kinds of the exterior parts which form an external shape of the motorcar, the calculation being performed on the basis of measured data obtained in the previous step, while maintaining a correlative relationship among said parts, to eliminate correlative misalignment among said parts due to the assembling accuracy errors of said motorcar body. Each of said parts is then assembled by respective assembling robots to respective assembling position which has been corrected in accordance with the calculated correction data.

5 Claims, 39 Drawing Sheets

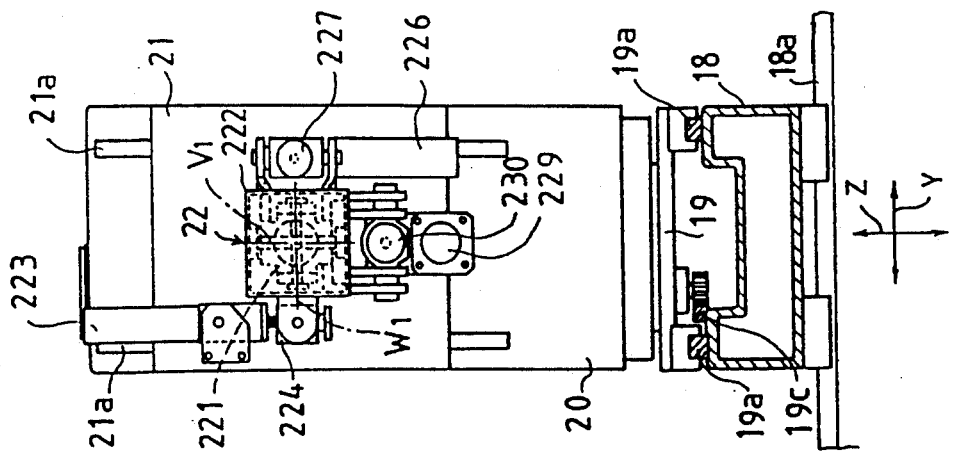
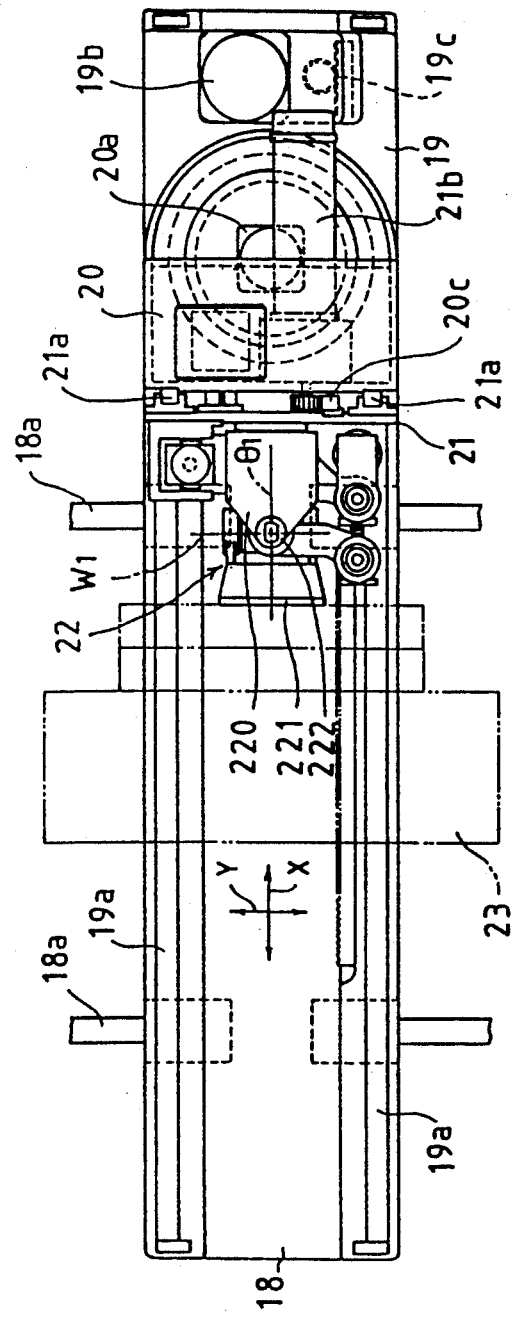

FIG.11
FIG.12
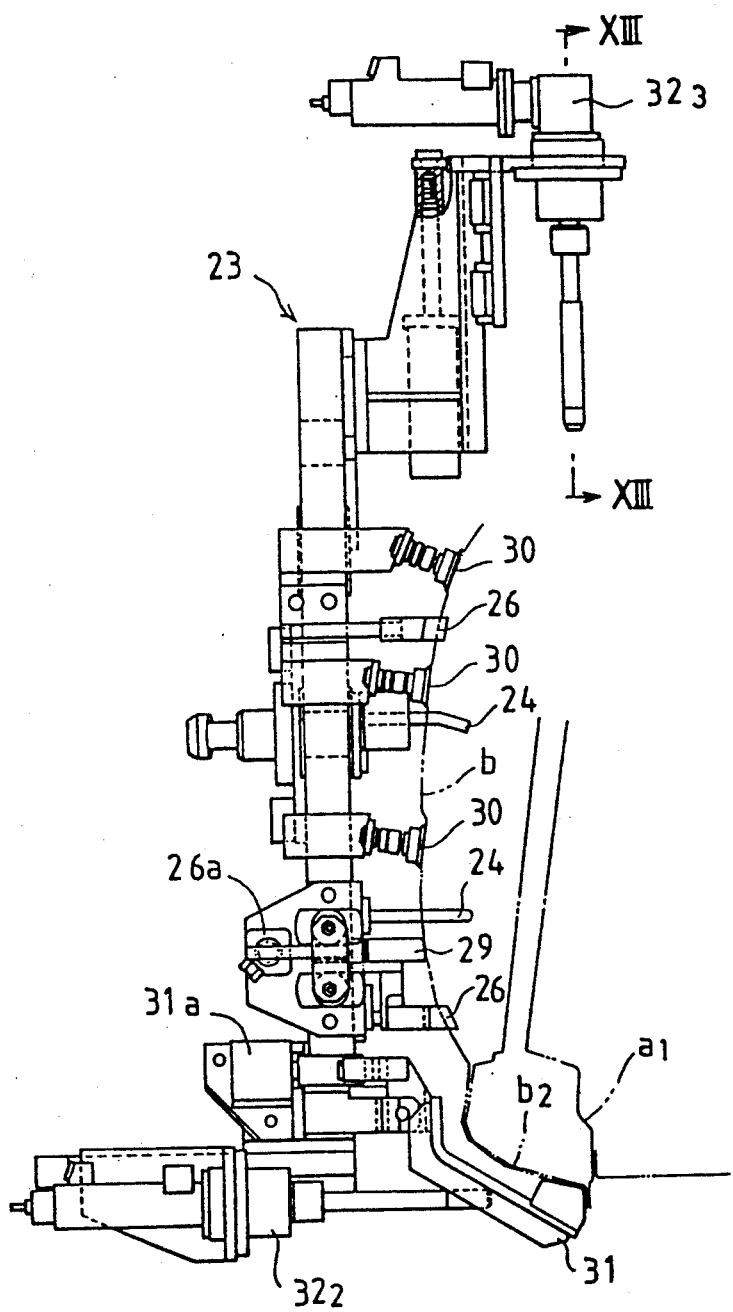
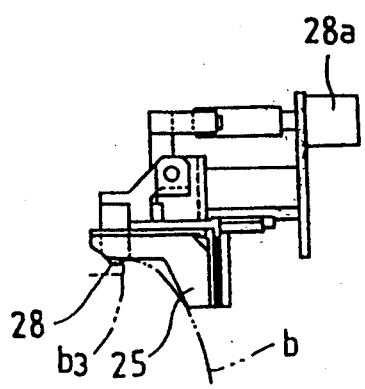

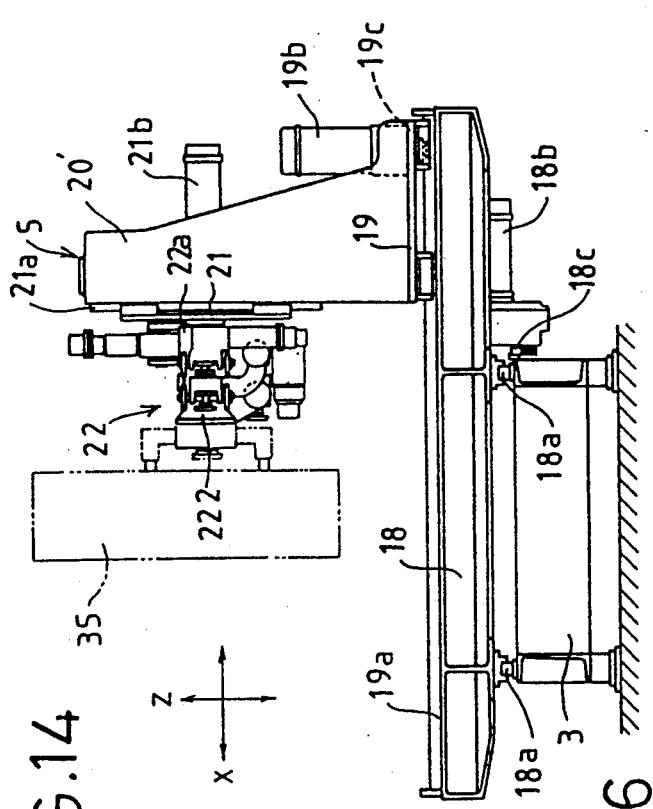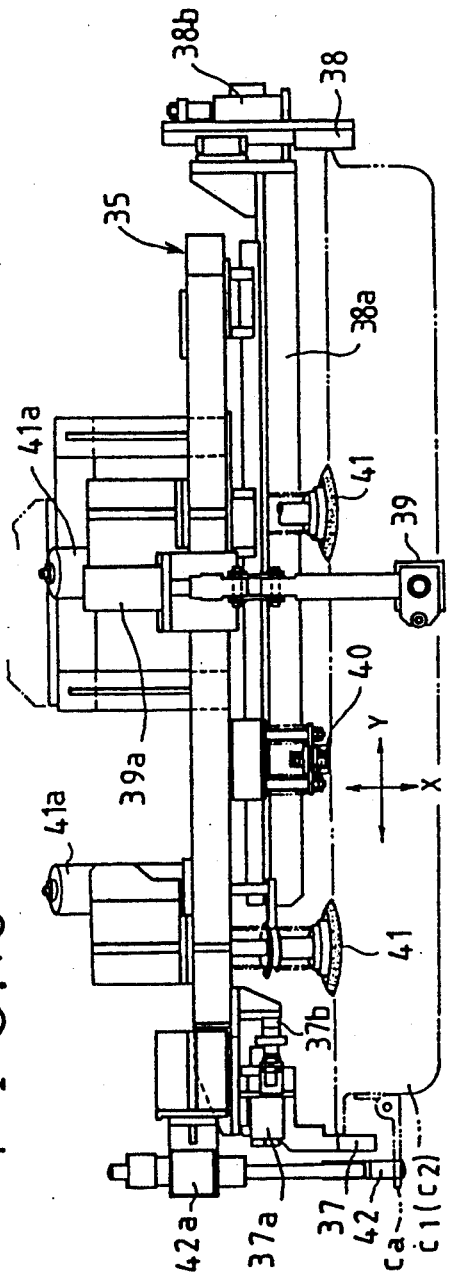

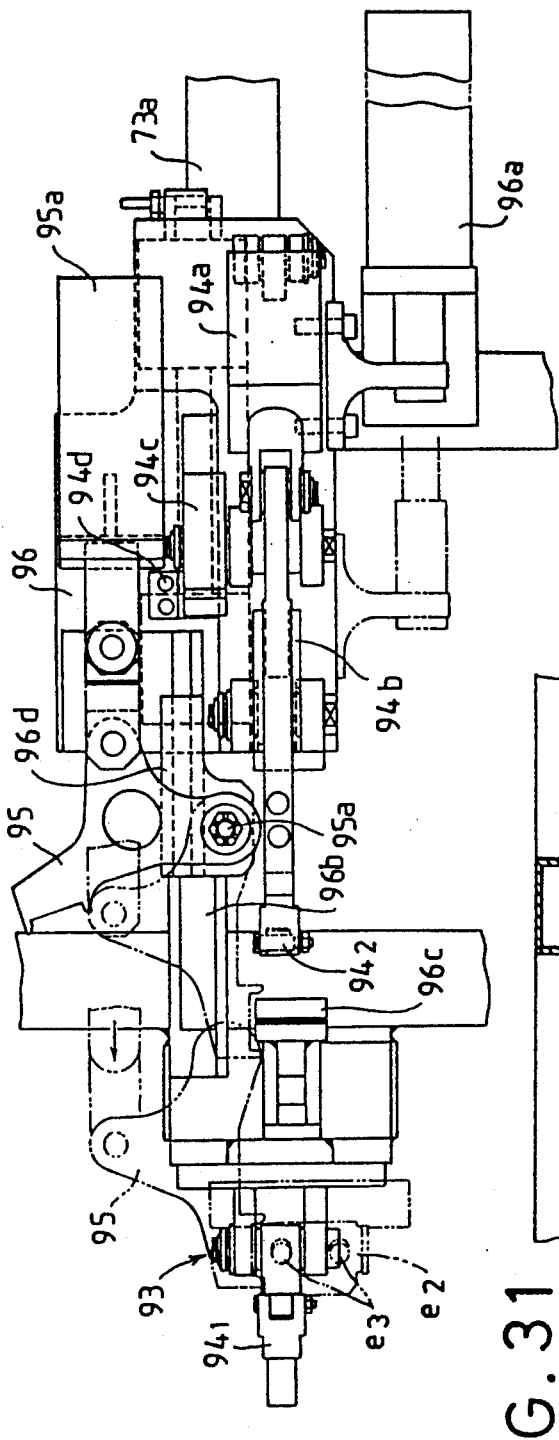

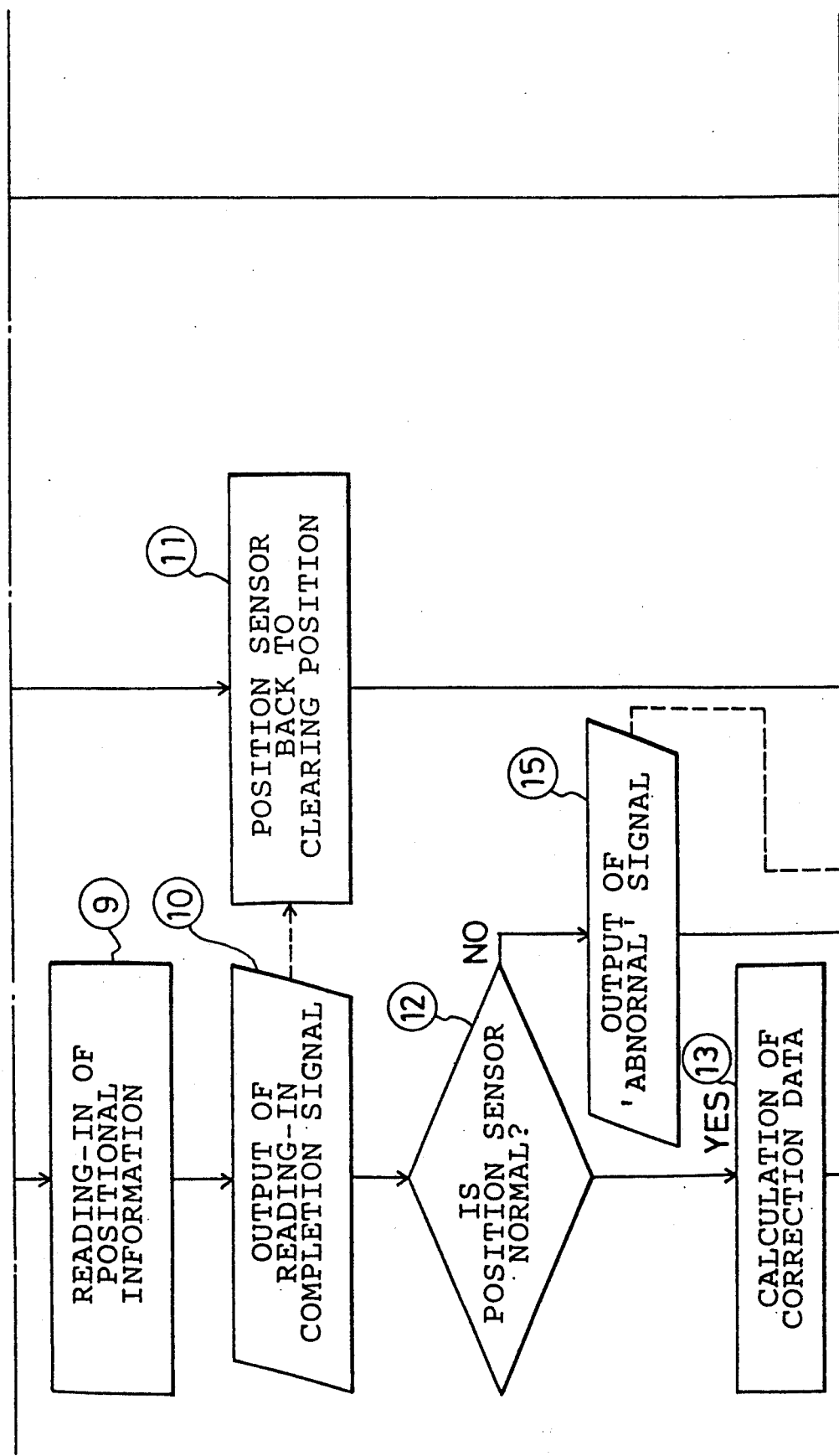

APPARATUS FOR ASSEMBLING EXTERIOR PARTS OF A MOTORCAR

This is a division of application Ser. No. 07/628,880 filed Dec. 18, 1990, now U.S. Pat. No. 5,150,506.

BACKGROUND OF THE INVENTION

This invention relates to a method of and an apparatus for assembling plural kinds of exterior parts to a motorcar body which form an exterior shape of the motorcar (such as a bonnet, front fenders, doors, or the like).

Conventional assembling robots for automatically assembling doors and a bonnet are disclosed in Japanese Published Unexamined Patent Application No. 240574/1985 and Japanese Published Unexamined Patent Application No. 99272/1987. These assembling robots are provided with position sensors for detecting parts assembling locations such as door openings and engine compartment openings in the motorcar body. The robots are constituted such that parts can be automatically assembled to their assembling locations after the parts are aligned. These assembling robots, however, have the following disadvantages. Namely, the assembling accuracy of the motorcar body will sometimes give rise to an error to some degree, although the error is within a tolerable range. For instance, right and left side-panels will sometimes be relatively offset in position in the longitudinal direction depending on the error in the assembling accuracy. In the case of the above-described instance, since right and left doors are assembled to respective door openings of right and left side-panels after respective alignment thereof, right and left front end positions of front fenders will no longer be in alignment with each other if the right and left front fenders are assembled with a predetermined clearance between each door. As a result, there will be a step (or a difference) between the front end of the bonnet and the fenders and, consequently, the external line from the head towards the side of the motorcar does not form a successful connection.

OBJECT AND SUMMARY OF THE INVENTION

Taking the above problems into account, this invention has an object of providing a method of assembling plural kinds of exterior parts to a motorcar body even if there is an error in the assembling accuracy of the motorcar body so that the external line of the motorcar can be maintained good.

In order to attain the above-mentioned object, this invention is a method of assembling parts to a motorcar. The method comprises the following steps:

A detecting means is operated to measure assembling accuracy errors of a motorcar body by measuring the respective positions of a plurality of reference points of the motorcar body.

Correction data are calculated relating to respective assembling positions of plural kinds of exterior parts which form an external shape of the motorcar, the calculations being performed on the basis of the measured data obtained in the previous step, while maintaining a correlative relationship among the parts, to eliminate correlative misalignment among those parts due to assembling accuracy errors of the motorcar.

Each of the parts is then assembled by respective assembling robots to an assembling position which has been corrected in accordance with the calculated correction data. The assembling positions of plural kinds of exterior parts are corrected by giving correlation among the parts, on the basis of the measured assembling accuracy errors of the motorcar body. Therefore, when the right and left side-panels, for example, are relatively displaced from each other, the distance between the door and the front fender, which are exterior parts to be mounted on the side surface of the motorcar body, is varied on the right side from that on the left side. As a result, the front ends of the right and left fenders can be made flush with the front edge of the bonnet.

The measurement of the assembling accuracy data of the motorcar body may be made at the assembling station of the parts or at an arbitrary station which is located on an upstream side of the assembling station. In the latter case, the measured assembling accuracy data or the correction data for the parts assembling positions which are calculated based on these data are transmitted from the measuring station to the assembling station. When the motorcar body is conveyed into the assembling station, the conveyed position is detected and the parts are assembled after corrections are made to the displacement of the motorcar body in accordance with the correction data. When the assembling of plural kinds of exterior parts is performed at separate assembling stations, the length of the assembling line increases and the correction data of corresponding parts assembling positions must be transmitted, resulting in a complicated communication network.

In contrast, when plural kinds of exterior parts are assembled in a single assembling station, the assembling line can be shortened and the transmission network can be simplified. In addition, if the assembling accuracy is measured at this assembling station, the measured data already contain therein the displacement of conveyed position of the motorcar body. Therefore, each of parts can be assembled to a required position according to the correction data of the parts assembling positions which are calculated on the basis of the measured data.

In addition, when the places of assembling the parts to the motorcar body are detected by position sensors mounted on the assembling robots, as in the conventional system, the detection of places for assembling the parts by means of the position sensors as well as the correction of assembling positions according to the signals from these sensors must be performed after the parts received by the assembling robots have been conveyed to a prior position before final movement to the assembling position. Therefore, the assembling robots must be kept waiting at the prior position before movements to the assembling position until the correction has been completed. This waiting time becomes a lost time, with a consequent decrease in productivity.

In contrast, according to this invention, the reference points of the motorcar body are detected by detecting means provided at the assembling station and, on the basis of this positional information, the correction data of each assembling position of a plurality of exterior parts are calculated. Therefore, before each assembling robot reaches the prior position before the assembling position, it becomes possible to perform the position detection and the calculating operations of the correction data. In this manner, where each part is received by each assembling robot and is conveyed to the prior position before the assembling position at which the assembling to the motorcar body takes place, the above-mentioned correction data are calculated. And before each part is conveyed from the prior position to the assembling position, each correction data are transmitted to a robot controller of the corresponding assembling robot to correct the assembling position of each part. Therefore, the waiting time of the assembling robots can be shortened and the productivity can be improved.

Unlike the method in which each part is assembled to each assembling place of the motorcar body after respectively aligning each part, in this invention method there are cases where mounting holes formed in the parts are displaced relative to threaded holes provided in the motorcar body. Therefore, fastening portions of the motorcar body and of each part are formed with allowance so that, even if each part is displaced relative to the motorcar body, it can be fastened to the motorcar body. A socket at a front end of a nut runner which is to be mounted on each assembling robot or a separately provided fastening robot, is arranged to be floatable. Each part assembled to the assembling position which has been corrected according to the above-mentioned correction data is fastened to the motorcar body by a fastener held on the socket of each nut runner.

As a typical example of a method of fastening parts to objects to which they are fastened, a fastening bolt used as the fastener is inserted into a mounting hole which is formed in one of the part and the object in order to thread the bolt into a threaded hole provided in the other. In a second method, a bolt embedded in one of the part and the object is inserted into a mounting hole provided in the other, and then a nut as the fastener is fastened onto the bolt. In these fastening methods, the meaning of forming the fastening portions of the part and the object being fastened with an allowance as described above, generally is that the mounting hole is formed large enough for the bolt to pass therethrough with an allowance (or clearance).

Even if the mounting hole of the part is misaligned (displaced) relative to the threaded hole in the motorcar body, the threaded hole faces either part of the mounting hole if the mounting hole is formed large enough. In this case, the axial line of the nut runner is also misaligned relative to the threaded hole. However, since the socket at the front end of the nut runner is made to be floatable, the fastening bolt held by the socket can be fastened into the threaded hole through the floating operation of the socket. When an abnormality has occurred to the corrected data due to an abnormality of the detecting means or the calculating means, and when the parts are set to the assembling position according to the corrected data, there will be a case where, due to accumulated errors of the displacement of the motorcar body and the inaccuracy of the corrected data, the parts are set in such a position that the threaded hole is off the mounting hole, resulting in the situation that the parts cannot be fastened to the motorcar body. Therefore, whenever an abnormality has occurred to the detecting means or the calculating means, the correction data are nullified and the parts are set to assembling positions according to teaching data. In this case, if the mounting hole is formed large enough as described above, the threaded hole faces the mounting hole even if there is some displacement in the motorcar body. The fastening bolt is, then, fastened into the threaded hole through the floating operation of the socket in the nut runner. In this manner, the parts can be assembled anyhow to the motorcar body, even though they are displaced relative to the motorcar body, thereby preventing the assembling line from being stopped. The parts which have been assembled during the occurrence of an abnormality are corrected with respect to their positions in a latter step.

As previously described, it is preferred to arrange the system so that plural kinds of exterior parts can be assembled to the motorcar body in a single assembling station.

Conventionally, it is so arranged that plural kinds of exterior parts comprising front fenders, doors, a bonnet and a tail gate (or a trunk lid) are independently assembled to the motorcar body in a plurality of assembling stations through which the motorcar body is conveyed. The assembling work of the exterior parts at each of the assembling stations is then performed manually. However, in the Japanese Published Unexamined Patent Application No. 2405/1985, a method is disclosed in which the doors are automatically assembled by disposing assembling robots on which are mounted assembling jigs at a side of an assembling station. In the Japanese Published Unexamined Patent Application No. 99272/1987, it is disclosed that an assembling robot which has an arm extending to the lateral inner direction is disposed at a side of an assembling station and an assembling jig for holding the bonnet is mounted on the arm in order to automatically assemble the bonnet. In order to automatically assemble plural kinds of exterior parts to the motorcar body in a single assembling station, it is necessary to arrange a plurality of assembling robots space-efficiently within a predetermined space. However, if the robot for assembling lid-like exterior parts such as a bonnet or the like is arranged on a side portion of the assembling station in the same manner as the assembling robot for the exterior side parts such as doors or the like, interferences among the robots are likely to occur. In addition, the assembling jig must be mounted on the assembling robot for the lid-like exterior parts via the arm which extends laterally inwards, as described above. Therefore, a large bending moment acts on the arm and the robot due to the total weight of the assembling jig and the lid-like exterior parts to be held thereon. The consequence is that the accuracy of positioning the parts to the motorcar body is likely to be reduced.

In addition, in the conventional method, each of the parts is supplied to each assembling station stacked on carts. In order to supply plural kinds of exterior parts to a single assembling station respectively stacked on carts, it is necessary to keep a wide space at a side of the assembling line for the carts to travel. This results in a poor space efficiency.

Taking the above points into consideration, it is another object of this invention to provide an assembling apparatus in which: exterior side parts such as front fenders, doors or the like and lid-like exterior parts such as a bonnet, tail gate or the like can be assembled to a motorcar body in a single assembling station in order to shorten the length of the assembling line. The travelling passage at the side of assembling line can be eliminated by arranging the system such that these exterior parts can be supplied to each assembling robot by utilizing overhead space. The positioning accuracy of the lid-like exterior parts relative to the motorcar body can be improved.

In order to attain these objects, the assembling apparatus of this invention is characterized in certain of the following features. Assembling robots for assembling exterior side parts such as front fenders, doors or the like to a motorcar body are disposed on sides of an assembling station in which the motorcar body is stationarily placed. An overhead frame is provided in the assembling station while leaving a space thereunder through which the motorcar body can be conveyed. An assembling robot for assembling lid-like exterior parts such as a bonnet, tail gate or the like is mounted on the overhead frame. Hanger conveyors are provided for conveying exterior side parts and lid-like exterior parts to a position above the overhead frame. An apparatus frame for drop lifters is provided in the assembling station, the apparatus frame extending upwards above the overhead frame. Drop lifters for the exterior side parts and drop lifters for the lid-like exterior parts are vertically movably provided on the apparatus frame, the drop lifters being for respectively transferring the exterior side parts and the lid-like exterior parts, from being conveyed by the hanger conveyors, to an assembling jig mounted on each assembling robot.

The operation of this assembling apparatus is as follows. Each of the drop lifters is lifted to a position above the overhead frame. The exterior side parts and the lid-like exterior parts are received by each drop lifter. Then, the drop lifters are lowered and each of the exterior parts is handed over to the assembling jig of each assembling robot. Then, after each drop lifter is lifted to prepare for transferring of the next workpiece, each of the exterior parts is assembled to the motorcar body by the operation of each assembling robot.

Since the assembling robot for the lid-like exterior part is mounted on the overhead frame, it is possible to suspend the assembling jig from the assembling robot without interposing a horizontal arm therebetween. Therefore, as compared with the conventional apparatus in which the assembling jig is supported in a cantilevered manner via a horizontal arm on a robot disposed by the side of the assembling station, the supporting rigidity of the assembling jig can be increased, and the accuracy of positioning the lid-like exterior part on the motorcar body can be improved.

In addition, by mounting the assembling robot for the lid-like exterior part on the overhead frame, the assembling robots for the exterior side parts can be disposed at the sides of the assembling station without giving rise to an interference with the above-mentioned assembling robot. In this manner, it becomes possible to automatically assemble the exterior side parts and the lid-like exterior parts by each assembling robot in a single assembling station.

In case the exterior side parts are front fenders and doors, a front fender and at least a door are conveyed to a position above the assembling station by a common hanger conveyor. Then, the front fender and the door can be transferred, by a drop lifter which is commonly used for the exterior side parts, to each of those assembling robots for the front fender and the door which are disposed in line at the sides of the assembling station.

In case the front fender and the door are assembled to the motorcar body in a separate assembling stations, it becomes necessary to convey the front fender and the door to the separate assembling stations by separate conveying means. On the other hand, the above-mentioned apparatus is advantageous in that a common conveying equipment can be employed for the front fender and the door.

The lid-like exterior parts must be assembled to the motorcar body at a required positional accuracy in their closed conditions. Therefore, it is preferred to assemble each of the lid-like exterior parts to the motorcar body by the assembling jig in approximately horizontal closed condition posture. To attain this purpose, it is conceived of conveying the lid-like exterior parts in a horizontal posture and then supply each of them to the assembling jig via the drop lifter while maintaining them in the horizontal posture. However, when they are conveyed in the horizontal posture, there is a disadvantage in that a hanger of the hanger conveyor becomes large, resulting in expensive equipment costs.

In order to solve this kind of disadvantage, other features of this invention apparatus are the following. The hanger conveyor for the lid-like exterior parts is constructed such that the lid-like exterior parts are conveyed while being maintained in substantially a vertical posture. The drop lifter for each of the lid-like exterior parts is provided while a reversing jig which, capable of being erected and laid down, holds the lid-like exterior part and reverses it from a vertical posture to a substantially horizontal posture. The assembling robot for the lid-like exterior part is provided with an assembling jig which holds the lid-like exterior part from above thereof, the lid-like exterior part being held in a substantially horizontal posture by the reversing jig at a lowered position of the drop lifter.

In this case, if the reversing jig is formed in a substantially U-shaped form in which an opening portion thereof faces towards the assembling robot and in which the assembling jig can be accommodated therein, the reversing jig can be lifted without retracting longitudinally or laterally from the assembling jig, after the lid-like exterior part has been received by the assembling jig, without giving rise to an interference with the other jigs, resulting in a shortening of the cycle time of the assembling work.

BRIEF DESCRIPTION OF DRAWINGS

The above and other objects and the attendant advantages of the present invention will become readily apparent by reference to the following detailed description when considered in conjunction with the accompanying drawings wherein:

FIG. 3 is a plan view thereof.

FIG. 4 is a sectional view taken along the line IV—IV of FIG. 2.

FIG. 11 is a left side view of the assembling jig as shown in FIG. 10.

FIG. 12 is a sectional view taken along the line XII—XII of FIG. 10.

FIG. 14 is a side view of a door assembling robot as seen from the front of the Y-axis direction.

FIG. 16 is a plan view thereof.

FIG. 30 is a bottom view thereof.

FIG. 31 is a sectional view taken along the line XXXI—XXXI of FIG. 29.

DETAILED DESCRIPTION OF PREFERRED EMBODIMENT

Figure 1:
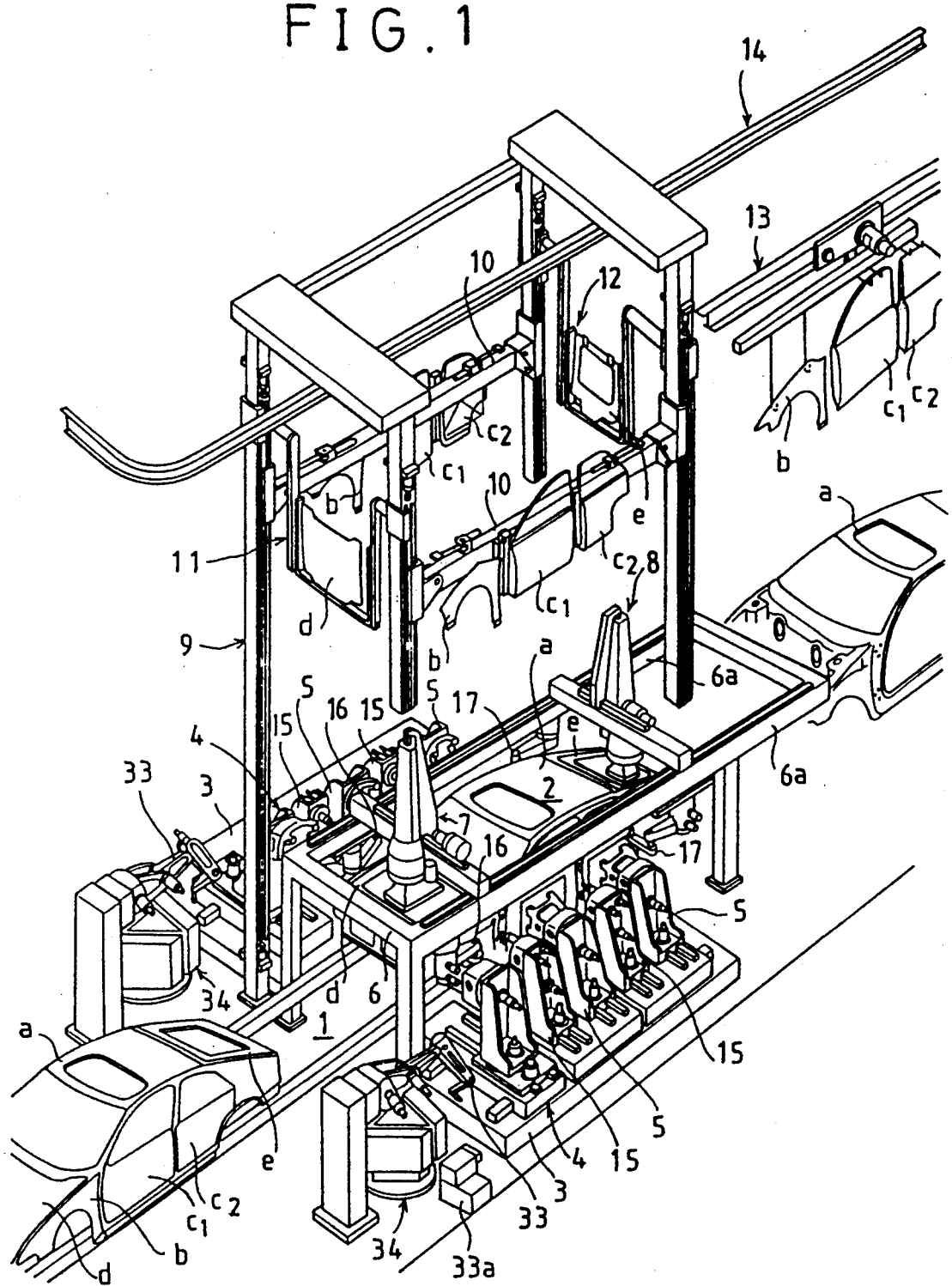
FIG. 1 is a perspective view of an assembling station showing an example of this invention apparatus.

With reference to FIG. 1, a conveying line 1 for a motorcar body a is provided with an assembling station 2. Assembling robots 4 for front fenders b (hereinafter referred to as "front fender assembling robot") and assembling robots 5, 5 for front and rear doors $c_1$, $c_2$ (hereinafter referred to as "door assembling robots") are disposed on bases 3 which are provided on both sides of the assembling station 2, in the order mentioned from the front end rearwards. An overhead frame 6 is provided over the assembling station 2. An assembling robot 7 for a bonnet d (hereinafter referred to as "bonnet assembling robot") and an assembling robot 8 for a tail gate e (hereinafter referred to as "tail gate assembling robot") are disposed on the overhead frame 6. An apparatus frame 9 which extends upwards above the overhead frame 6 and which has drop lifters supported thereon is vertically provided in the assembling station 2. First drop lifters 10, 10 for the front fenders b and the front and rear doors $c_1$, $c_2$ are provided in a vertically movable manner on both right and left sides of the apparatus frame 9. A second drop lifter 11 for the bonnet d and a third drop lifter 12 for the tail gate e are provided in a vertically movable manner respectively at the front and rear of apparatus frame 9. The front fenders b and the front and rear doors $c_1$, $c_2$ conveyed by first hanger conveyors 13, which are arranged to pass along the right and left sides above the overhead frame 6 (conveyor only on one side is shown in FIG. 1), are respectively handed over to the front fender assembling robots 4 and the door assembling robots 5, 5 via the first drop lifters 10. The bonnet d and the tail gate e conveyed by a second hanger conveyor 14, which is arranged to pass along a central portion above the overhead frame 6, are respectively handed over to the bonnet assembling robot 7 and the tail gate assembling robot 8 via the second and third drop lifters 11, 12 respectively. In this manner, it is so arranged that the front fenders b, the front and rear doors $c_1$, $c_2$, the bonnet d and the tail gate e can be assembled to the motorcar body a in a single assembling station.

The assembling station 2 is provided, as explained later, with a plurality of sensors for detecting two positions at the front and rear on both right and left sides of the motorcar body a and a position of a bulkhead. Based on the positional data detected by these sensors, the amounts of correcting the assembling positions of the front fender b, doors $c_1$ $c_2$ and bonnet d are calculated. In accordance with the calculated correction data, these parts are assembled to the motorcar body a. The tail gate e is assembled, as described later, to the motorcar body by directly detecting the position of a rear opening of the motorcar body a.

At the front side of each of the door assembling robots 5, a fastening robot 15 for fastening door hinges is provided in a side by side relationship. Robots 16 for fastening bonnet hinges and robots 17 for fastening tail gate hinges are provided in a suspended manner, respectively in a front portion and a rear portion of both right and left beams 6a of the overhead frame 6.

In the following description, the direction of width of the motorcar is defined as X-axis, the direction of length thereof is defined as Y-axis and the direction of height thereof is defined as Z-axis. First, description is made of the construction of the assembling robots 4, 5 relating to the assembling of the front fenders b and doors $c_1$, $c_2$ which are exterior side parts; and of the construction of the first drop lifters 10 and the first hanger conveyors 13; as well as of the assembling procedures of the front fenders b and the doors $c_1$, $c_2$.

Figure 2:
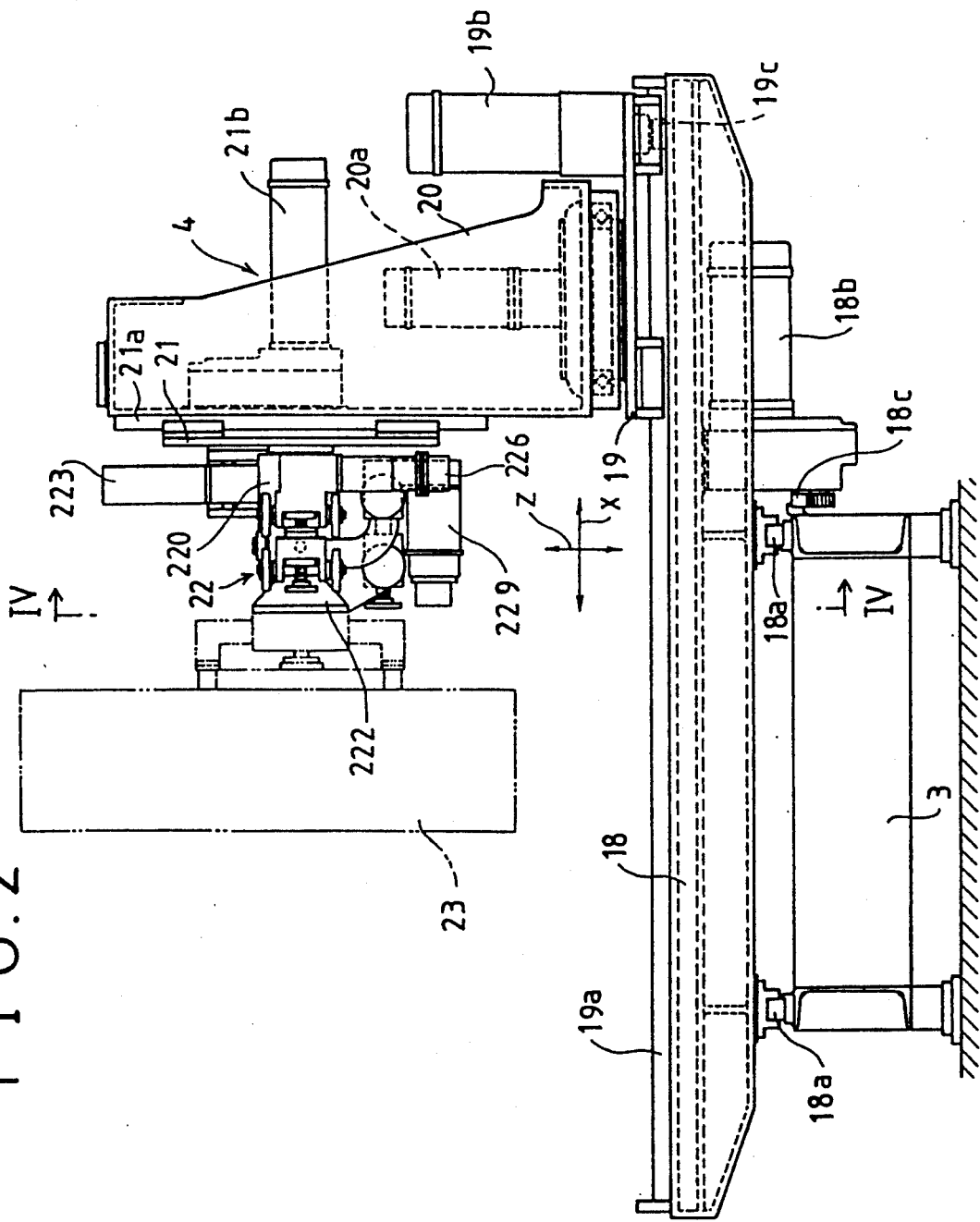
FIG. 2 is a side view of a front fender assembling robot as seen from the front of the Y-axis direction.
Figure 5:
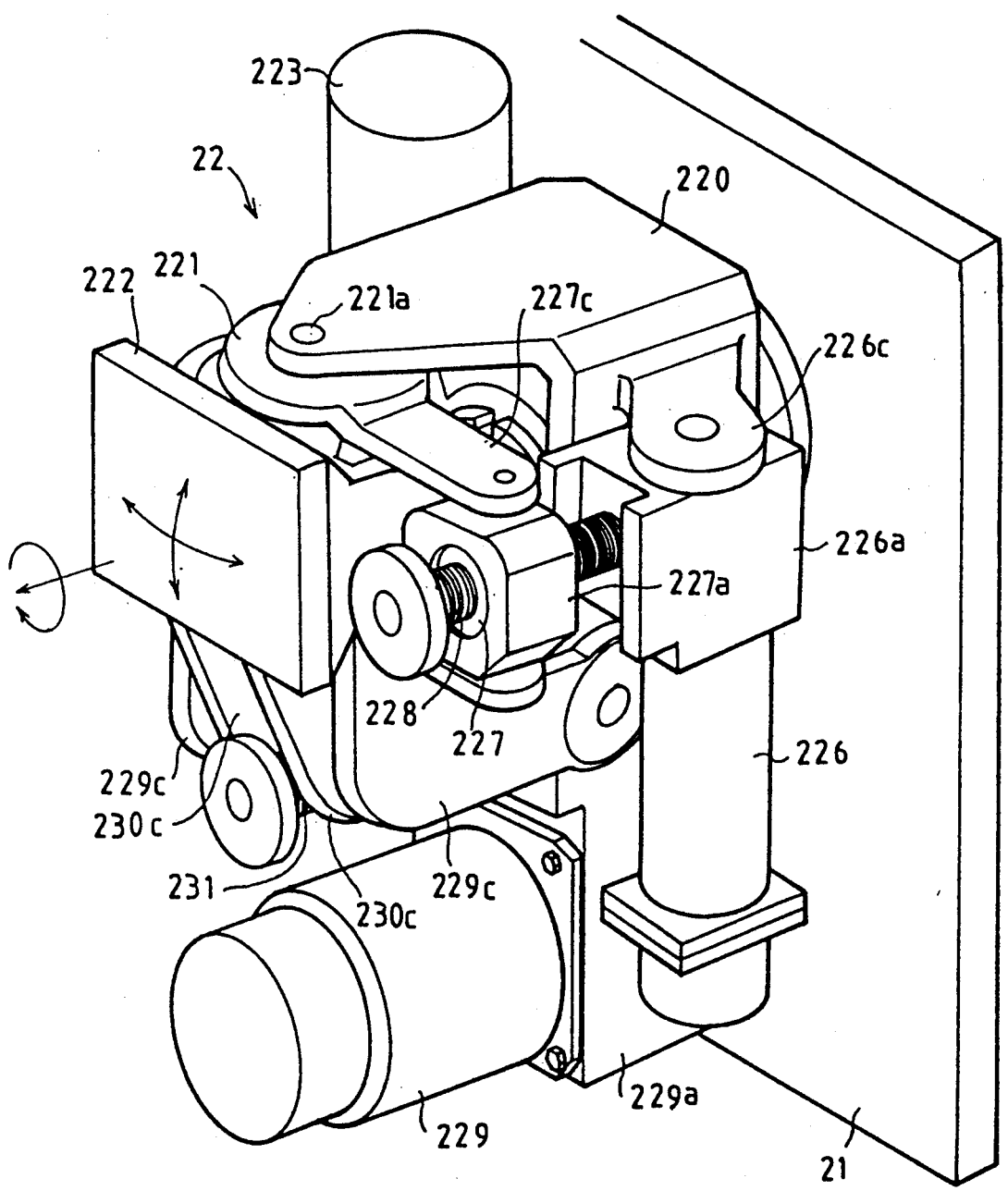
FIG. 5 is a perspective view of a wrist portion of an assembling robot.
Figure 6:
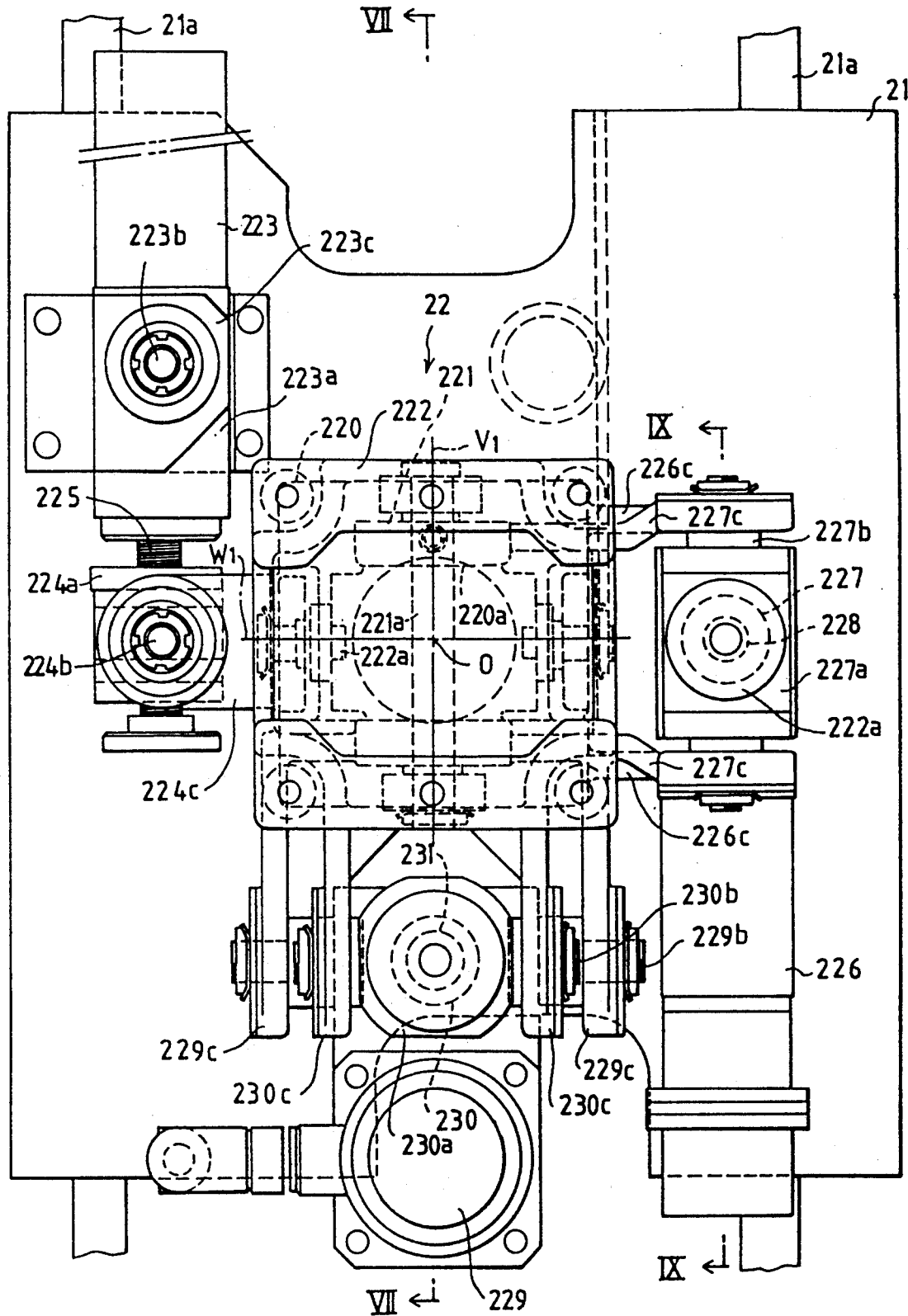
FIG. 6 is a front view of the wrist portion.
Figure 7:
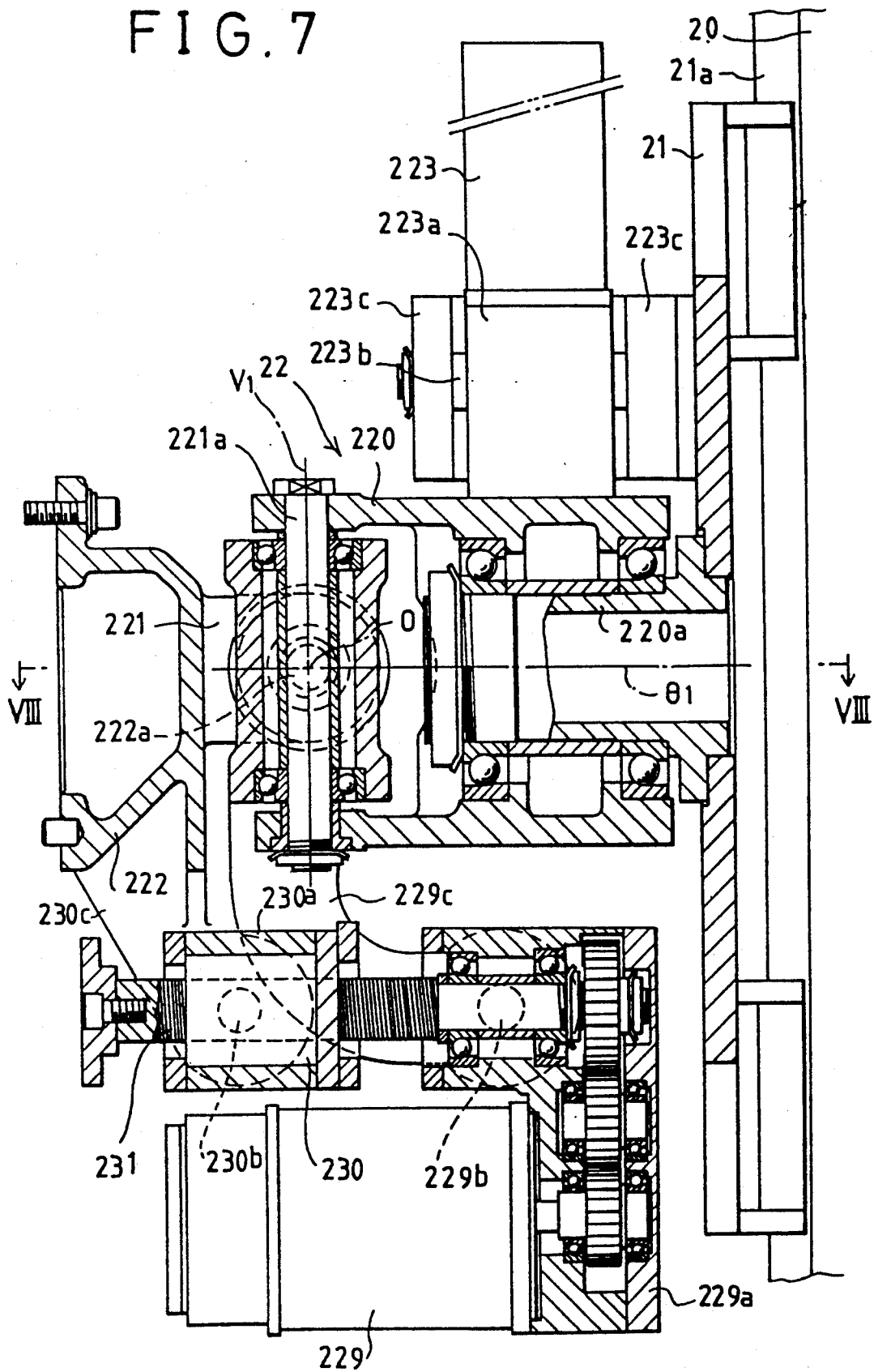
FIG. 7 is a sectional view taken along the line VII—VII of FIG. 6.
Figure 8:
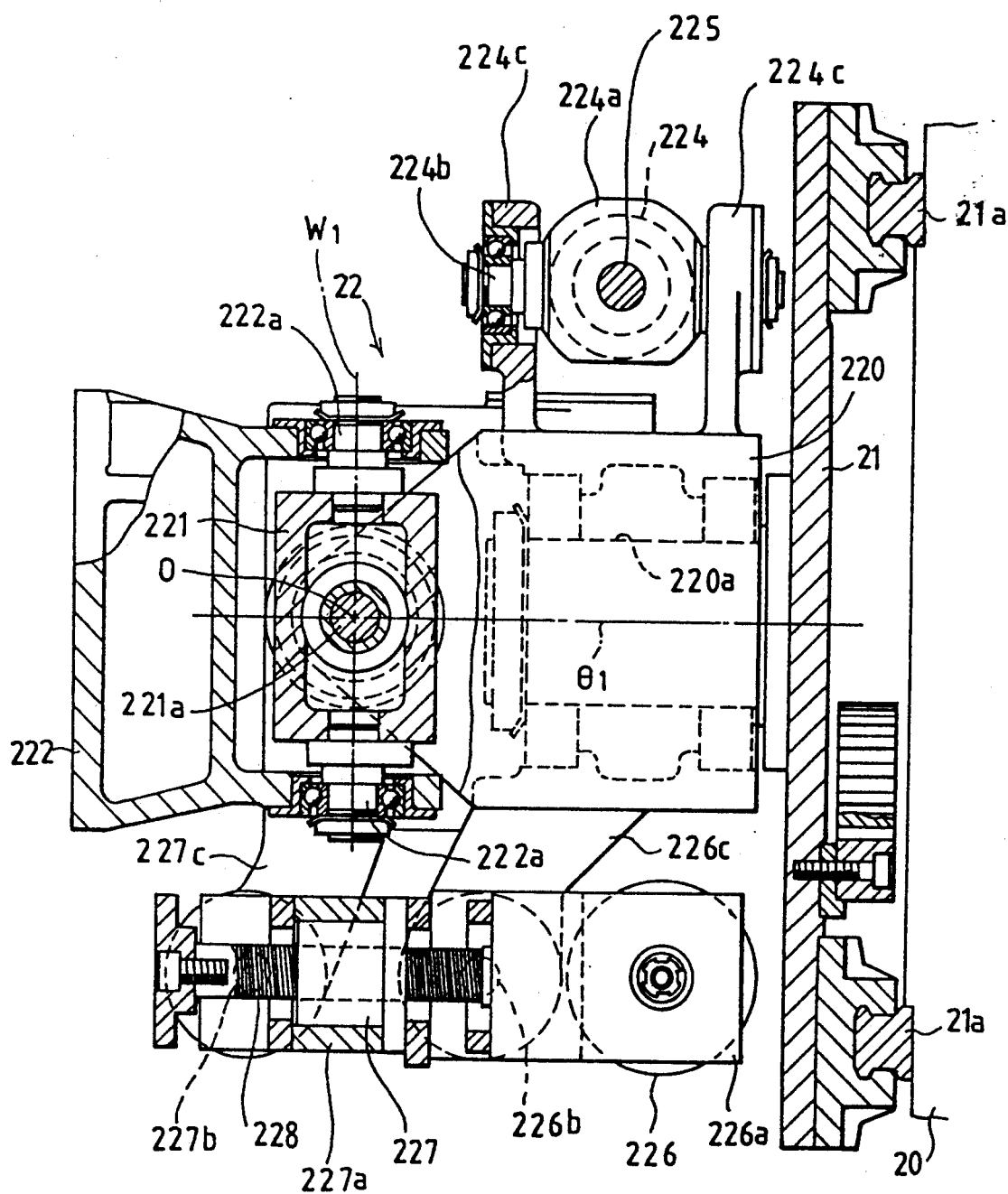
FIG. 8 is a sectional view taken along the line VIII—VIII of FIG. 7.
Figure 9:
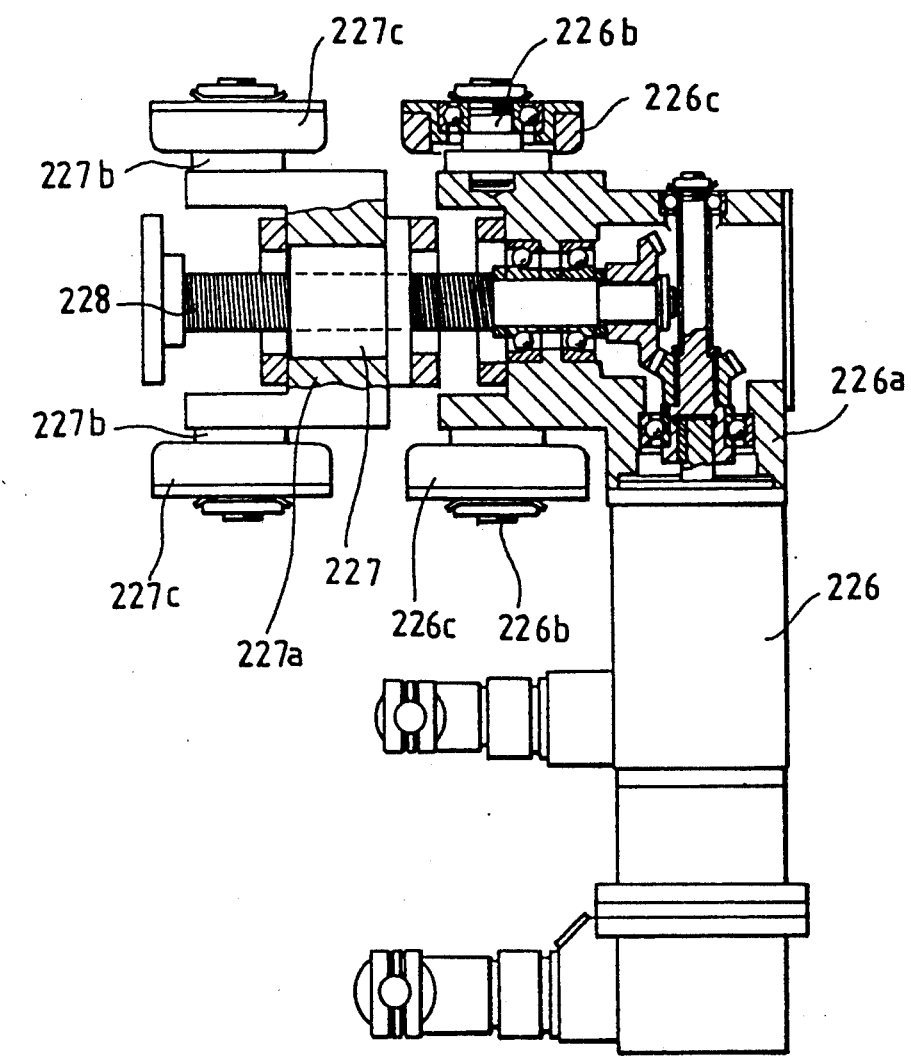
FIG. 9 a sectional view taken along the line IX—IX of FIG. 7.

Each of the front fender assembling robots 4 is a 7-axis robot which comprises certain structure, as show in FIGS. 2 through 4.

A first slide base 18 is movable by an electric motor 18b via a rack-and-pinion mechanism 18c in the Y-axis direction along guide rails 18a on a base frame 3. A second slide base 19 is movable by an electric motor 19b via a rack-and-pinion mechanism 19c in the X-axis direction along guide rails 19a on the first slide base 18. A turning base 20 is rotatable on the second slide base 19 by an electric motor 20a about the Z-axis. A lifting frame 21 is lifted and lowered along the Z-axis by an electric motor 21b via a rack-and-pinion mechanism along guide rails 21a provided on a side surface of the turning base 21. A wrist portion 22 of 3-axis construction is mounted on the lifting frame 21.

The wrist portion 22 comprises, as shown in FIGS. 5 through 9: a wrist main body 220 rotatably supported on a shaft 220a which is fixed to the lifting frame 21 and which has a first axial line $\theta_1$ in parallel with the X-axis; a swing frame 221 rotatably supported on the wrist main body 220 via a shaft 221a which has a second axial line $V_1$ crossing the first axis $\theta_1$, at right angles; and a head frame 222 rotatably supported on the swing frame 221 via a shaft 222a which has a third axial line $W_1$, crossing the second axial line $V_1$, at right angles. An assembling jig 23 which holds the front fenders b is attached to the head frame 222.

The first, second and third axial lines $\theta_1$, $V_1$ and $W_1$ cross each other at a common crossing (intersection) point 0, and thus allows the assembling jig 23 to move in all directions about the crossing point 0.

The wrist main body 220 is rotated about the first axial line $\theta_1$ by rotating, in the normal and reverse directions, a ball thread 225 which is inserted in a threading manner into a first nut member 224 which is mounted on the wrist main body 220. The rotation of the ball thread 225 takes place by a first driving source 223 which comprises a servomotor and which is mounted on the lifting frame 21. The first driving source 223 is supported on a bracket 223c, which is fixed to the lifting frame 21, and is swingable about a shaft 223b which is provided in a projecting manner on a connecting box 223a provided on the end portion of the first driving source 223 and which is in parallel with the first axial line $\theta_1$. The first nut member 224 is supported on a bracket 224c, which extends from the wrist main body 220, and is swingable about a shaft 224b provided in a projecting manner on a holder 224a provided externally on the first nut member 224 and which is in parallel with the first axial line $\theta_1$.

The swing frame 221 is swung about the second axial line $V_1$ by rotating, in the normal and reverse directions, a ball thread 228 which is inserted in a threading manner into a second nut member 227 which is attached to the swing frame 221. The rotation of the ball thread 228 takes place by a second driving source 226 which comprises a servomotor and which is mounted on the wrist main body 220. The second driving source 226 is supported on a bracket 226c, which extends from the wrist main body 220, and is swingable about a shaft 226b which is provided in a projecting manner on a gear box 226a provided on the end portion of the second driving source 226 and which is in parallel with the second axial line $V_1$. The second nut member 227 is supported on a bracket 227c, which extends from the swing frame 221, and is swingable about a shaft 227b which is provided in a projecting manner on a holder 227a provided externally on the second nut member 227 and which is in parallel with the second axial line $V_1$.

The head frame 222 is rotated about the third axial line $W_1$ by rotating, in the normal and reverse directions, a ball thread 231 which is inserted in a threading manner into a third nut member 230 which is attached to the head frame 222. The rotation of the ball thread 231 takes place by a third driving source 229 which comprises a servomotor and which is mounted on the swing frame 221. The third driving source 229 is supported on a bracket 229c which extends from the swing frame 221, and is swingable about a shaft 229b which is provided in a projecting manner on a gear box 229a provided on the end portion of the third driving source 229 and which is in parallel with the third axial line $W_1$. The third nut member 230 is supported on a bracket 230c which extends from the head frame 222 and is swingable about a shaft 230b which is providing in a projecting manner on a holder 230a provided externally on the third nut member 230 and which is in parallel with the third axial line $W_1$.

In accordance with the above-mentioned construction, the wrist main body 220, swing frame 221 and head frame 222 can be rotated at large reduction ratios via the respective ball threads 225, 228, 231. Therefore, the wrist portion 22 can be controlled at a high accuracy. In addition, since each of the ball threads 225, 228, 231 functions as a reinforcing link to connect the lifting frame 21 and the wrist main body 220, the wrist main body 220 and the swing frame 221, and the swing frame 221 and the head frame 222, the supporting rigidity of the wrist main body 220, the swing frame 221 and the head frame 222 can be increased. Therefore, it becomes possible for the head frame 222 to stably support the assembling jig 23 which is a heavy item.

Figure 10:
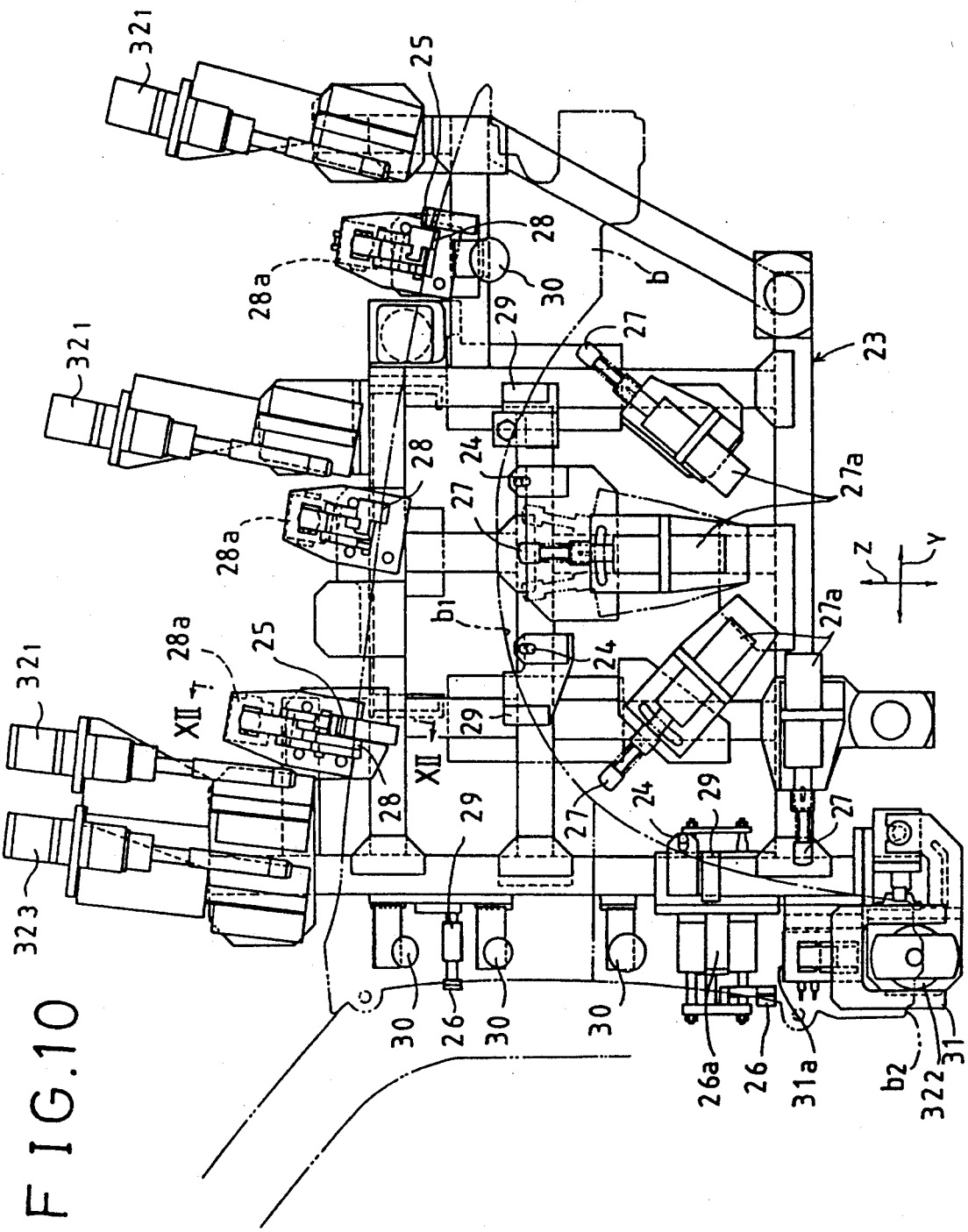
FIG. 10 is a front view of an assembling jig for the front fender as seen from the inner side of the X-axis direction.

The assembling jig 23 comprises, as shown in FIGS. 10 and 11: three bar-shaped workpiece receiving members 24 which support by roughly aligning the front fender b at upper two points and rear one point of its wheel arch portion $b_1$; two first receiving members 25 which support an upper edge of the front fender b at two front and rear points; two second receiving members 26 which support a rear edge of the front fender b at two upper and lower points; four pressing members 27 which are actuated by cylinders 27a for radially pressing the wheel arch portion $b_1$ at substantially equally spaced-apart four points; three clamping members 28 which, as shown in FIG. 12, are swung by cylinders 28a to clamp an upper edge of the front fender b in the X-axis direction at three longitudinally spaced points; a plurality of receiving members 29 which receive an external surface of the front fender b; a plurality of suction members 30 which suck and hold the front fender b into a predetermined assembling posture in cooperation with the receiving members 29; a fork-shaped pressing member 31 which is swung by a cylinder 31a to press that tongue portion $b_2$ at a rear bottom part of the front fender b which is to be overlapped with a front bottom part of a side sill $a_1$ of the motorcar body a, so that it is overlapped with the side sill $a_1$; three first nut runners $32_1$, which fasten a flange portion $b_3$ formed at an upper edge of the front fender b to the motorcar body a at three longitudinally spaced points; a second nut runner $32_2$ at a rear bottom side for fastening a tip of the tongue portion $b_2$ to the motorcar body a; and a third nut runner $32_3$ at a rear upper side for fastening a hinge bracket of the bonnet d to the motorcar body a. A cylinder $26_a$ is provided for moving the lower-side second receiving member 26 in the Y-axis direction.

Figure 13:
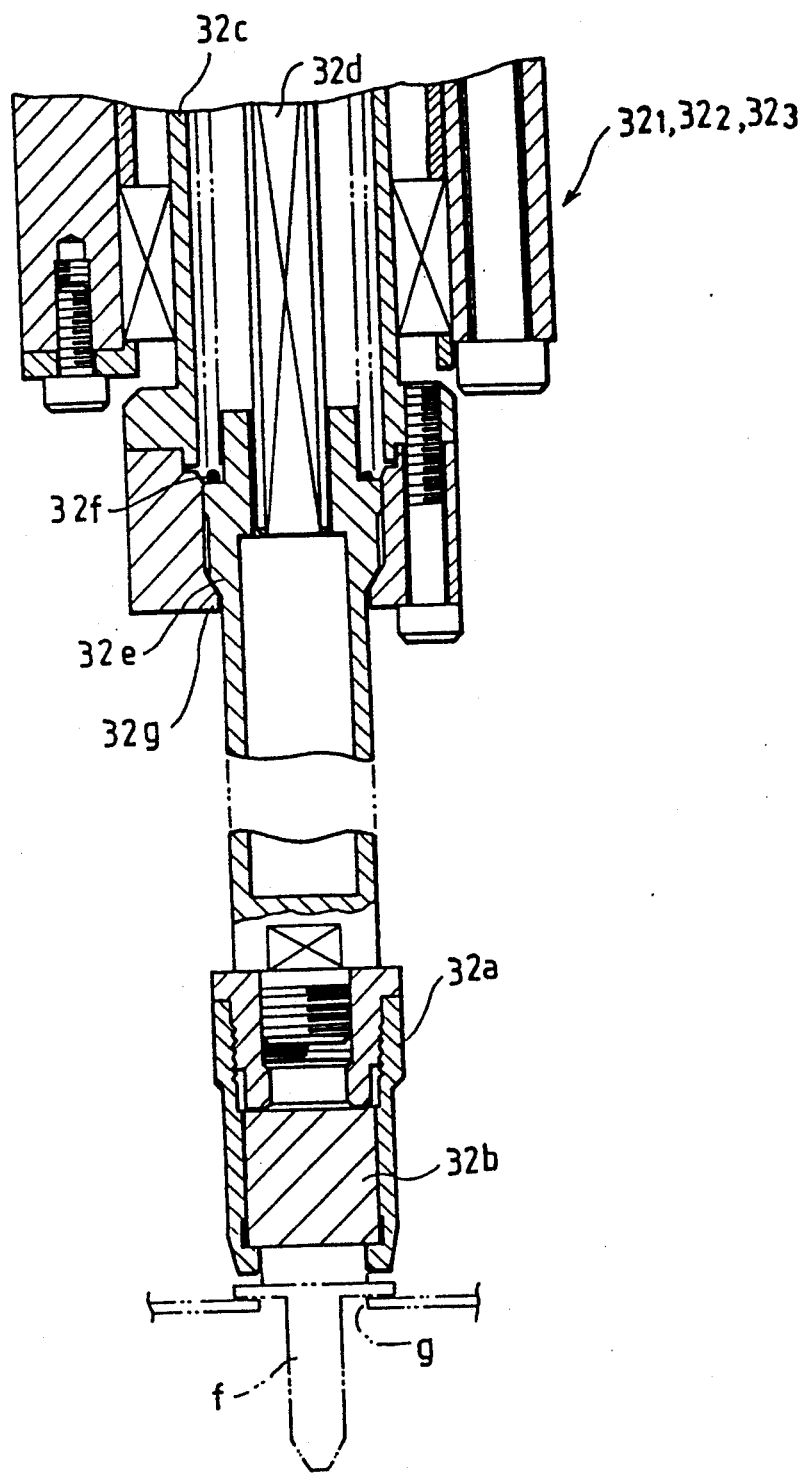
FIG. 13 is a sectional view of a nut runner taken along the line XIII—XIII of FIG. 11.

Each of the above-mentioned nut runners $32_1$, $32_2$, $32_3$ operates, as shown in FIG. 13, such that a fastening bolt f, which is held in a socket 32a by the attraction of a magnet 32b, is fastened into a threaded hole in the motorcar body a through a mounting hole g which is formed in each of the front fender b and the hinge bracket of the bonnet d. A rotating shaft of the nut runner is constructed in an inner and outer double construction comprising a cylinder shaft 32c and a square shaft 32d on the inner side thereof. The socket 32a is made to be inserted, at an enlarged portion 32e of a rear end thereof, into the cylinder shaft 32c at a clearance in between. Normally, the enlarged portion 32e is fitted, through a resilient force of a spring 32f, into a centering (or aligning) guide 32g which is mounted at a front end of the cylinder shaft 32c in order to maintain the socket 32a in a neutral position. When the enlarged portion 32e is pushed by force into the cylinder shaft 32c against the spring 32f, the socket 32a is made to operate in a floating manner by having released the restriction by the centering guide 32g. The square shaft 32d is engaged with a square hole formed at the enlarged portion 32e with a clearance in between not to hinder this floating operation.

The mounting hole g is formed large enough so that the fastening bolt f can be inserted thereinto with enough allowance (or clearance). In addition, the front end of the fastening bolt f is tapered. In this manner, even if the mounting hole g is misaligned against the threaded hole, the front end of the fastening bolt f is inserted into the threaded hole with the aid of guiding function of the tapered portion by the advancement of the nut runner, as long as the threaded hole faces the mounting hole g. Thereafter, the socket 32a is floated and the fastening bolt f is securely fastened into the threaded hole.

As shown in FIG. 1, in the assembling station 2, bolt setting robots 33 and bolt feeding devices 33a in the neighborhood thereof are provided in front of the front fender assembling robots 4. The assembling jigs 23 are turned towards the front direction by the turning of the turning bases 20. By this operation, fastening bolts can be set from the bolt feeding devices 33a to each of the nut runners $32_1$, $32_2$, $32_3$ via the bolt setting robots 33. In FIG. 1, devices 34 are shown for changing the assembling jigs 23.

Each of the door assembling robots 5 is constructed as shown in FIG. 14. The same numerals are given to the same parts as those of the front fender assembling robot 4. The difference between the door assembling robot 5 and the front fender assembling robot 4 is only that a stationary base 20' is fixedly provided on the second slide base 19 instead of the turning type of base 20. The other constructions are the same. An assembling jig 35 for holding the door is provided on the head frame 222 of the wrist portion 22 of the door assembling robot 5.

The assembling jig 35 comprises, as shown in FIGS. 15 through 18, the following structure. A pair of front and rear workpiece receiving members 36 support a lower edge of the door floatingly in the X-axis direction. A reference stopper member 37 is moved by a cylinder 37a from a forward clearing position to a reference position to be restricted by a stopper 37b, to receive a front edge of the door. A first clamping member 38 is provided on a movable frame 38a and is movable back and forth in the Y-axis direction, such that the first clamping member 38 is movable back and forth in the X-axis direction by a cylinder 38b, the clamping member 38 pressing a rear edge of the door by the operation of a clamping cylinder 38c which moves back and forth the movable frame 38a, thereby pinching the door between the reference stop member 37 and the first clamping member 38. A second clamping member 39 is swung up and down by a cylinder 39a in order to press an upper edge of the door from above. A pad 40 is floatable in the X-axis direction to receive an external surface of the door. A plurality of suction members 41 are moved back and forth by cylinders 41a to suck an external surface of the door. First play (or looseness) removing members which are moved up and down by cylinders 42a in order to remove play (or looseness) due to inclination of hinge brackets $C_a$ by pressing the hinge brackets $c_a$ which are hingedly provided in a front portion of the door from above. Second play removing members 42' are provided on movable frames 42'b and are swingable about the Z-axis and movable up and down by actuators 42'c. The movable frames 42'b is movable back and forth by cylinders 42'a in the X-axis direction, thereby removing the vertical play of the bracket $c_a$ by pushing the hinge portions of the hinge bracket $c_a$ from below.

Figure 15:
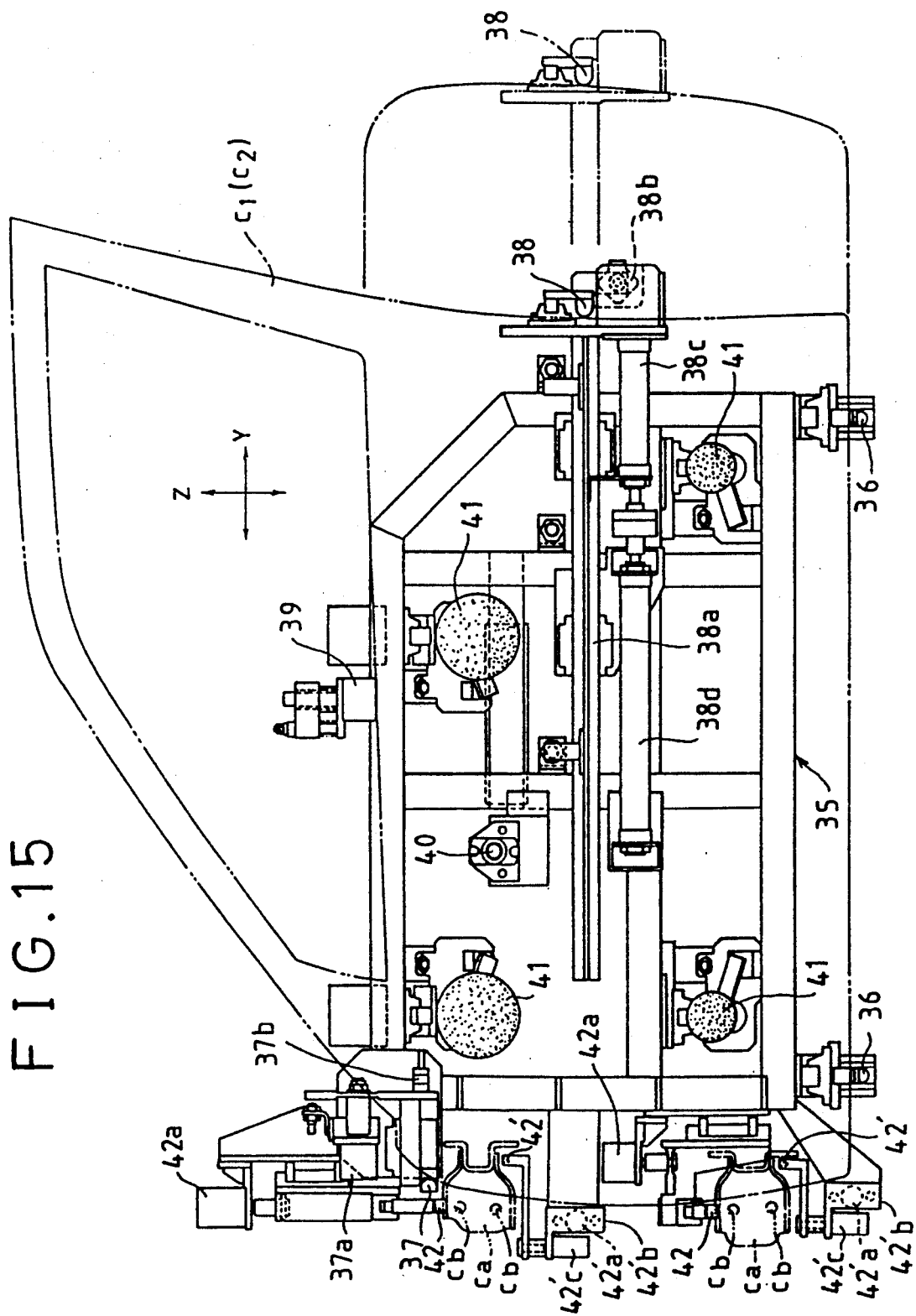
FIG. 15 is a front view of an assembling jig for the doors as seen from the inner side of the X-axis direction.
Figure 18:
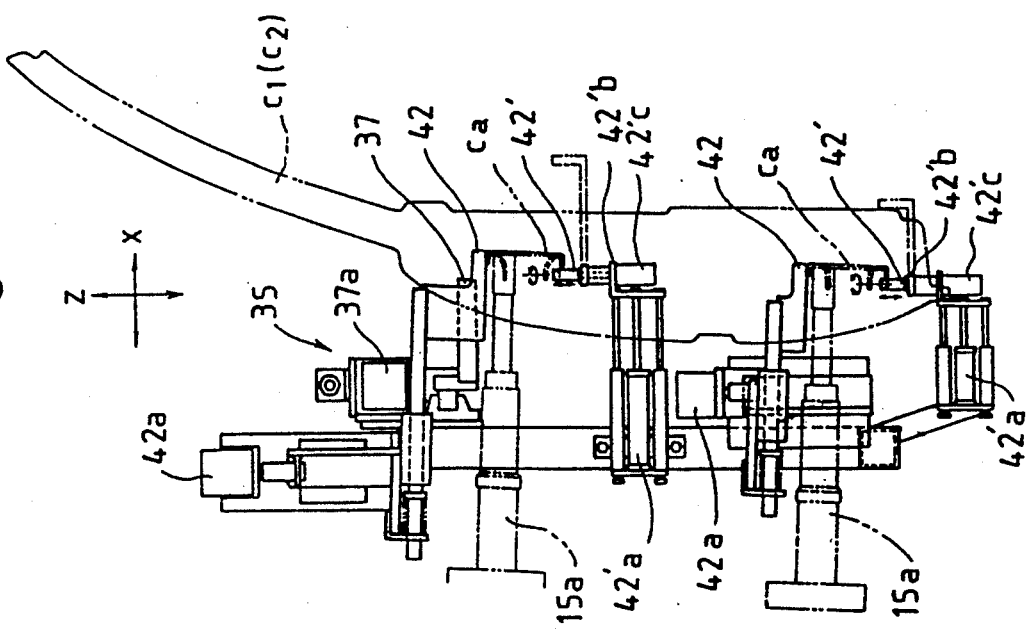
FIGS. 17 and 18 are right side and left side views, respectively, of the assembling jig shown in FIG. 15.
Figure 17:
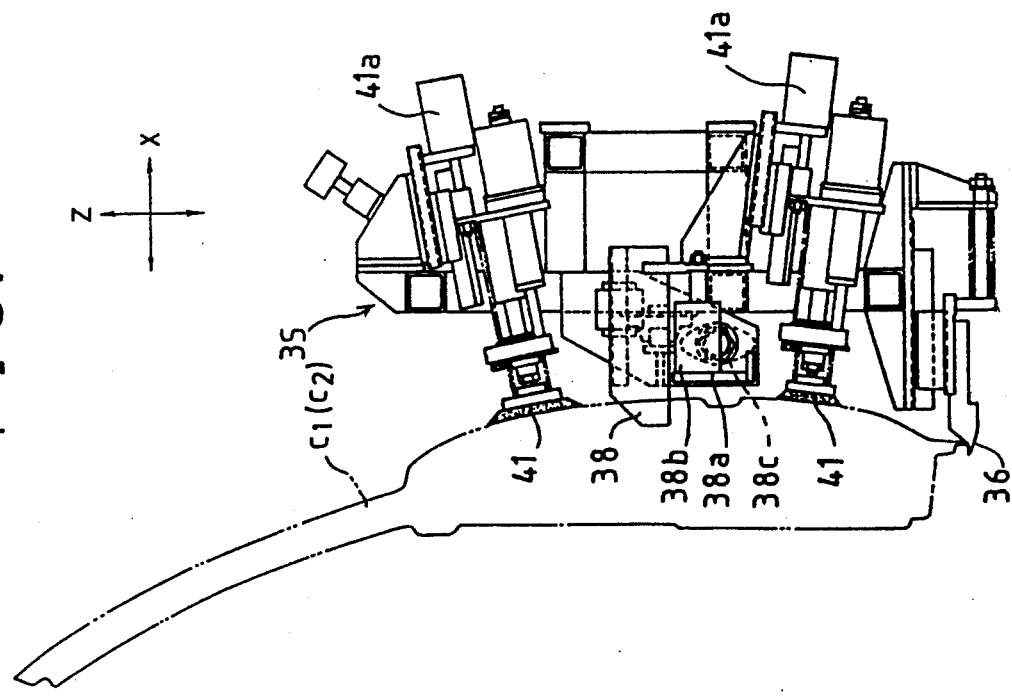

The first clamping member 38 provided in the front door assembling jig 35 can handle also a two-door type of motorcar by changing its position, as shown by imaginary lines in FIG. 15, between that for four-door type and that for two-door type of motorcar, by sliding the movable frame 38a with a model switching cylinder 38d which is connected to the clamping cylinder 38c.

Figure 32:
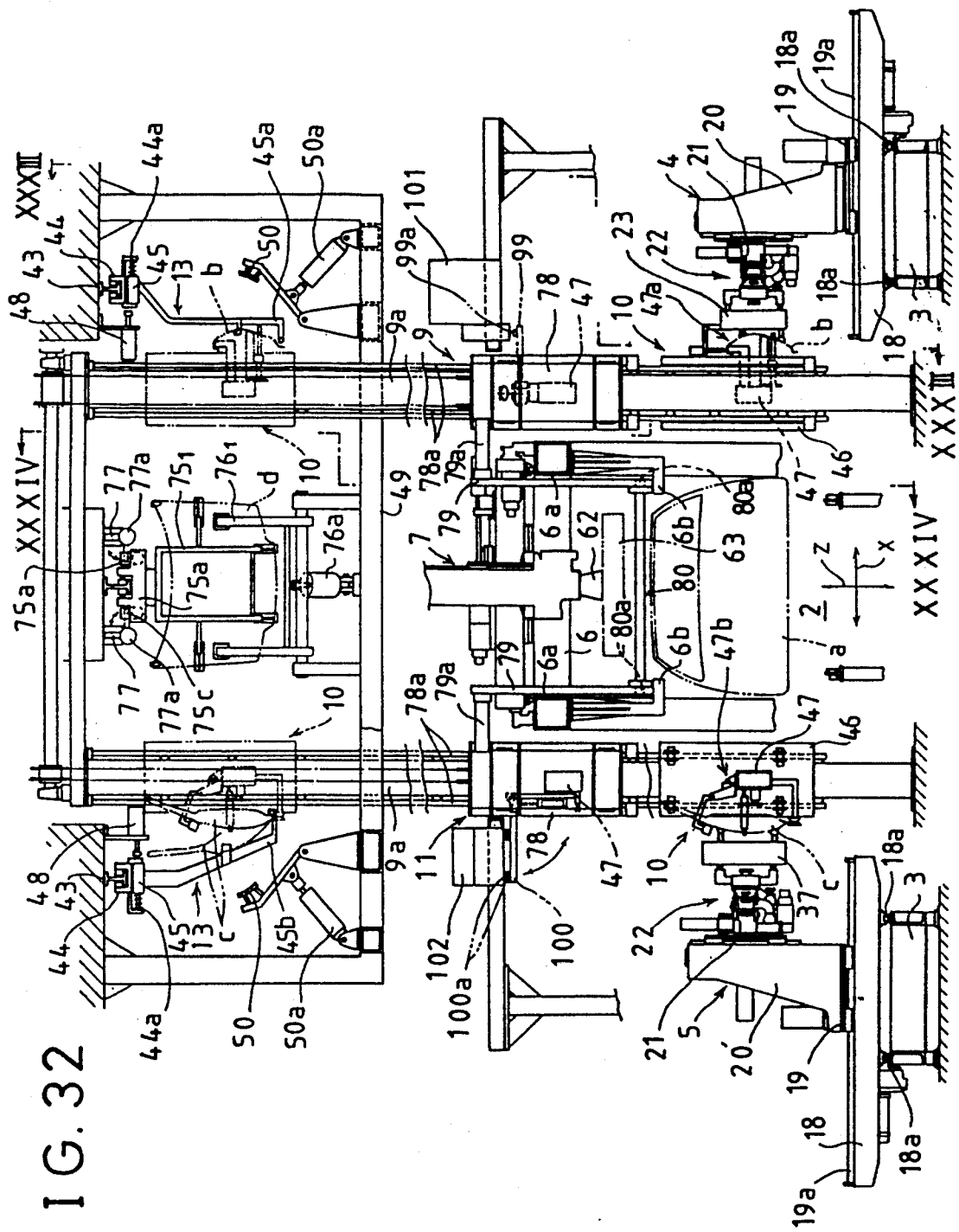
FIG. 32 is a front view of the assembling station as seen from the front of the Y-axis direction.
Figure 33:
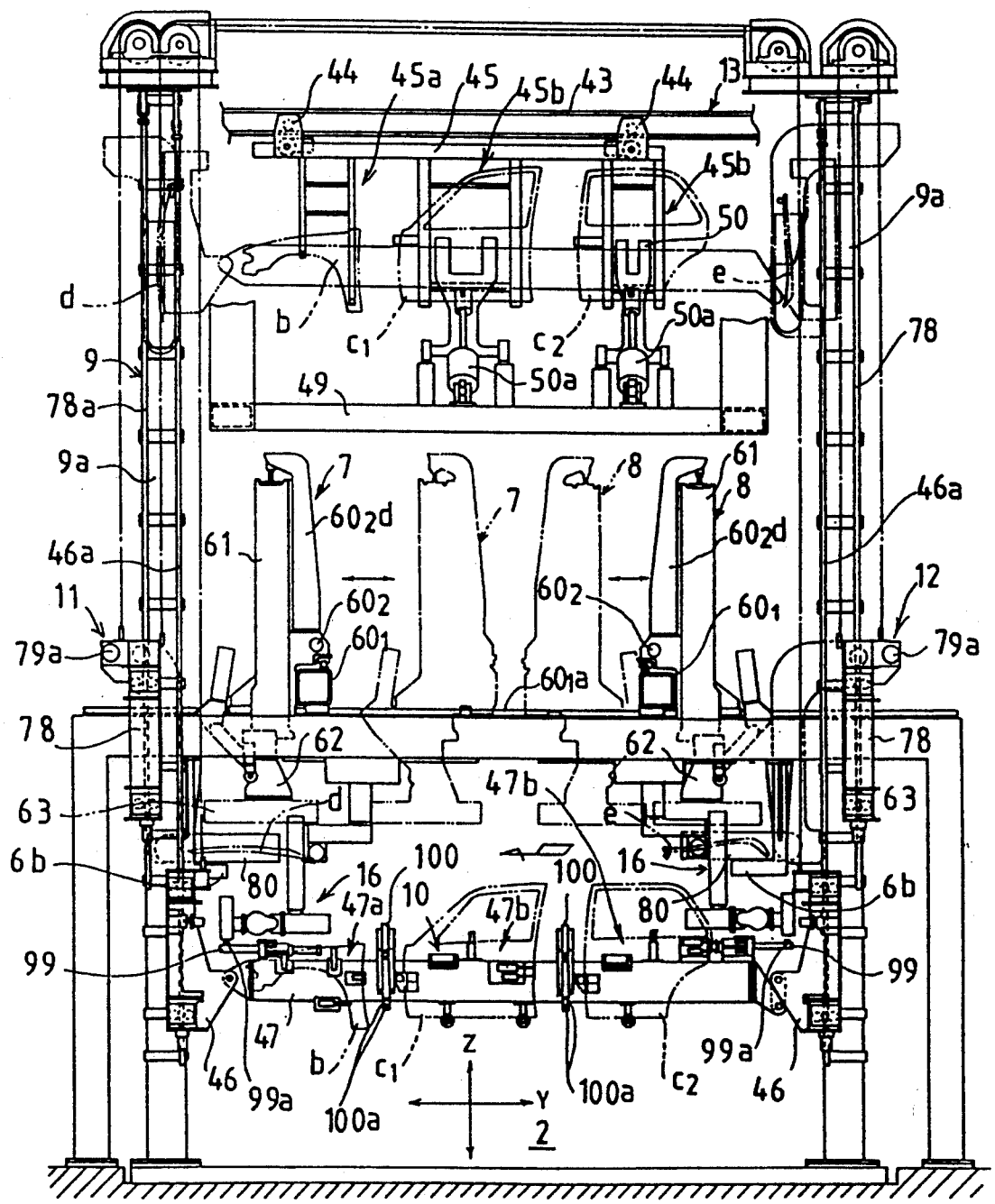
FIGS. 33 and 34 are side view of the assembling station taken, respectively, along the lines XXXIII—XXXIII and XXXIV—XXXIV of FIG. 32.

Each of the first hanger conveyors 13 comprises the structure as shown in FIGS. 32 and 33. A pair of carriers 44, 44 are rotatably suspended from a conveyor rail 43. A hanger 45 extends in the Y-axis direction and is suspended from the carriers 44, 44 such that it is slidable in the X-axis direction against a spring 44a. The hanger 45 is provided with a supporting member 45a for the front fender b, and supporting members 45b, 45b for the doors $c_1$, $c_2$ with all of members being arranged in a side by side manner. Each of the first drop lifters 10 comprises: a pair of front and rear lifting frames 46, 46 which are to be lifted and lowered along guide rails 46a provided on a pair of front and rear supporting columns 9a, 9a of the apparatus frame 9, and a supporting frame 47 which extends in the Y-axis direction between the lifting frames 46, 46 and which are provided with a holding member 47a for the front fender b, and holding members 47b, 47b for each of the doors $c_1$, $c_2$ with all of members being arranged in a side by side manner. Each of the first drop lifters 10 is lifted to a workpiece receiving position which is on the same level as the conveying level of the first hanger conveyor 13. The workpieces to be supported by each of the supporting members 45a, 45b of the hanger 45, i.e., the front fender b and each of the front and rear doors $c_1$, $c_2$, are received by each of the holding members 47a, 47b from the inner side of the X-axis direction. The drop lifter 10 is then slightly lifted and the hanger 45 is pushed outwards in the X-axis direction by a pushing cylinder 48 which is provided on a ceiling portion at an upper side of the apparatus frame 9 so that the workpieces are released therefrom. The first drop lifters 10 are lowered in this condition.

Each of the doors $c_1$, $c_2$ is supported by the supporting members 45b of the hanger 45 in an inclined posture. In order to hand over the doors c to the holding members 47b of the first drop lifter 10 in an erected (substantially vertical) posture, a door-erection member 50 which is raised and laid down by a cylinder 50a is disposed in an overhead frame 49 which is suspended from the ceiling portion.

Figure 35:
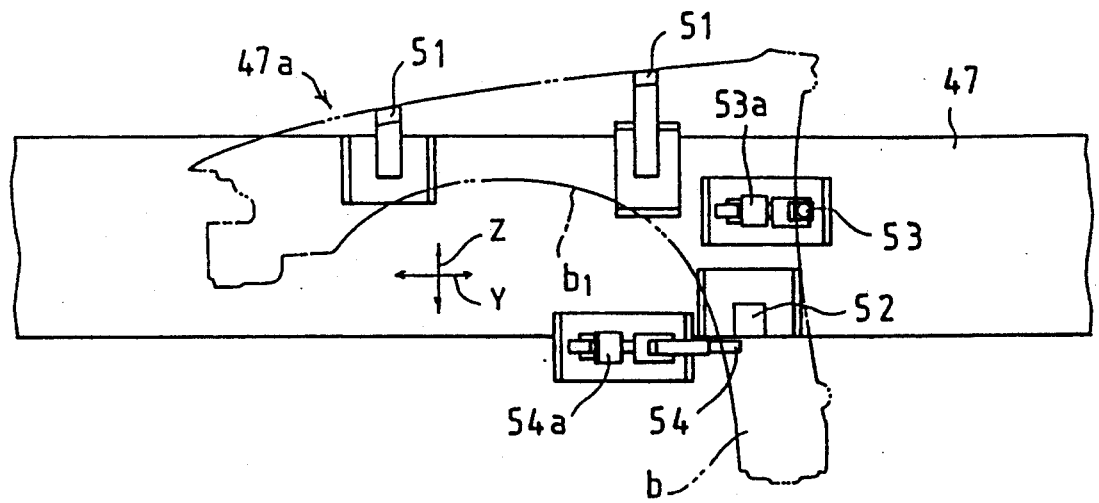
FIG. 35 is a front view of a front fender holding portion of a first drop lifter as seen from an outside of the X-axis direction.
Figure 36:
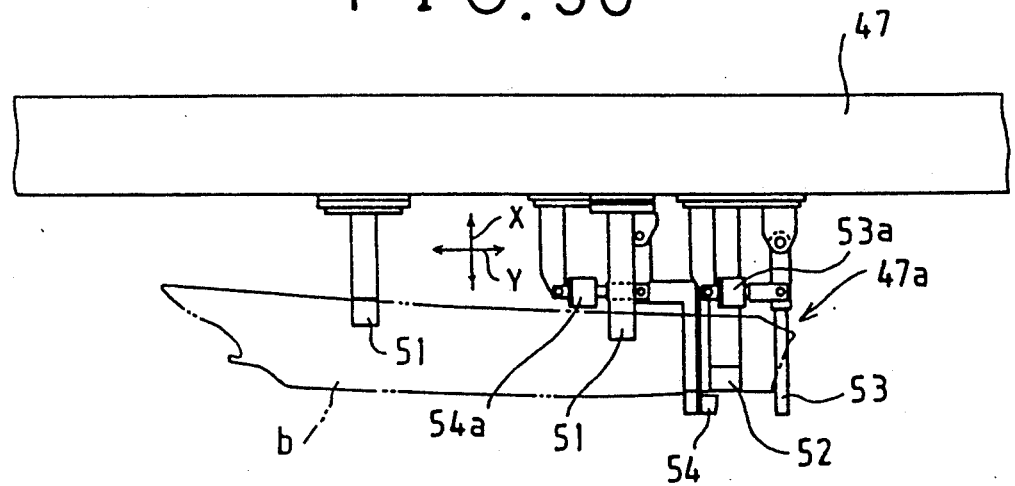
FIG. 36 is a plan view thereof.
Figure 37:
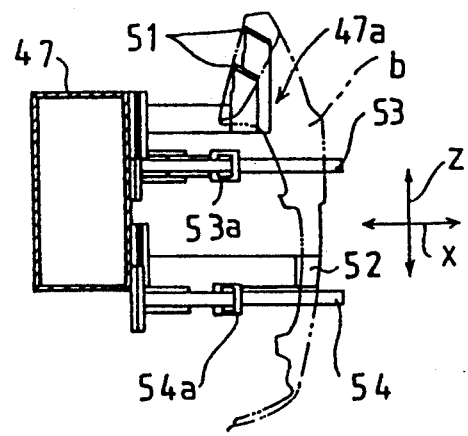
FIG. 37 is a left side view of the front fender holding portion shown in FIG. 35.

The holding member 47a for the front fender b comprises, as shown in FIGS. 35 through 37: workpiece receiving members 51 which support an upper edge of the front fender b; a receiving member 52 which receives a rear internal surface of the front fender b; a first clamping member 53 which is swung by a cylinder 53a to abut a rear surface of the front fender b for positioning it in the Y-axis direction; and a second clamping member 54 which is swung by a cylinder 54a to engage with a rear portion of the wheel arch portion $b_1$ of the front fender b to prevent it from swinging in the X-axis and Y-axis directions. After the first drop lifter 10 is lowered to a downward workpiece hand-over position, the assembling jig 23 of the front fender assembling robot 4 is moved forward in the X-axis direction towards the holding member 47a. The first and second clamping members 53, 54 of the holding member 47a are unclamped and also the jig 23 is slightly moved upwards in an upwardly inclined posture through the rotation of the wrist portion 22 about the $W_1$ axis. The front fender b is supported by the workpiece receiving members 24 of the assembling jig 23 and is then lifted off from the workpiece receiving members 51 of the holding member 47a. The jig 23 is retracted outwards in the X-axis direction to release the front fender b off the holding member 47a. Thereafter, the pressing members 25, clamping members 26 and suction members 30 of the jig 23 are operated to hold the front fender b by the jig 23 is a posture aligned in the X-, Y- and Z-axis directions.

Figure 38:
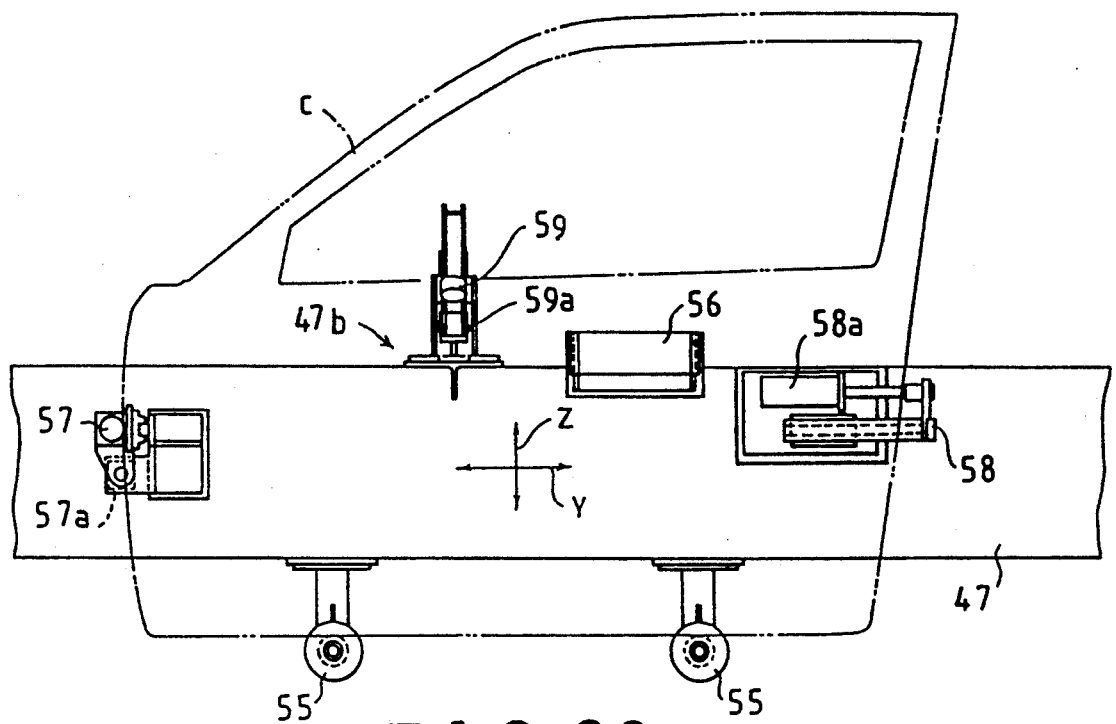
FIG. 38 is a front view of a door holding portion of the first drop lifter as seen from an outside of the X-axis direction.
Figure 39:
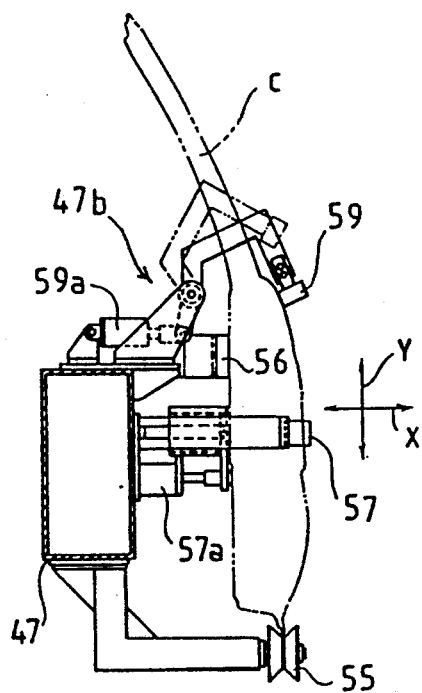
FIG. 39 is a left side view thereof.

Each of the holding members 47b for the door of the first drop lifter 10 comprises, as shown in FIGS. 38 and 39: workpiece receiving members 55 comprising V-shaped rollers for supporting a lower edge of the door; a receiving member 56 for receiving an inner surface of the door; a reference stopper member 57 which is moved back and forth in the X-axis direction by a cylinder 57a for receiving a front edge of the door; a first clamping member 58 which is moved back and forth in the Y-axis direction by a cylinder 58a for pinching the door between the clamping members 58 and the reference stopper member 57 by abutting at a rear edge of the door; and a second clamping member 59 which is swung by a cylinder 59a to prevent the door from falling down by abutting an external surface of the door. After the first drop lifter 10 is lowered to a workpiece receiving position, the assembling jig 35 of the door assembling robot 5 is moved inwards in the X-axis direction. Then, the first and second clamping members 58, 59 of the holding member 47b are unclamped and the jig 35 is slightly lifted in an upwardly inclined posture through the rotation of the wrist portion 22 about the $W_1$ axis. The door is supported by the workpiece receiving member 36 of the assembling jig 35 and is lifted off from the workpiece receiving members 55 of the holding member 47b. Then, the assembling jig, 35 is retracted outwards in the X-axis direction to release it off the holding member 47b. Thereafter, the reference stopper member 37, the first clamping member 38, the second clamping member 39 and the suction members 41 of the assembling jig 35 are operated to hold the door in an aligned position in the jig 35.

As described above, after the front fenders b and the front and rear doors $c_1$, $c_2$ have been handed over from the first hanger conveyors 13 through the first drop lifters 10 to the assembling jigs 23, 35, 35 of each of the assembling robots 4, 5, 5, the first drop lifters 10 are lifted to the workpiece receiving position to prepare for receiving the workpieces from the next hanger of the first hanger conveyor 13. At the same time, each of the assembling jigs 23, 35 is returned to a substantially vertical posture. According to correction data, positions of each of the assembling jigs 23, 35 in the Y- and Z-axis directions are corrected and the inclination thereof about the $\theta_1$ axis and $V_1$ axis is corrected by means of Wrist portion 22. Under these conditions each of the assembling jigs 23, 35 is moved inwards in the X-axis direction to set the front fender b and each of the doors $c_1$, $c_2$ to the motorcar body a. By means of the first nut runner $32_1$ and the second nut runner $32_2$ of the front fender assembling FIG. 23, a flange portion $b_3$ at an upper edge of, and the tongue portion $b_2$, of the front fender b are fastened to the motorcar body a. Hinge brackets $c_a$ of the door are fastened to the motorcar body a by nut runners 15a which are mounted on the fastening robots 15. Thereafter, each of the assembling jigs 23, 35 are retracted in the X-axis direction while the workpieces are unclamped, thus completing the assembling work of the front fender and the doors. At an end of each nut runner 15a, a socket is provided in a floating manner, like in the above mentioned nut runners $32_1$, $32_2$, $32_3$. Mounting holes $c_b$ which are larger than the diameter of the fastening bolt are provided in the hinge brackets $c_a$. In this way, it is so arranged that, even if the mounting holes $c_b$ are misaligned with respect to the threaded holes on the motorcar body, the hinge brackets $c_a$ can be fastened to the motorcar body. The above has been the description of the assembling of the side exterior parts.

Next, a description is made of the constructions of the assembling robots 7, 8 for the bonnet b and the tail gate e which are lid-like exterior parts, and of the second and third drop lifters 11, 12 as well as of the assembling steps of the bonnet d and the tail gate e.

Figure 19:
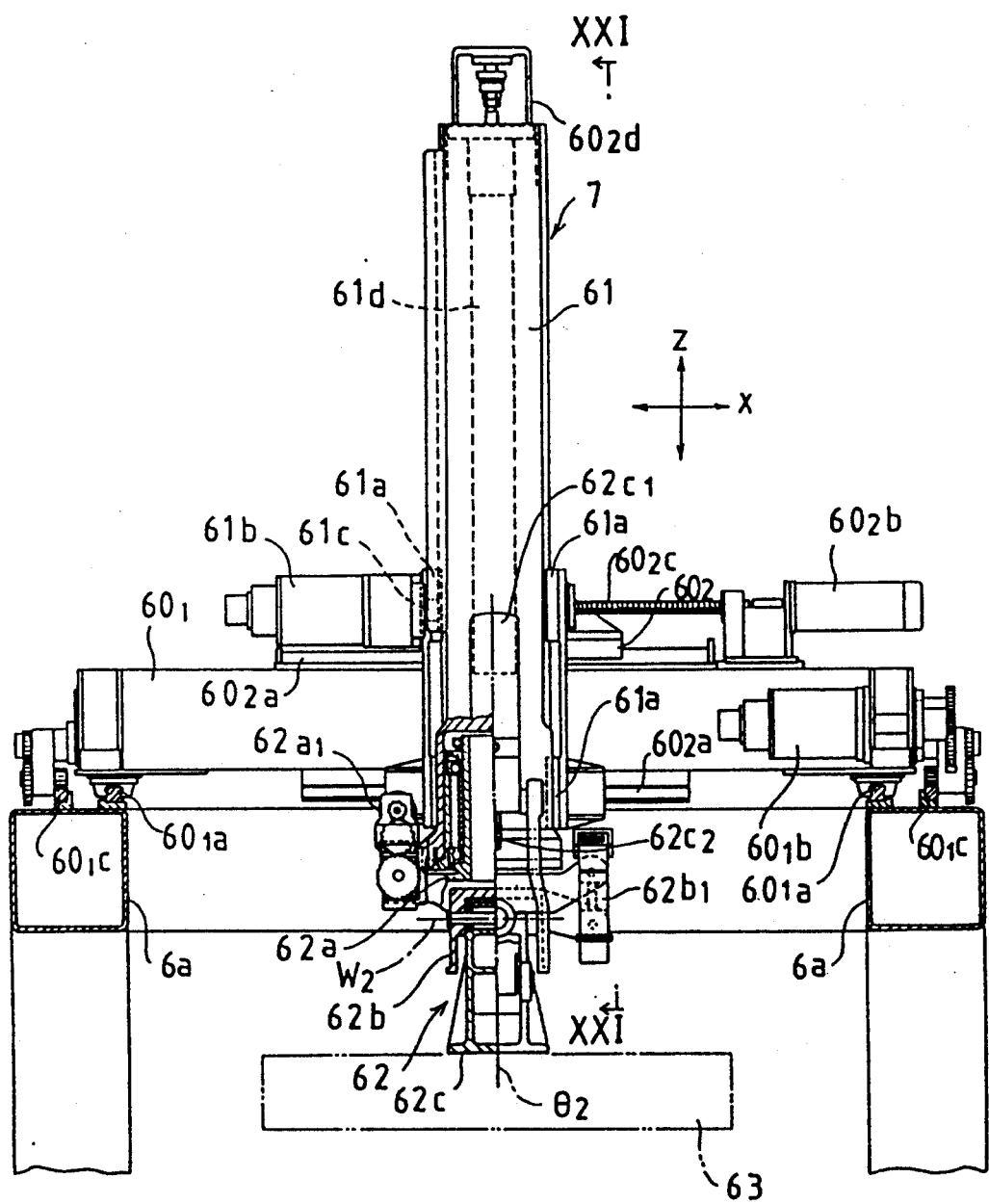
FIG. 19 is a front view of an assembling robot for a bonnet as seen from the front of the Y-axis direction.
Figure 20:
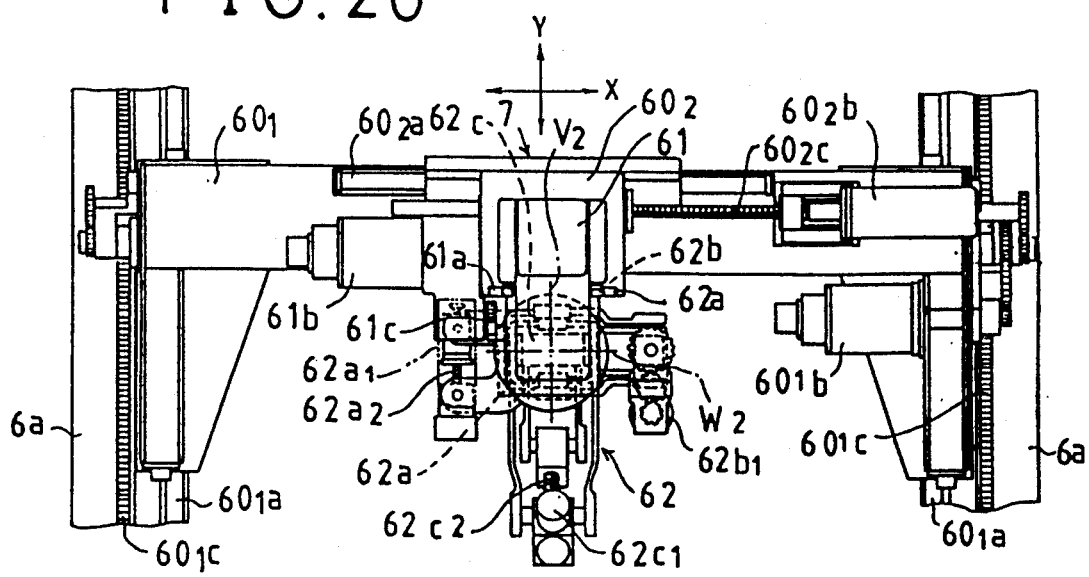
FIG. 20 is a plan view thereof.
Figure 21:
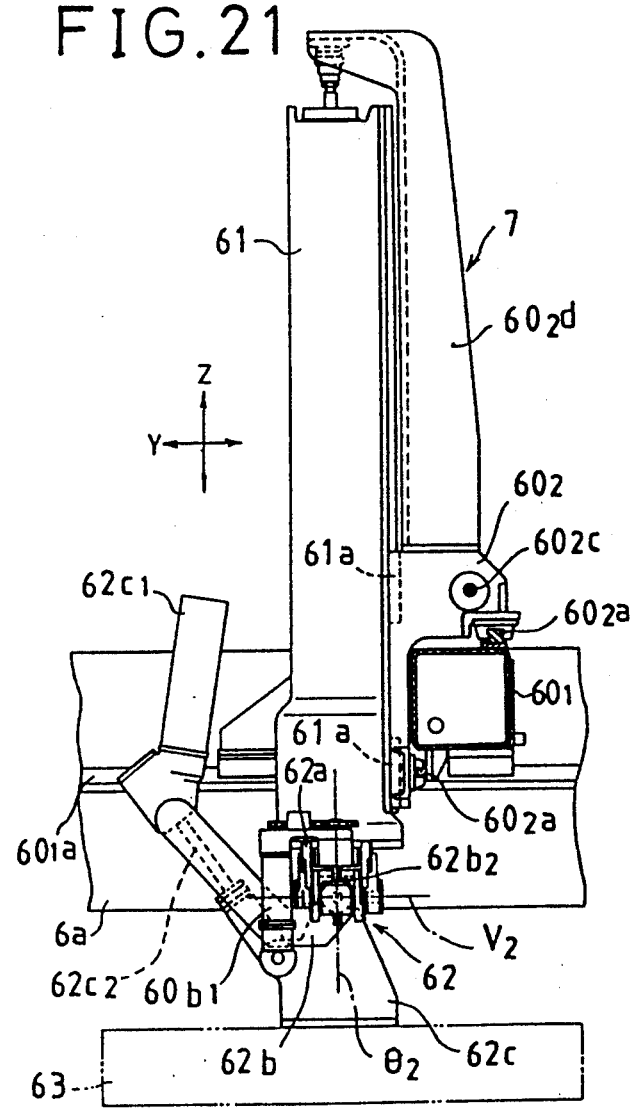
FIG. 21 is a sectional side view taken along the line XXI—XXI of FIG. 19.

The bonnet assembling robot 7 is a 6-axis robot which comprises the structure as shown in FIGS. 19 through 21. A first slide frame $60_1$, spanning the beams 6a, 6a of the overhead frame 6, is movable in the Y-axis direction by an electric motor $60_{1b}$ via a rack-and-pinion mechanism $60_{1c}$, along guide rails $60_{1a}$ on each of the beams $6a$. A second slide frame $60_2$ is movable in the X-axis directing an electric motor $60_{2b}$ via a ball thread mechanism $60_{2c}$, along a rail $60_{2a}$ on the first slide frame $60_1$. A lifting column 61 is movable in the Z-axis direction by an electric motor $61b$ via a rack-and-pinion mechanism $61c$ along linear guides $61a$ on front both sides of the second slide frame $60_2$. The lifting column 6 has an internally inserted balance cylinder $61d$ having a piston rod connected to an upper end of a supporting column $60_{2d}$ which is vertically provided on the second slide frame $60_2$. A wrist portion 62 or three-axis construction is provided at a lower end of the lifting column 61. The wrist portion 62 has the same basic construction as that of the above-mentioned wrist portion 22. The wrist portion 62 comprises: a wrist main body $62a$ which is rotatable, relative to the lifting column 61, by an electric motor $62_{a1}$, via a ball thread mechanism $62_{a2}$ about a $\theta_2$ axis which is in parallel with the Z-axis; a swing frame $62b$ which is rotatable relative to the wrist body $62a$ by an electric motor $62_{b1}$ via a ball thread mechanism $62_{b2}$ about a $V_2$ axis which crosses the $\theta_2$ axis at right angles; and a head frame $62c$ which is rotatable relative to the swing frame $62b$ by an electric motor $62_{c1}$ via a ball thread mechanism $62_{c2}$ about a $W_2$ axis which crosses the $V_2$ axis at right angles. The assembling jig 63 for holding the bonnet d is suspended from the head frame $62c$.

Figure 22:
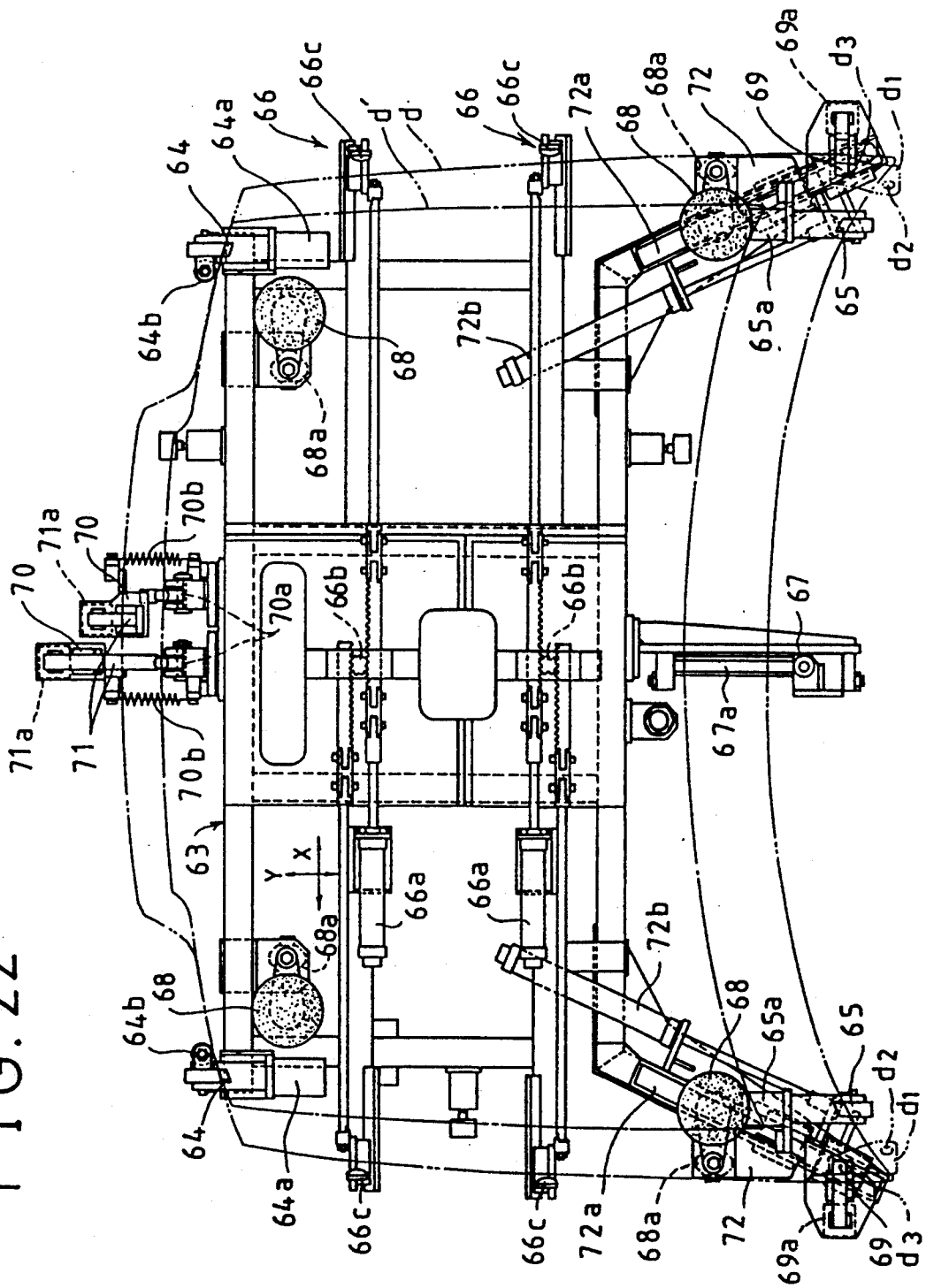
FIG. 22 is a bottom view of an assembling jig for a bonnet.
Figure 23:
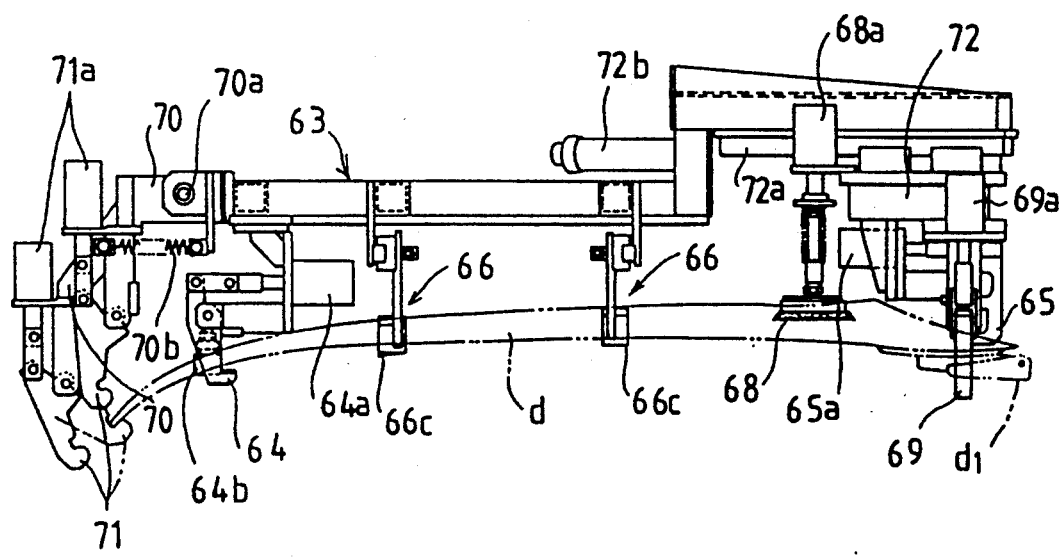
FIG. 23 is a side view thereof as seen in the X-axis direction.

The assembling jig 63 comprises as shown in FIGS. 22 and 23 certain specific structure. A pair of right and left first workpiece receiving members 64 are swung up and down by a cylinder $64a$ for engaging with a front lower surface of the bonnet d and have rollers $64b$ for receiving a front edge of the bonnet d. A pair of right and left second workpiece receiving members 65 are swung up and down by a cylinder $65a$ for engaging with a rear lower surface of the bonnet d. A pair of front and rear first clamping members 66 comprise a pair of right and left clamping pieces $66c, 66c$ which are opened and closed in the X-axis direction by a cylinder $66a$ via a rack-and-pinion mechanism $66b$, so that the clamping pieces $66c$ abut both side edges of the bonnet d. A second roller-shaped clamping member 67 is moved back and forth by a rodless cylinder $67a$ in the Y-axis direction for pressing rear central portion of the bonnet d. A plurality of suction members 68 are lifted and lowered by cylinders $68a$ to suck an external surface, i.e., an upper surface of the bonnet d. A pair of right and left hinge clamping members 69 are swung by cylinders $69a$ to lift hinge brackets $d_1$ on both rear sides of the bonnet d from lower side upwards. The assembling jig 63 further comprises: at its front edge arm pieces 70 which are swingable against springs $70b$ in a direction away from the bonnet d about shafts $70a$ which extend in the X-axis direction; and opener hooks 71 on the arm pieces 70, the hooks being engageable with a central front edge portion of the bonnet d and being operated by cylinders $71a$ on the arm pieces 70 for engaging and disengaging movements. The hooks 71 are provided in a right and left pair in a stepped (or staggered) manner. Further, the second workpiece receiving members 65, the suction members 68 on the rear side portions and the hinge clamping members 69 are mounted on a pair of right and left sliders 72 which are movable back and forth by cylinders $72b$ along guide rails $72a$ on the rear side of the assembling jig 63. In this manner, the assembling jig 63 can cope with the change in model of the motorcar, between the bonnet d as shown in imaginary lines and the bonnet d' as shown in dashed lines.

The tail gate assembling robot 8 is constructed in the same manner as the bonnet assembling robot 7 and, therefore, detailed description thereof is omitted by giving the same numerals as the corresponding constituting parts of the bonnet assembling robot 7. In the tail gate assembling robot 8, an assembling jig 73 for the tail gate, which will be hereinafter described in more detail, is suspended via a wrist portion 62.

Figure 34:
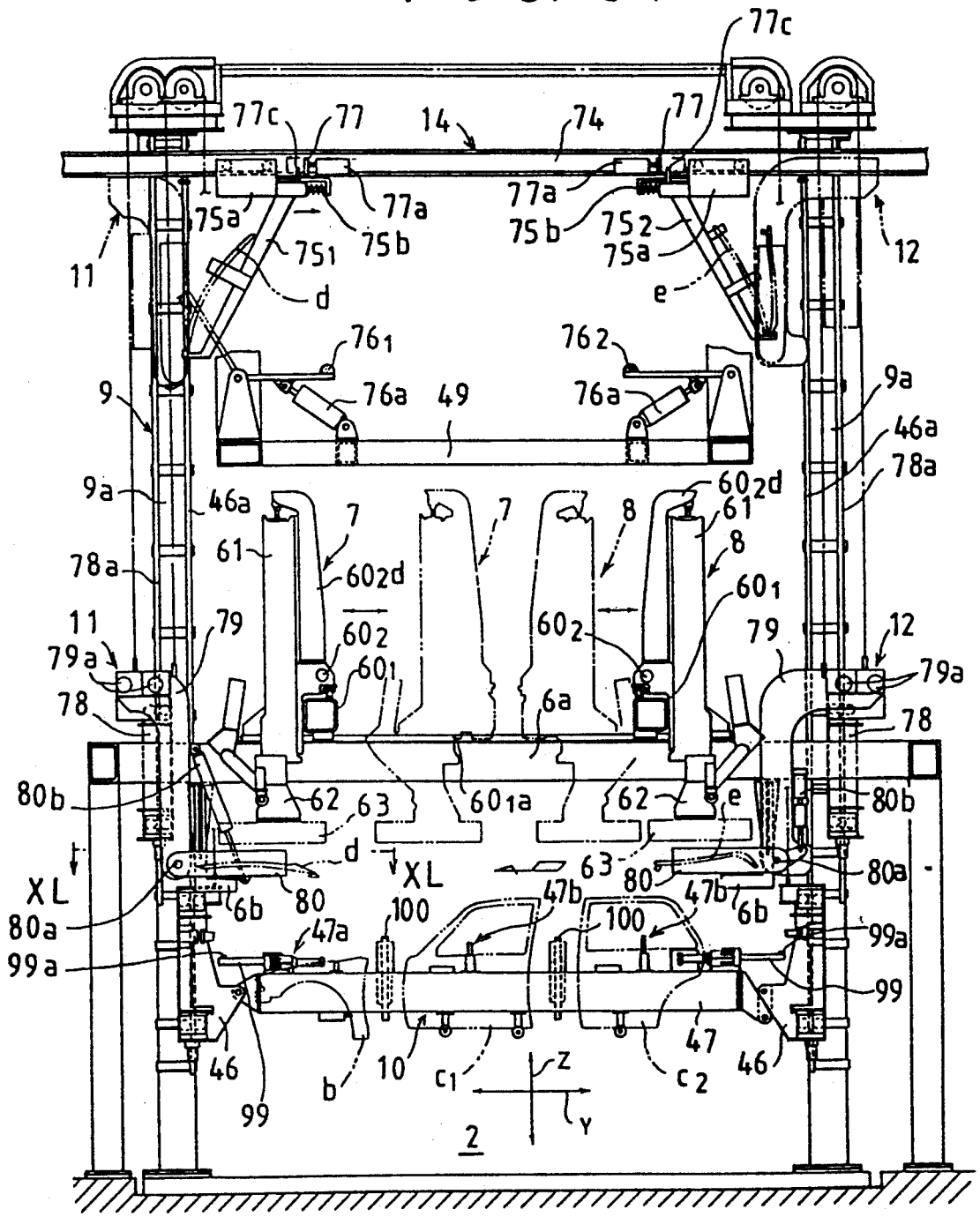

The second hanger conveyor 14 comprises, as shown in FIG. 34: a hanger $75_1$ for the bonnet and a hanger $75_2$ for the tail gate, both being alternately suspended from a conveyor rail 74. In order to improve stability, the bonnet d and the tail gate e are transported in a substantially vertical posture which is slightly inclined from an erected posture. Each of the hangers $75_1$, $75_2$ is temporarily stopped at a respectively predetermined workpiece conveying position above the assembling station 2. The bonnet d and the tail gate e on each of the hangers $75_1$, $75_2$ is erected by a pair of front and rear workpiece erecting members $76_1$, $76_2$ which are erected or laid down by cylinders $76a$ provided on the overhead frame 49 which is suspended from the ceiling portion. They are then received by the second and third drop lifters 11, 12 which are oppositely located outwards of the hangers $75_1$, $75_2$ as seen in the Y-axis direction.

Each of the hangers $75_1$, $75_2$ is supported on a carrier $75a$ which is rotatably suspended from the conveyor rail 74, so as to be slidable in the Y-axis direction (bonnet hanger $75_1$ in the backward direction and tail gate hanger $75_2$ in the forward direction against a spring $75b$). Hanger clearing (escaping) members 77 are provided at the ceiling portion above each of the workpiece sending-in positions, as shown in FIG. 32. Each of the clearing members 77 is rotatable by an actuator $77a$ so as to engage or disengage with a projection $75c$ on the hanger and is movable back and forth in the Y-axis direction. After the workpiece on each of the hangers $75_1$, $75_2$ has been supported by each of the drop lifters 11, 12, each of the drop lifters 11, 12 is slightly lifted so that the workpiece is lifted off from each of the hangers $75_1$, $75_2$. Thereafter, each of the hanger clearing members 77 is engaged with the projection $75c$ in order to pull each of the hangers $75_1$, $75_2$ inwards in the Y-axis direction against the spring $75b$. Under these conditions each of the drop lifters 11, 12 is lowered.

The second drop lifter 11 comprises the structure as shown in FIGS. 32 and 34. A pair of right and left lifting frames 78, 78 are supported on a pair of right and left supporting columns $9a$, $9a$ at a front portion of the apparatus frame 9 for lifting and lowering along guide rails $78a$ provided on the supporting columns $9a$, $9a$. A pair of right and left supporting frames 79, 79 are vertically provided on both of the lifting frames 78, 78 via horizontal bars $79a$ at a respective upper end thereof. A reversing jig 80 is rotatably supported between the supporting frames 79, 79 so as to be raised or laid down by a cylinder $80b$ about shafts $80a$ on both sides of the bottom thereof. The lateral width of the space between the supporting frames 79, 79 is made to be smaller than the lateral width between the beams $6a$, $6a$ on both sides of the overhead frame 6. Thus, the reversing jig 80 is lifted and lowered between the workpiece receiving position which is on the same level as that of the workpiece conveying position, and the workpiece handing-over position below the overhead frame 6. At the workpiece receiving position, the bonnet d is received in a vertical posture from the hanger 75₁ to the reversing jig 80 which is in a raised posture. At the workpiece handing-over position, the reversing jig 80 is laid down to change the posture of the bonnet d into a horizontal one. The assembling jig 63 which is suspended from the bonnet assembling robot 7 mounted on the overhead frame 6 is moved to a position right above the reversing jig 80 in the horizontal posture so that the bonnet d can be received by the assembling jig 63. Reversing stoppers 6b for the reversing jigs 80 are provided below the beams 6a of the overhead frame 6.

Figure 40:
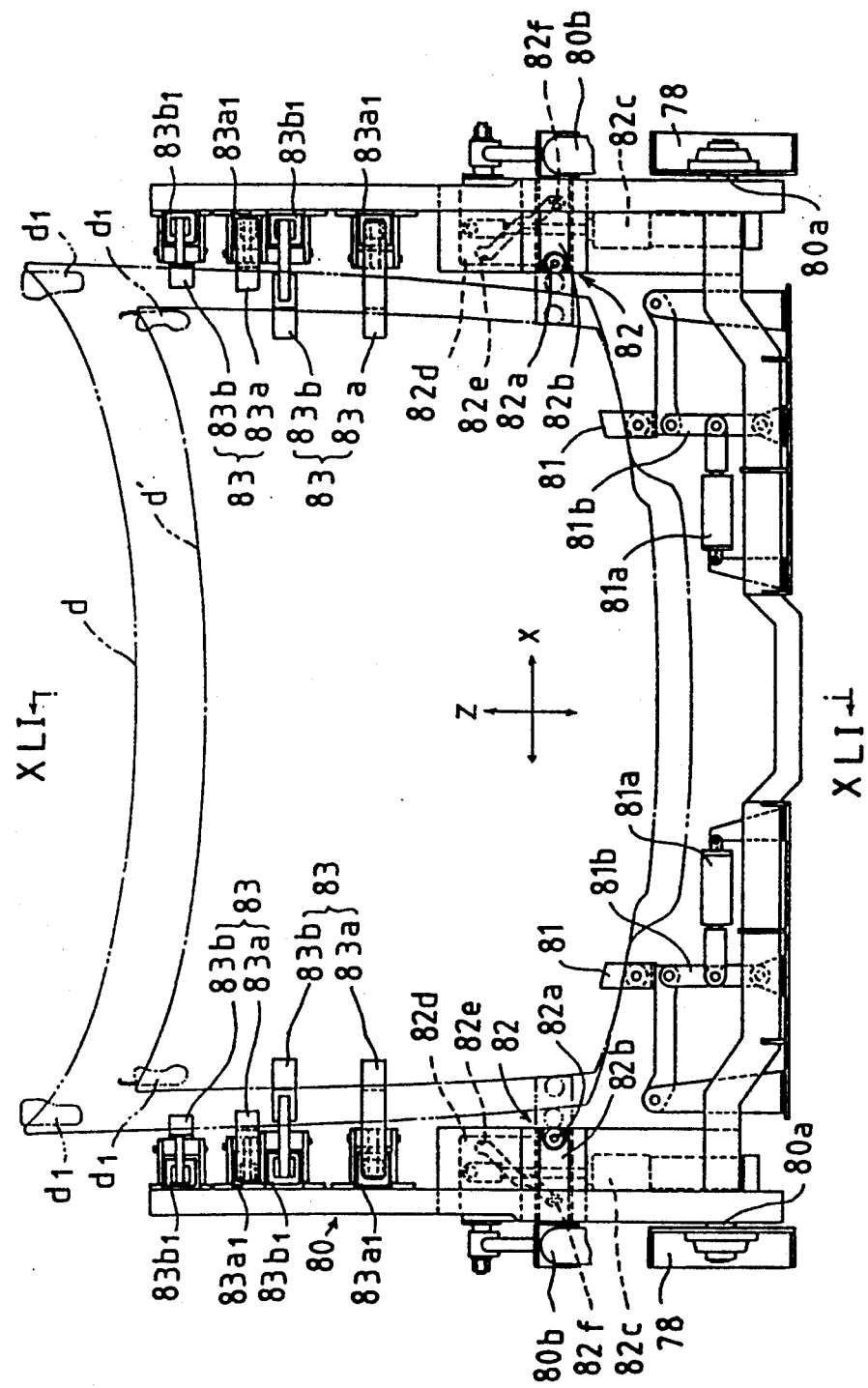
FIG. 40 is a plan view of a reversing jig of a second drop lifter taken along the line XL—XL of FIG. 34.
Figure 41:
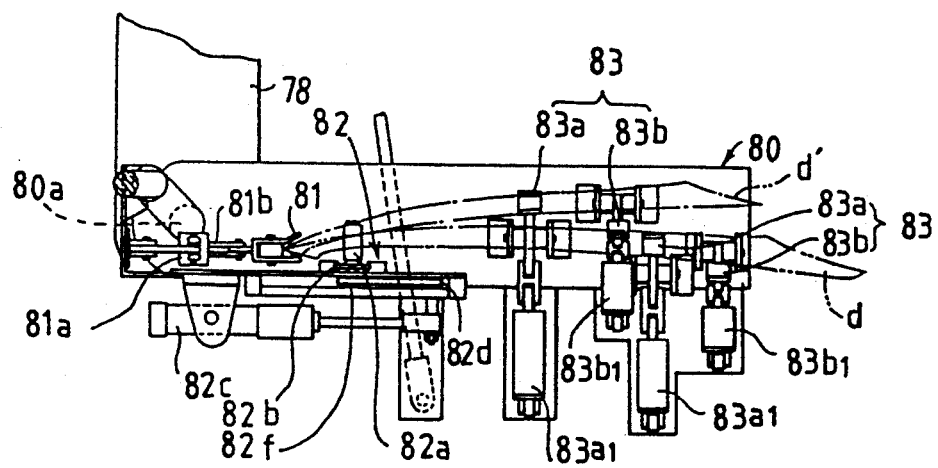
FIG. 41 is a sectional side view taken along the line XLI—XLI of FIG. 40.

The reversing jig 80 is formed in a substantially U shape such that an opening thereof faces towards the side of the assembling robot 7, i.e., towards the inward in the Y-axis direction in its laid-down condition, and such that the assembling jig 63 can be accommodated therein. The reversing jig 80 comprises, as shown in FIGS. 40 and 41: a pair of right and left workpiece receiving members 81 which receive a front edge (lower edge in a vertical posture) of the bonnet d; a pair of right and left clamping members 82 for clamping the bonnet d in the X-axis direction; and right and left second clamping members 83 comprising front-side clamping pieces 83a and rear-side clamping pieces 83b, both clamping the side edges of the bonnet d by respective cylinders 83a₁, 83b₁ from front and rear sides thereof. In this manner, the bonnet d is made to be stably supported by the reversing jig 80 even during the reversing operation.

The workpiece receiving members 81 are made to be raised and laid down in the X-axis direction by cylinders 81a via toggle links 81b so that they can be released from the bonnet d after the workpiece (bonnet) has been handed over to the assembling jig 63. The first clamping members 82 include sliders 82b which are slidable in the X-axis direction and have embedded therein clamping pins 82a which abut the side edges of the bonnet d, and cam plates 82d which are moved at right angles against the sliders 82b by a cylinder 82c. The sliders 82b are engaged with cam grooves 82e in the cam plates 82d via pins 82f on the rear surface thereof. In this manner, by the movement of the cam plates 82d, the sliders 82b, in other words, the clamping pins 82a can be moved forwards from the releasing position outward in the X-axis direction to the clamping position inward in the X-axis direction. In order to cope with the change in models between the bonnet d as shown in FIG. 40 in imaginary lines and the bonnet d' as shown in dashed lines, the cam grooves 82e are provided at their intermediate positions with stepped portions to enable the clamping positions to be changed over in two steps. In addition, the second clamping members 83 are provided in two sets to cope with the change in models.

The workpiece receiving members 81, first clamping members 82, and second clamping members 83 are, needless to say, arranged such that they do not interfere with aforementioned members in the assembling jig 63.

In handing over the workpiece to the assembling jig 63, the assembling jig 63 is moved to a position right above the reversing jig 80 in its laid down posture. The first workpiece receiving members 64 and the second workpiece receiving members 65 of the assembling jig 63 are first operated to support front and rear edges of the bonnet d. Under these conditions, the workpiece receiving member 81 and the first clamping member 82 of the reversing jig 80 are released from the bonnet d and also each of the clamping pieces 83a, 83b of the clamping member 83 is opened. The reversing jig 80 is erected and lifted to the workpiece receiving position, thus preparing for the next transferring of the workpiece. Here, since the reversing jig 80 is formed in a U shape, even if the reversing jig 80 is erected without being retracted (cleared) of the assembling jig 63 in the Y-axis direction, the reversing jig 80 does not interfere with the assembling jig 63 and the assembling robot 7.

In the assembling jig 63, after the reversing jig 80 has been erected, the second clamping members 67 are operated to press the bonnet d forwards in the Y-axis direction, and the front edge of the bonnet d is made to abut the rollers 64b of the first workpiece receiving members 64, in order to align the bonnet d in the Y-axis direction. Then, after the first clamping member 66, is operated to align the bonnet d in the X-axis direction, the suction members are operated to suck the bonnet d. Further, the hinge clamping members 69 are operated to clamp the hinge brackets d₁, and the opener hook 71 is engaged with a front edge of the bonnet d.

Then, according to correction data, the assembling jig 63 is corrected with respect to the positions in the X- and Y-axis directions as well as to the inclination about the $\theta_2$ and $V_2$ axes. The assembling jig 63 is then lowered to a predetermined setting position which has been corrected according to positional misalignment in the Z-axis direction of the motorcar body a. The bonnet d is then set to the motorcar body a in the horizontal closed posture. Although the hinge clamp members 69 are unclamped right before the assembling jig 63 is lowered to the setting position, the hinge brackets d₁ have, at this position, already been made close enough to the mounting surface of the motorcar body. Therefore, the hinge brackets d₁ will not hang down and the hinge brackets d₁ can securely be overlapped (or folded) when lowered to the setting position.

The hinge bracket d₁ are provided at rear and front ends thereof with mounting holes d₂, d₃ which are larger than the diameter of the fastening bolt. In a condition in which the bonnet d is closed, the mounting holes d₂ on the rear end are arranged to be exposed towards the rear of the rear edge of the bonnet d. The hinge brackets d₁ are fastened, at the mounting holes d₂ on the rear side, to the motorcar body a by nut runners mounted on the fastening robots 16 which are suspended from each side of the beams 6a of the overhead frame 6. Like the above-mentioned nut runners, these nut runners are also constructed such that the socket at the tip thereof is capable of floating. Therefore, even if the mounting holes d₂ are misaligned with respect to the threaded holes on the motorcar, the fastening bolts can be screwed into the threaded holes through the mounting holes d₂.

Then, the first and second workpiece receiving members 64, 65 are unclamped, and the suction members 68 are released from sucking to bring about a condition in which only the opener hook 71 is engaged with the bonnet d. By giving the assembling jig 63 composite motions of a movement in the Y- and Z-axis directions and a rotation about the W₂ axis, the hook 71 is moved along the rotating locus of a front edge of the bonnet d, thus opening the bonnet d.

After the bonnet d has been opened as mentioned above, the front fenders b are assembled to the motorcar body a by the above-mentioned assembling robots 4. The hinge brackets d₁ are then fastened to the motorcar body a at the mounting holes d₃ on the front side, by the third nut runners 32₃ which are mounted on the front fender assembling jig 23. Thereafter, by operating the bonnet assembling jig 63 in the opposite order to that mentioned above, the bonnet d is closed. Then, by releasing the opener hook 71 from the bonnet d, the assembling jig 63 is lifted, thus completing the assembling work of the bonnet d.

Figure 42:
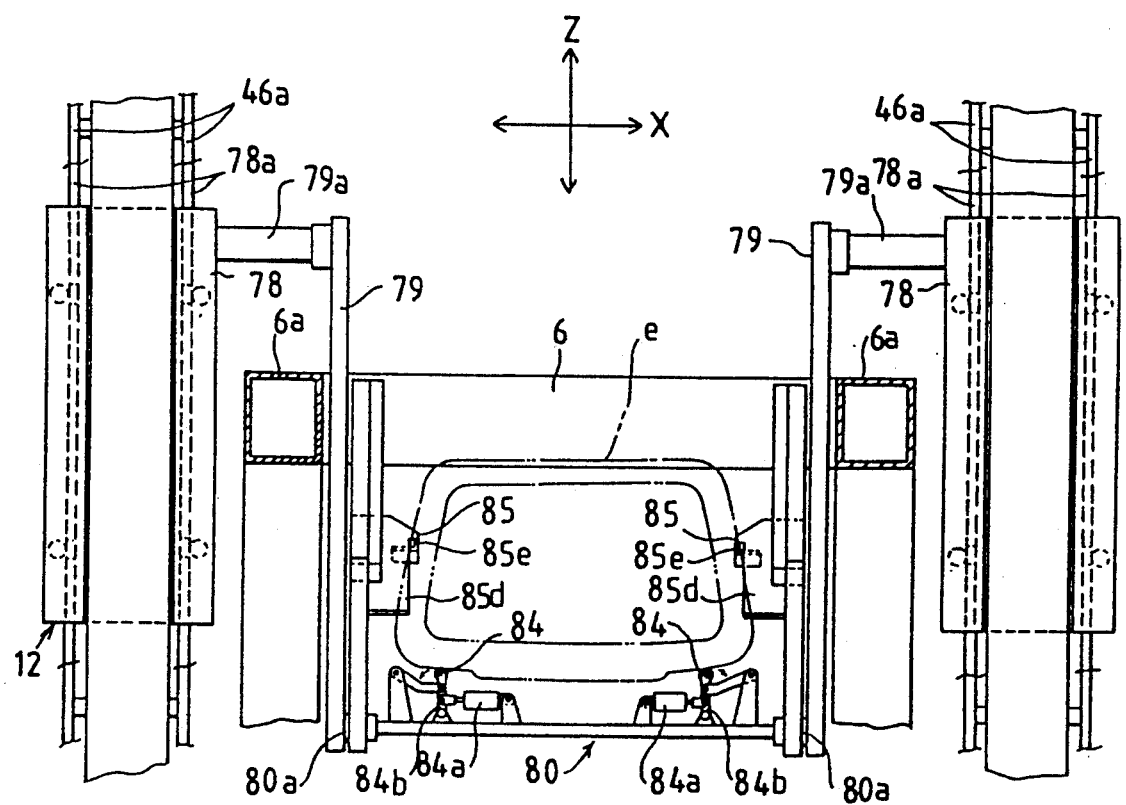
FIG. 42 is a front view of a third drop lifter as seen from the front of the Y-axis direction.
Figure 43:
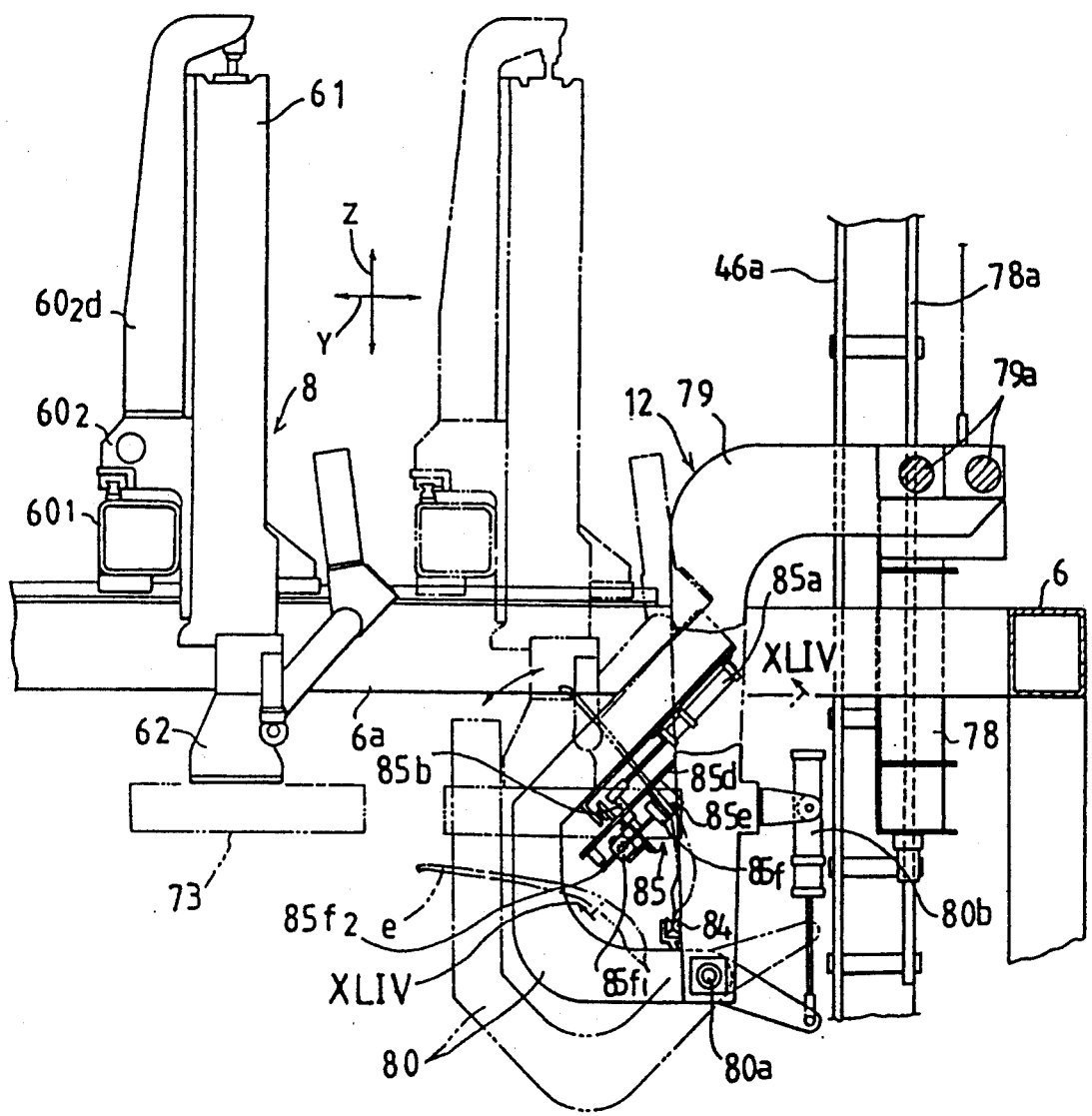
FIG. 43 is a side view thereof as seen from an outer side of the X-axis direction.
Figure 44:
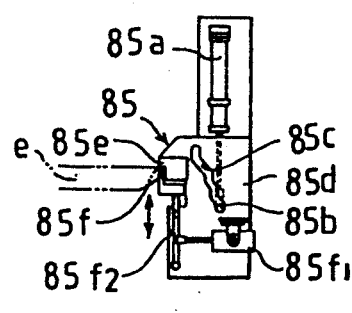
FIG. 44 is a front view of a clamping member to be provided in a reversing jig of the third drop lifter taken along the line XLIV—XLIV of FIG. 43.

The construction of the third drop lifter 12 is as shown in FIGS. 42 and 43. The same numerals are given to the same parts as those of the second drop lifter 11. The difference from the second drop lifter 11 is the workpiece holding means which is mounted on the reversing jig 80. The workpiece holding means is described in more detail hereinbelow. The workpiece reversing jig 80 of the third drop lifter 12 is provided with: a pair of right and left workpiece receiving members 84 which are raised or laid down by cylinders 84a via toggle links 84b so as to receive a bottom external edge of the tail gate e, and a pair of right and left clamping members which clamp side external edges of the tail gate e. Each of the clamping members 85 comprises, as shown in FIGS. 43 and 44: a sliding plate 85d which is moved in the X-axis direction via a cam groove 85c by a pin 85b to be operated in connection with a cylinder 85a; a receiving member 85e which receives an external surface of the side portion of the tail gate e; and a clamping claw 85f which is moved back and forth by a cylinder $85f_1$ via a link mechanism $85f_2$, with both the receiving member 85e and the clamping claw 85f being provided on the sliding plate 85d. The external edge of the side portion of the tail gate e is clamped between the receiving member 85e and the clamping claw 85f by closing the clamping claw 85f after the sliding plate 85d has been moved from its retracted position outward in the X-axis direction to the inward clamping position. In addition, in order to cope with the change in model of the motorcar body, the cam groove 85c is provided with a plurality of stepped portions so that the clamping positions can be changed over.

The reversing jig 80 is lifted to the workpiece receiving position in the raised posture in the same manner as the reversing jig 80 of the second drop lifter 11. After receiving the tail gate e from the hanger $75_2$, the reversing jig 80 is lowered to the workpiece handing-over position below the overhead frame 6. The reversing jig 80 is then laid down as shown by imaginary lines in FIG. 43 to change the tail gate e to a horizontal posture. In this condition, the assembling jig 73 which is suspended from the tail gate assembling robot 8 is moved to a position right above the reversing jig 80 so that the tail gate e can be received by the assembling jig 73.

Figure 24:
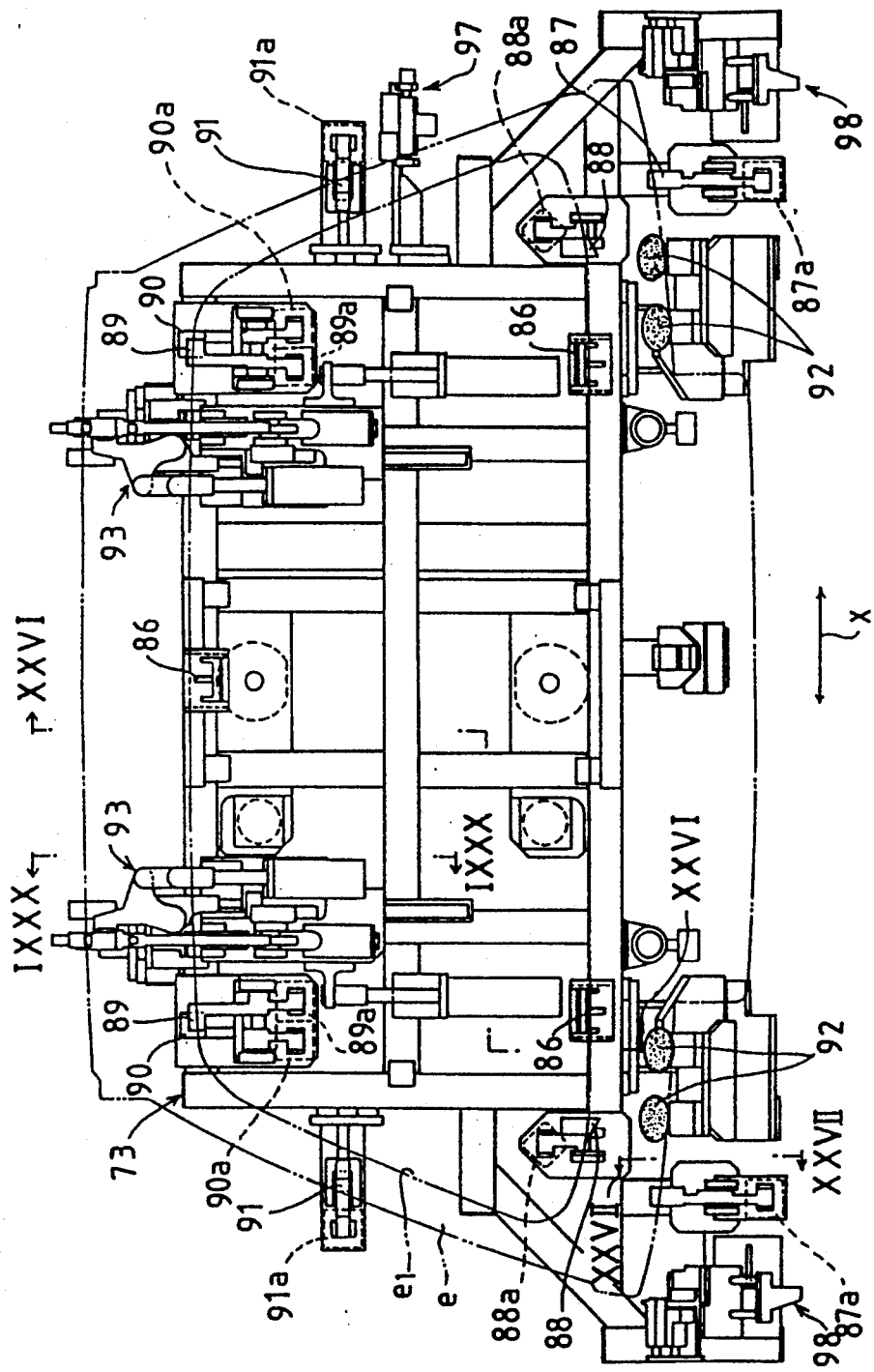
FIG. 24 is a bottom view of an assembling jig of a tail gate.
Figure 25:
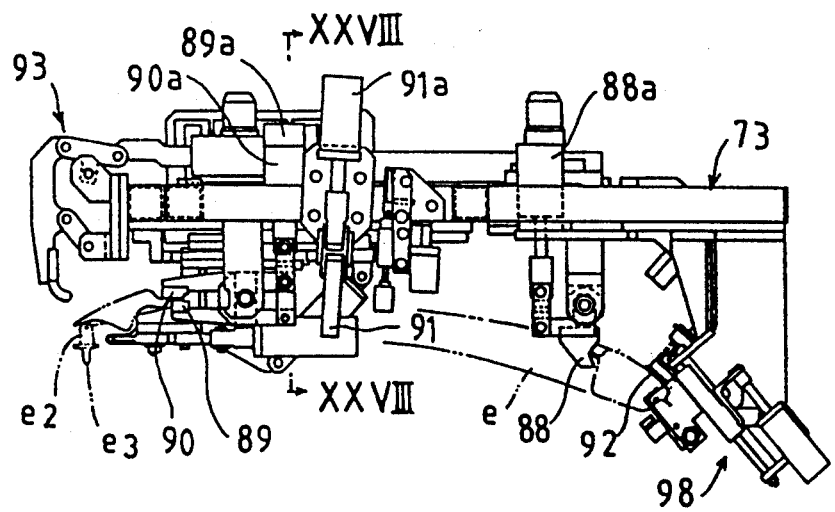
FIG. 25 is a side view thereof as seen in the X-axis direction.
Figure 26:
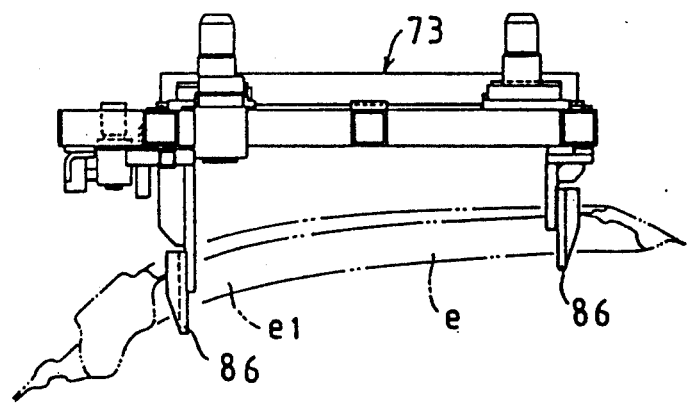
FIGS. 26 and 27 are sectional views taken along the lines XXVI—XXVI and XXVII—XXVII, respectively, of FIG. 24.
Figures 27, 28:
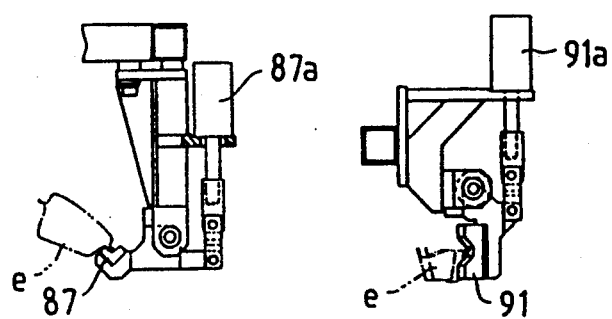
FIG. 28 is a sectional view taken along the line XXVIII—XXVIII of FIG. 25.

The assembling jig 73 comprises, as shown in FIGS. 24 and 25: three rough guides 86 which engage, as shown in FIG. 26, with the tail gate e on an inner edge of a rear window $e_1$ side at upper and lower portions in order to roughly align the tail gate e; a pair of right and left workpiece receiving members 87 which are swung by cylinders 87a in order to engage, as shown in FIG. 27, with a lower external edge along its inner surface; a pair of right and left first clamping members 88 which are swung by cylinders 88a for clamping the tail gate e against the first workpiece receiving member 87 by engaging with a lower inner edge of the tail gate e; a pair of right and left second workpiece receiving members 89 which are swung by cylinders 89a so as to engage with an inner surface of the inner edge side of an upper portion of the tail gate e; a pair of right and left second clamping members 90 which are swung by cylinders 90a to clamp an upper internal edge of the tail gate e against the second workpiece receiving members 89 by engaging an external surface on the inner edge side of an upper portion of the tail gate e; a pair of right and left third clamping members 91 which are swung by cylinders 91a, as shown in FIG. 28, in order to align the tail gate e in the X-axis direction by engaging with an external edge on the side portion of the tail gate e; and a plurality of suction members 92 to suck lower external surface of the tail gate e.

In receiving the tail gate e from the reversing jig 80, the first and second workpiece receiving members 87, 89 are first operated in order to support the tail gate e, at upper inner edge and lower inner edge thereof, by the workpiece receiving members 87, 89. Then, the reversing jig 80 is raised in a condition in which the workpiece receiving members 84 and the clamping members 85 of the reversing jig are released from (cleared of) the tail gate e, and is lifted to be ready for the next workpiece receiving. Thereafter, the third clamping members 91 are operated to align the tail gate e in the X-axis direction. Then, the first clamping members 88, the second clamping members 90 and the suction members 92 are operated in sequence so that the tail gate e is held by the assembling jig 73 in an aligned manner.

Figure 29:
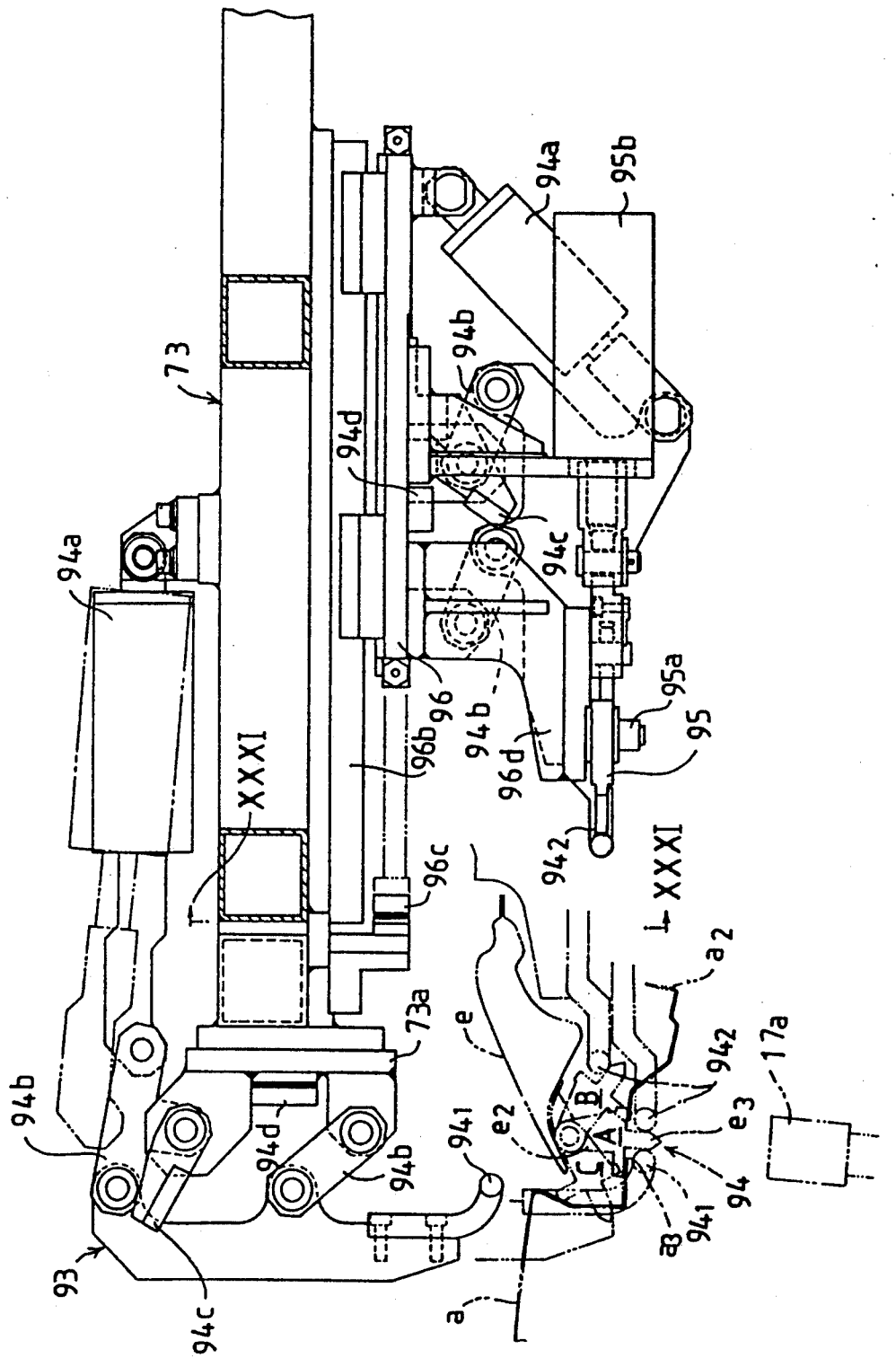
FIG. 29 is an enlarged side view of a hinge positioning means in its unclamped condition.

In the assembling jig 73, a pair of right and left hinge positioning means 93 are provided for correcting a pair of right and left hinge brackets $e_2$ which are hingedly provided on an upper inner surface of the tail gate e, to a predetermined posture and lock them. They are explained hereinafter in more detail by referring to FIGS. 29 through 31. Each of the hinge positioning means 93 comprises: a clamping member 94 for correcting the hinge bracket $e_2$ to a predetermined posture by pinching one of a pair of hinge bolts $e_3$, $e_3$ which are embedded into the hinge bracket $e_2$ in both of a swinging direction of the hinge bracket $e_2$, i.e., from front and rear thereof; and a locking member 95 for locking the hinge bracket $e_2$ in a predetermined posture by engaging with the hinge bracket $e_2$ at right angles to the swinging direction, i.e., from a lateral side thereof. The clamping member 94 comprises: a first clamping member 94, which is provided on a bracket 73a fixed to the assembling jig 73 in order to press the hinge bolt $e_3$ from the front side thereof; and a second clamping piece $94_2$ which is provided on a sliding plate 96 in order to press the hinge bolt $e_3$ from the rear side thereof, the sliding plate 96 being mounted on the assembling jig 73 so as to be movable back and forth by a cylinder 96a along a guide rail 96b. Each of the clamping pieces $94_1$, $94_2$ are arranged to make a circular movement by a cylinder 94a via parallel links 94b. The center of the circular movement of the first clamping piece $94_1$, and the center of the circular movement of the second clamping piece $94_2$ in its an advanced position when the sliding plate 96 is restricted by a stopper 96c, are respectively made to substantially coincide with the axis of the hinge bracket $e_2$. In this manner, by the circular movement of both clamping pieces $94_1$, $94_2$ towards the clamping operation, as shown by imaginary lines in FIG. 29, the hinge bracket $e_2$ in an inclined posture as shown by B or C in the same figure is made to be corrected to a predetermined posture as shown by A in the figure, by means of abutting of each of the clamping pieces $94_1$, $94_2$ with the hinge bolt $e_3$.

Stopper pieces 94c are fixed to the axes of the parallel links 94b of the clamping pieces $94_1$, $94_2$, and stopper bases 94d are provided to stop the stopper pieces 94c.

The locking member 95 is constructed by a plate member which is rotatably supported on a bracket 96d on the lower surface of the sliding plate 96 so as to be swingable by a cylinder 95b in the lateral direction about a shaft 95a. When the locking member 95 is swung in the counterclockwise direction as seen in FIG. 30 at an advanced position of the sliding plate 96, the hinge bracket $e_2$ is caused to be locked in a predetermined posture by being engaged by an engaging portion 95c at an end of the locking member 95 in a lateral direction with the hinge bracket $e_2$ which has been corrected in advance to a predetermined posture by the clamping member 94.

In assembling the tail gate e to the motorcar body a, after the tail gate e is held in a horizontal aligned posture on the assembling jig 73, the sliding plate 96 of the hinge positioning means 93 is moved forwards to operate the clamping member 94 and the locking member 95 in sequence. After the hinge bracket $e_2$ has been locked in a predetermined posture by the locking member 95, the clamping member 94 is unclamped. Then, the assembling jig 73 is lowered while kept in a horizontal posture. While inserting the hinge bolt $e_3$ from an upper side through a mounting hole $a_3$ which is provided in an eave portion $a_2$ of an upper edge of a rear opening of the motorcar body a, the tail gate e is roughly set to the rear opening in a horizontally half opened condition. The mounting hole $a_3$ is formed larger than the diameter of the hinge bolt $e_3$ so that it can be inserted thereinto without accurate alignment. After roughly setting the tail gate e, the locking member 95 is released from the hinge bracket $e_2$. Then, by retracting the sliding plate 96, the hinge positioning means 94 is made to be in a condition as shown by thick lines in FIG. 30. Further, after unclamping the third clamping members 91 of the assembling jig 73, the assembling jig 73 is subjected to a composite operation of inclination about the $W_2$ axis and the movement along the Y- and Z-axis directions. By this operation, the assembling jig 73 is inclined to a predetermined setting posture along the opening and closing locus of the tail gate e about the axis of the hinge bracket e, and the tail gate e is thus closed.

The assembling jig 73 is provided on one side thereof with a first deviation detecting means 97 which is engaged with a side edge of one side of the rear opening in order to detect a deviation in the X-axis direction of the assembling jig 73 relative to the rear opening, and with second deviation detecting means 98, 98 which are engaged with a side lower edges of right and left sides of the rear opening in order to detect the deviation in the Z-axis direction of the assembling jig 73 relative to the rear opening. After the assembling jig 73 has been inclined to the setting posture, the assembling jig 73 is subjected to corrections with respect to the positions in the X- and Z-axis directions and to the inclination about the $V_2$ axis based the deviations in the X-axis direction and in the Z-axis direction detected by these detecting means 97, 98 and of the deviation in inclination about the X-axis obtained from the difference in outputs of the right and left second deviation detecting means 98, 98. By these corrections the tail gate e is set to the rear opening with accurate alignment.

Operating ends of the fastening robots 17 which are suspended from the bases 6a of the overhead frame 6 are advanced into the motorcar cabin through door openings. The nut runners 17a are held in a position right below the mounting hole $a_3$. Then, the nut runners 17a are operated after the positional correction of the assembling jig 73. A nut is screwed from underneath to each hinge bolt $e_3$ which is inserted into the mounting hole $a_3$ for tightening it to fasten the hinge bracket $e_2$ to the eave portion $a_2$. Then, the first and second clamping members 87, 89 of the assembling jig 73 are unclamped and the suction members 92 are released from sucking to release the assembling jig 73 from the tail gate e, thus completing the assembling work of the tail gate e.

The assembling of the doors is performed in a condition in which the fastening robots 17 have been retracted after the completion of the tail gate assembly.

The fasteners such as bolts and nuts for the bonnet- and tail gate assembling robots 16, 17, are supplied to the above-mentioned nut runners through arm-shaped first supplying/receiving heads 99 which are provided in a front and rear pair in the first drop lifter 10, as show in FIG. 33. The first supplying/receiving heads 99 are swingable about a vertical axial line. Further, the first drop lifter 10 is provided with a pair of arm-shaped front and rear second supplying/receiving heads 100, 100 which supply the nut runners of each of the door assembling robots 15 with fasteners such as bolts. The second supplying/receiving heads 100 are rotatable about a horizontal axis. The first drop lifter 10 is once stopped on the way of its lowering, and then each of these supplying/receiving heads 99, 100 is swung to extend outwards in the X-axis direction, as shown in FIG. 32. Fasteners are thus supplied from each of parts feeders 101, 102 which are disposed on a side of the apparatus frame 9 to receiving members 99a, 100a on each of the supplying/ receiving heads 99, 100. Then, the first supplying/receiving heads 99 are swung along the Y-axis direction, and the second supplying/receiving heads 100 are swung downwards so that the fasteners can be received by the nut runners of each of the fastening robots 15, 16, 17 at the lowered position of the first drop lifter 10.

The second drop lifter 12 and the hanger $75_2$ are arranged to serve not only the tail gate e but also a trunk lid. Thus, it is also possible to automatically assemble the trunk lid by changing the assembling jig 73 to the one for the trunk lid. The above has been the description of the assembling apparatus.

The following are a description about correction of the assembling position of each of the above-mentioned exterior parts.

Figure 45:
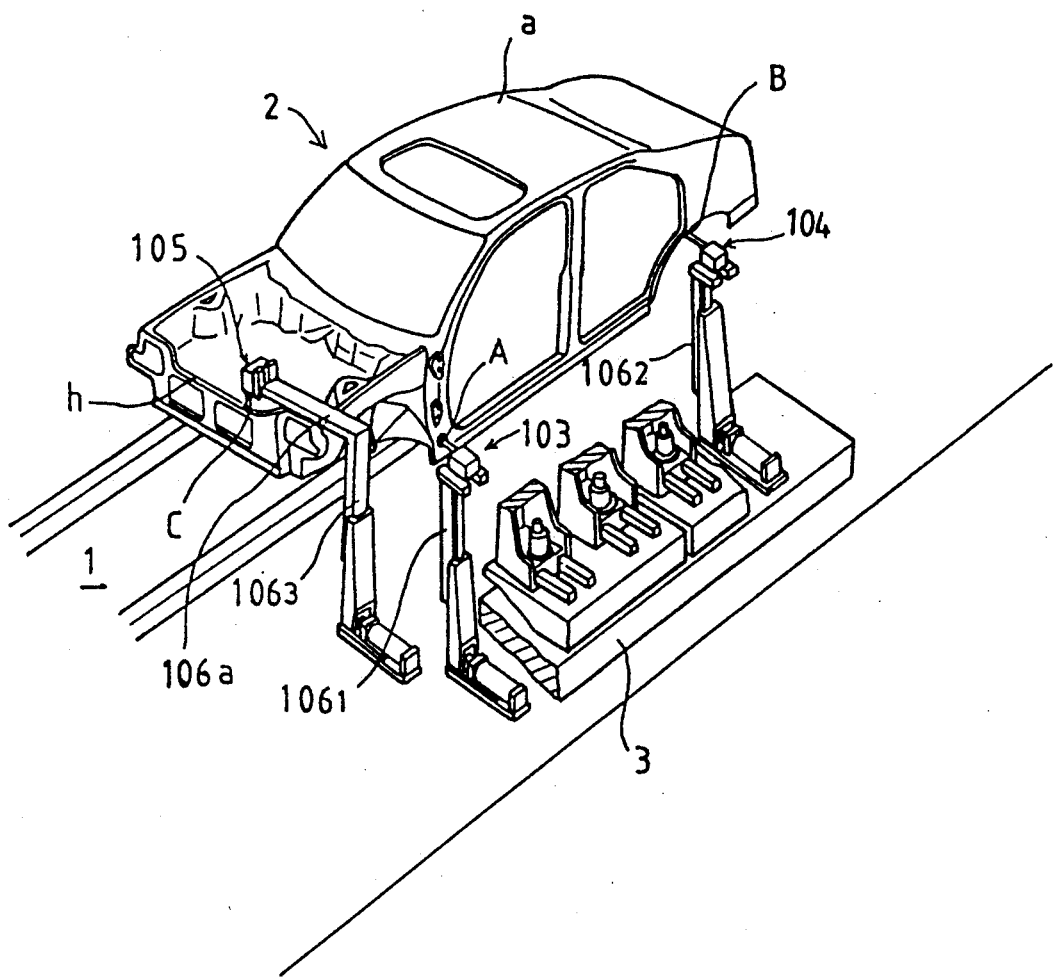
FIG. 45 is a perspective view showing a layout of position sensors for detecting a plurality of reference points in a motorcar body.

At the assembling station there are provided, as shown in FIG. 45: a pair of first position sensors 103 for detecting the position of reference holes A at a lower part of front pillars of the motorcar body a; a pair of second position sensors 104 for detecting the position of the rear wheel arch B; and a third position sensor 105 for detecting a reference hole C on a bulkhead at the front end of a front component h. They are provided on supporting posts $106_1$, $106_2$, $106_3$ which are respectively movable in the horizontal and vertical directions so as to be retractable at the time of assembling the parts.

Figure 46:
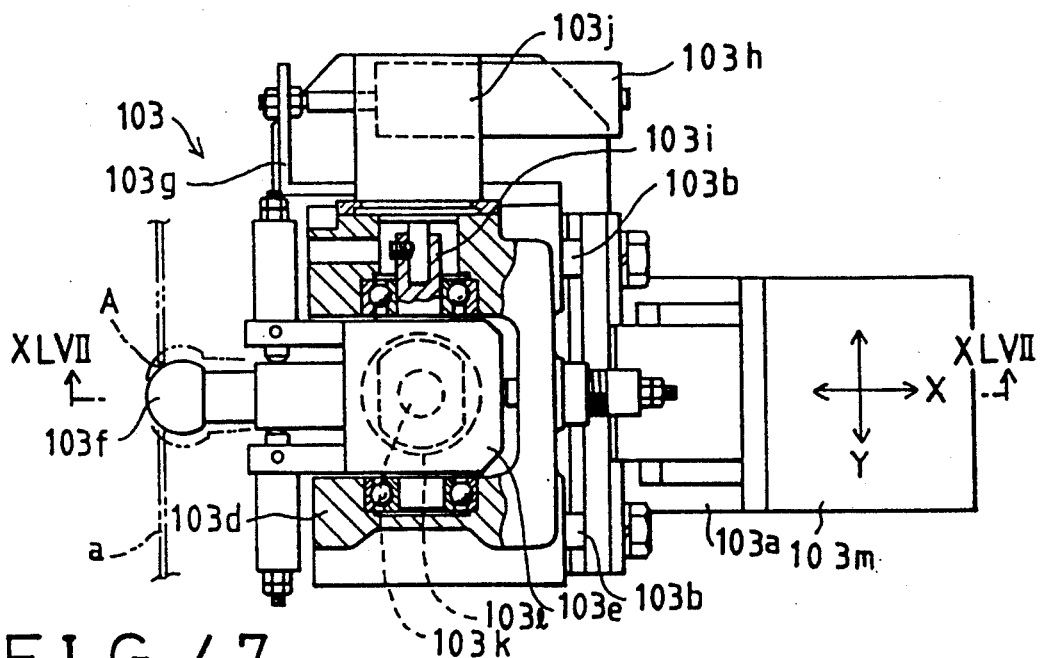
FIG. 46 is a sectional plan view of a first position sensor for detecting the reference hole of a front pillar as a first reference point.
Figure 47:
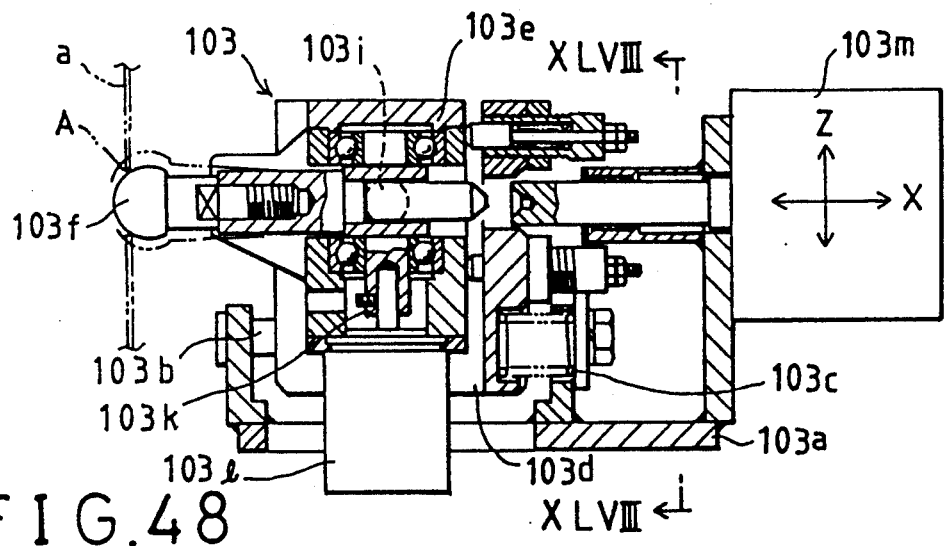
FIG. 47 is a sectional view taken along the line XLVII—XLVII of FIG. 46.
Figure 48:
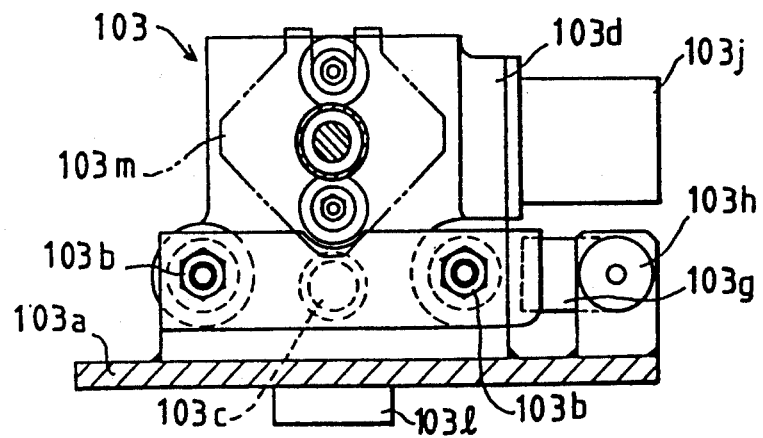
FIG. 48 is a sectional view taken along the line XLVIII—XLVIII of FIG. 47.

The first position sensor 103 comprises, as shown in FIGS. 46 through 48: a base plate 103a which is provided on an upper end of the supporting post $106_1$ so as to be laterally movable back and forth by a cylinder (not shown); and a detecting head 103d which is supported on the base plate 103a via a pair of guide bars 103b so as to be movable in the lateral direction and which is urged laterally inwards by a spring 103c. A rotatable member 103e which is rotatable about the Y-axis direction is rotatably supported by the head 103d. On this rotatable member 103e, there is supported, for free rotation about the Z-axis, a contact element 103f which is engageable with the reference hole A. A first encoder 103h is provided on the base plate 103a and is connected to an arm 103g projectingly provided on the detecting head 103d. A second encoder 103j is provided on the detecting head 103d and is connected to a shaft 103i of the rotatable member 103e. A third encoder 103l is provided on the rotatable member 103e and is connected to a shaft 103k of the contact element 103f. It is thus so arranged that the displacements in the X-, Y- and Z-axis directions of the reference hole A can be detected respectively by the first, second and third encoders 103h, 103j, 103l. A lock cylinder 103m is provided for locking the contact element 103f in a predetermined neutral locked position.

Figure 49:
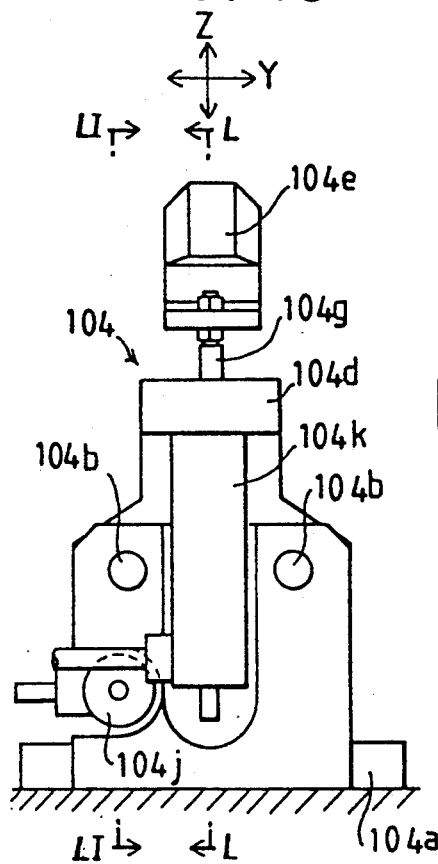
FIG. 49 is a side view, as seen from the inner side of the X-axis direction, of a second position sensor for detecting the position of a rear wheel arch as a second reference point.
Figure 50:
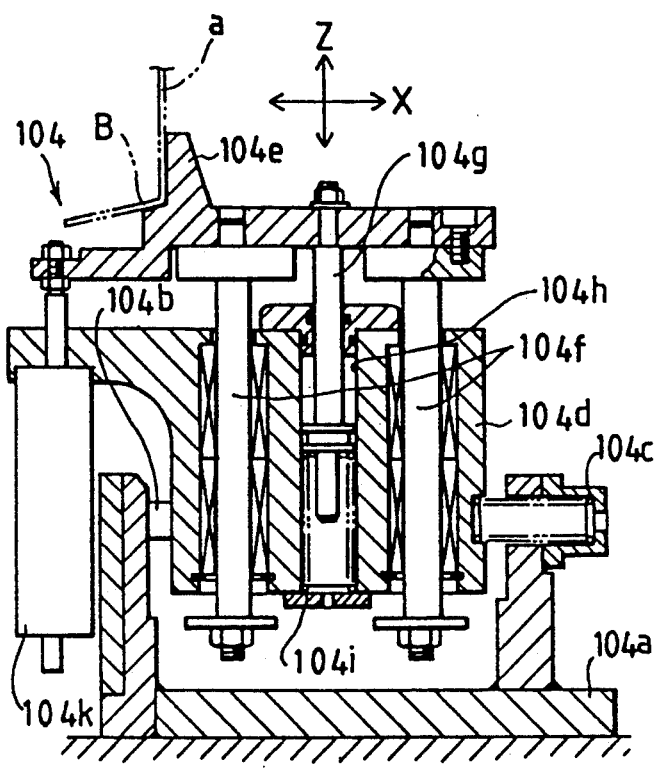
FIGS. 50 and 51 are sectional views taken, respectively, along the line L—L and LI—LI of FIG. 49.
Figure 51:
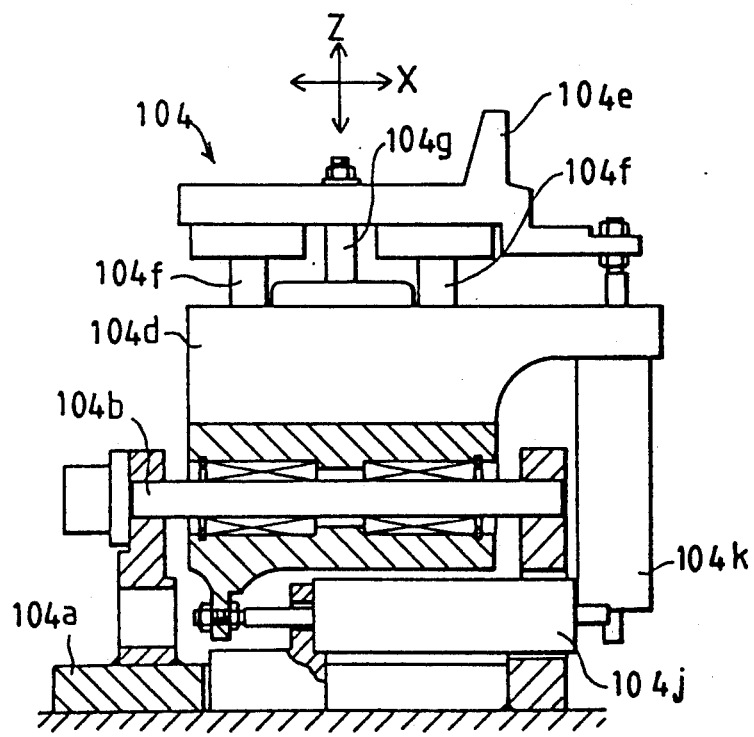

The second position sensor 104 comprises, as shown in FIGS. 49 through 51: a base plate 104a which is provided on an upper end of the supporting post $106_2$ so as to be movable back and forth in the X-axis direction by a cylinder (not shown); and a detecting head 104d which is supported on the base plate 104a via a pair of guide bars 104b so as to be movable in the X-axis direction and which is urged in the lateral inner direction by a spring 104c. A plate-like contact element 104e which engages with the rear wheel arch B is provided on the detecting head 104d so as to be movable up and down via a pair of guide bars 104f, 104f. In the head 104d a cylinder 104h is formed having a piston rod 104g inserted thereinto which is connected to the contact element 104e. Normally, the contact element 104e is held in a lowered position by air pressure supplied to an upper chamber of the cylinder 104h, against a spring 104i which is contained in a lower chamber. By discharging the air from the upper chamber under condition in which the contact element 104e abuts that side surface of the motorcar body which extends from the rear wheel arch B, the contact element 104e is lifted to engage with the rear wheel arch B. The base plate 104a is provided with a first encoder 104j of linear movement type which is connected to the detecting head 104d. The head 104d is provided with a second encoder 104k of linear movement type which is connected to the contact element 104e. In this manner, it is so arranged that the deviations of the rear wheel arch B in the X- and Z-axis directions can be respectively detected by the first and second encoders 104j, 104k.

The third position sensor 105 is provided at a front end of an arm 106a which extends from an upper end of the supporting post $106_3$ over the bulkhead so as to be movable up and down by a cylinder (not shown). The construction is not particularly different from that of the first position sensor. It is so arranged that the swinging in the X-axis direction of a contact element to be engaged with the reference hole C is detected by a rotary type encoder to measure the displacement in the X-axis direction of the reference hole G.

Figure 52:
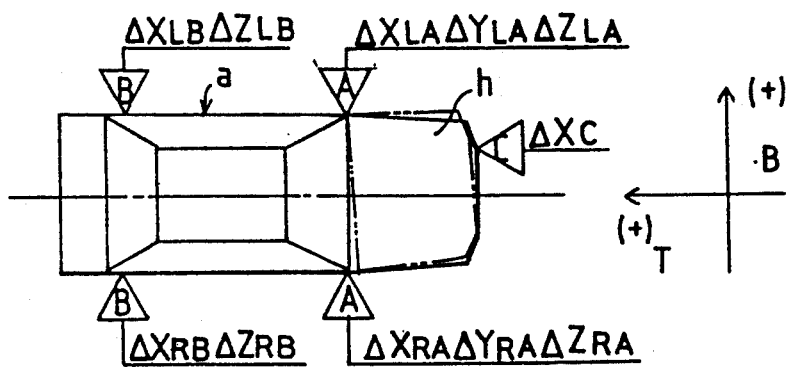
FIG. 52 is a diagram explaining the relationship between each of the reference points of the motorcar body and reference characters of displacements to be detected by each position sensors.

As shown in FIG. 52, when the motorcar body a is conveyed into the assembling station 2, the first position sensors 103 on the right and left sides detect the displacement in the X-axis $\Delta X_{LA}$, $\Delta X_{RA}$, displacement in the Y-axis direction $\Delta Y_{LA}$, $\Delta Y_{RA}$, and displacement in the Z-axis direction $\Delta Z_{LA}$, $\Delta Z_{RA}$, respectively, of the reference holes A in the front pillars. The second position sensors 104 on the right and left sides detect the displacement in the X-axis direction, $\Delta X_{LB}$, $\Delta X_{RB}$, and displacement in the Z-axis direction $\Delta Z_{LB}$, $\Delta Z_{RB}$, respectively, of the rear wheel arch B. The third position sensor 105 detects the displacement in the X-axis direction $\Delta X_c$ of the reference hole C in the bulkhead. Based on these displacement data, the mounting conditions of the front component h with respect to the motorcar body are first calculated in the following procedure.

Figure 53:
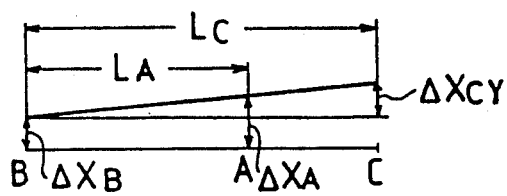
FIG. 53 is a diagram geometrically showing the relationship between lateral displacement values, $\Delta X_A, \Delta X_B$ of the front pillar portion and the rear wheel arch portion, and an estimated displacement value $\Delta X_{CY}$ of the bulkhead portion.

First, the displacement value $\Delta X_A$ in the X-axis direction of the motorcar body a at the front pillar portion is obtained from $\Delta X_{LA}$ and $\Delta X_{RA}$. Also the displacement value $\Delta X_B$ in the X-axis direction of the motorcar body a at the rear wheel arch portion is obtained from $\Delta X_{LB}$ and $\Delta X_{RB}$. An estimated displacement value $\Delta X_{CY}$ of the bulkhead portion when the front component h is correctly assembled such that the center line thereof and the center line of the motorcar body a correspond to each other, is calculated by the following formula according to the relationship as shown in FIG. 53.

$$\Delta X_{CY} = (\Delta X_A - \Delta X_B) L_C / L_A$$

where $L_A$ and $L_C$ are distances in the Y-axis direction of the bulkhead portion and the front pillar portion with respect to the rear wheel arch portion. Their values are determined in advance for each model.

An actual displacement value $\Delta X_{CJ}$ in the X-axis direction of the bulkhead portion is calculated by the following formula:

$$\Delta X_{CJ} = \Delta X_C - \Delta X_B$$

Here, if it is supposed that the positive direction of the X-axis is the direction from the right side to the left side, a relationship $\Delta X_{CJ} > \Delta X_{CY}$ is obtained when, as shown by imaginary lines in FIG. 52, the front component h is inclined towards the left relative to center line of the motorcar body a. A relationship $\Delta X_{CJ} < \Delta X_{CY}$ is obtained when it is inclined to the right side. After obtaining the displacement value $\Delta X_F (= \Delta X_{CJ} - \Delta X_{CY})$ of the front component h relative to the center line of the motorcar body a when $|\Delta X_F| \leq a$, the step can be proceeded to the second step on the assumption that there is no displacement of the front component h relative to the center line of the motorcar body a.

In the second step, relative longitudinal displacements of the right and left side-panels i of the motorcar body a are first checked, and the following calculating operations are performed. These are a first calculating operation in which the assembling positions of a plurality of exterior parts comprising the bonnet d, the right and left front fenders b and the right and left front and rear doors $c_1$ $c_2$, are corrected in the Y-axis direction while maintaining a correlative relationship among these parts to eliminate correlative misalignment among them, and a second calculating operation in which respective assembling positions of these parts are calculated based on the corrected values in the Y-axis direction as obtained in the first calculating operation and on the displacements in the Y-axis and Z-axis directions of the motorcar body a.

Figure 54:
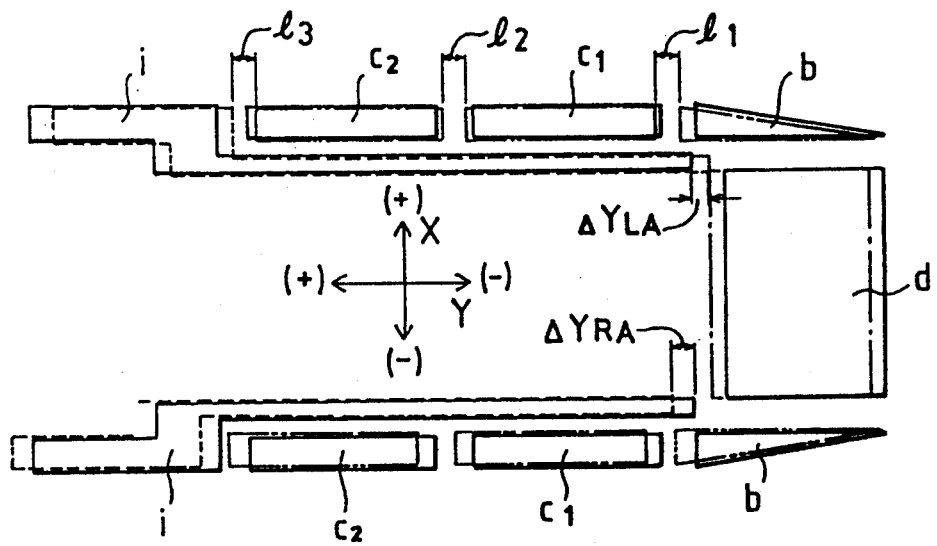
FIG. 54 is a diagram showing corrections of longitudinal positions of each of the parts against relative longitudinal displacements of the left and right side panels.

In FIG. 54, the regularity motorcar body a (i.e., that without assembling accuracy errors) and the assembling position of each of the parts according to teaching data are shown in thick lines, displacements of the right and left side panels i are shown in dotted lines, and assembling positions after correction by the first calculating operation are shown in imaginary lines. The first calculating operation is performed in the following manner on the basis of the rear-side side panel which is displaced further rearwards. It can, however, be performed on the basis of the front-side side panel or on the basis of an intermediate value of the relative longitudinal displacements of the front-side and rear-side side panels.

In an example shown in FIG. 54, the right side-panel is displaced rearwards and the left side-panel is displaced forwards. If the positive direction in the Y-axis direction is set to be the direction from the front towards the rear direction, a relationship $\Delta Y_{RA} > 0$ and $\Delta Y_{LA} < 0$ is obtained. It is therefore judged to be $\Delta Y_{RA} > \Delta Y_{LA}$; in other words, it is judged to be the right side-panel which is in the rear position. Therefore, corrections are performed in which, first, the assembling positions of the bonnet d, the right front fender b and the right front and rear doors $c_1$, $c_2$ are moved backwards by $\Delta Y_{RA}$. Also, a correction is performed in which the assembling position of the left front fender b is moved backwards by $\Delta Y_{RA}$ in order to make flush with each other the front ends of the bonnet d and the left front fender b.

Next, correction values $\Delta Y_{C1}$, $\Delta Y_{C2}$ of the left front door $c_1$ and the rear door $c_2$ are calculated by the following formula by using the displacement value $\Delta Y_{LA}$ in the Y-axis direction of the left side-panel and the displacement value by $\Delta Y_{RA}$ in the Y-axis direction of the left front fender.

$$\Delta Y_{C1} = \tfrac{2}{3}\Delta Y_{RA} + \tfrac{1}{3}\Delta Y_{LA}$$

$$\Delta Y_{C2} = \tfrac{1}{3}\Delta Y_{RA} + \tfrac{2}{3}\Delta Y_{LA}$$

When corrections are made in this manner, as regards the clearance $l_1$ between the left front fender b and the left front door $c_1$, the clearance $l_2$ between the left front door $c_1$ and the left rear door $c_2$, and the clearance $l_3$ between the left rear door $c_2$ and the rear fender portion of the left side panel, the correction values in the Y-axis direction of the respective front-side parts decrease the clearances, and the correction values in the Y-axis direction of the rear-side parts increase the clearance (because the correction values are positive in the rearward displacement). Therefore, the following relationship can be obtained if the proper (predetermined) clearance values are defined as l.

$$l_1 = l - \Delta Y_{RA} + (\tfrac{2}{3}\Delta Y_{RA} + \tfrac{1}{3}\Delta Y_{LA})$$
$$= l - \tfrac{1}{3}\Delta Y_{RA} \tfrac{1}{3}\Delta Y_{LA}$$

$$l_2 = l - (\tfrac{2}{3}\Delta Y_{RA} + \tfrac{1}{3}\Delta Y_{LA}) + (\tfrac{1}{3}\Delta Y_{RA} + \tfrac{2}{3}\Delta Y_{LA})$$
$$= l - \tfrac{1}{3}\Delta Y_{RA} \tfrac{1}{3}\Delta Y_{LA}$$

$$l_3 = l - (\tfrac{1}{3}\Delta Y_{RA} + \tfrac{2}{3}\Delta Y_{LA}) + \Delta Y_{LA})$$
$$= l - \tfrac{1}{3}\Delta Y_{RA} + \tfrac{1}{3}\Delta Y_{LA}$$

Consequently, all the clearances $l_1$, $l_2$, $l_3$ can be made equal.

Figure 55:
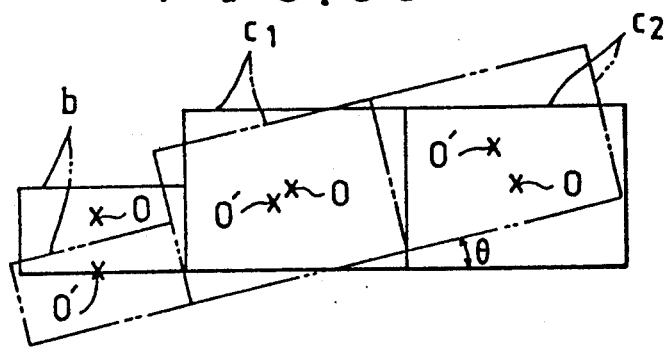
FIG. 55 is a diagram showing inclination corrections relative to the inclination in the vertical direction of the side panels.

In the second calculating operation, a displacement in the Z-axis direction and an inclination in the vertical direction of each of the side panels are obtained from $\Delta Z_{LA}$ and $\Delta Z_{LB}$ as well as $\Delta Z_{RA}$ and $\Delta Z_{RB}$. Corrections are then performed in the Z-axis direction and in the inclination about the X-axis of the assembling positions of each of the right and left doors $c_1$, $c_2$ and the front fender b. As shown in FIG. 55, when each part is tilted as a whole by an angle $\theta$ from a horizontal condition as shown in thick lines to a condition as shown in imaginary lines, the center of each part moves from point 0 to point 0'. A correction in the Z-axis direction is performed in accordance with the inclination correction by the amount of movement in the Z-axis direction between 0 and 0'. Also, the amount of movement in the Y-axis direction between 0 and 0' is added to the amount of correction in the Y-axis direction of each part as obtained in the first calculating operation. In this manner, the final amount of correction in the Y-axis direction of the assembling position of each part is calculated.

Further, corrections of the assembling positions of the bonnet d in the X- and Z-axis directions are made on the basis of $\Delta X_{LA}$ and $\Delta X_{RA}$ as well as $\Delta Z_{LA}$ and $\Delta Z_{RA}$.

When an absolute value of the displacement of the front component h relative to the center line of the motorcar body a exceeds the above-mentioned first allowable value $\alpha$, an indication of "abnormal" is made. However, when the value in question is below a second allowable value $\beta$ which is larger than $\alpha$, i.e., $\alpha < |\Delta X_F| \leq \beta$, in addition to the above-mentioned second-stage correction, corrections in the rotation about the Z-axis of the assembling positions of the bonnet d and the front fenders b are made in accordance with the center line of the front component h as obtained from $\Delta X_{LA}$, $\Delta X_{RA}$ and $\Delta X_C$, as well as the accompanying corrections in the Y-axis direction and the X-axis direction.

Figure 56:
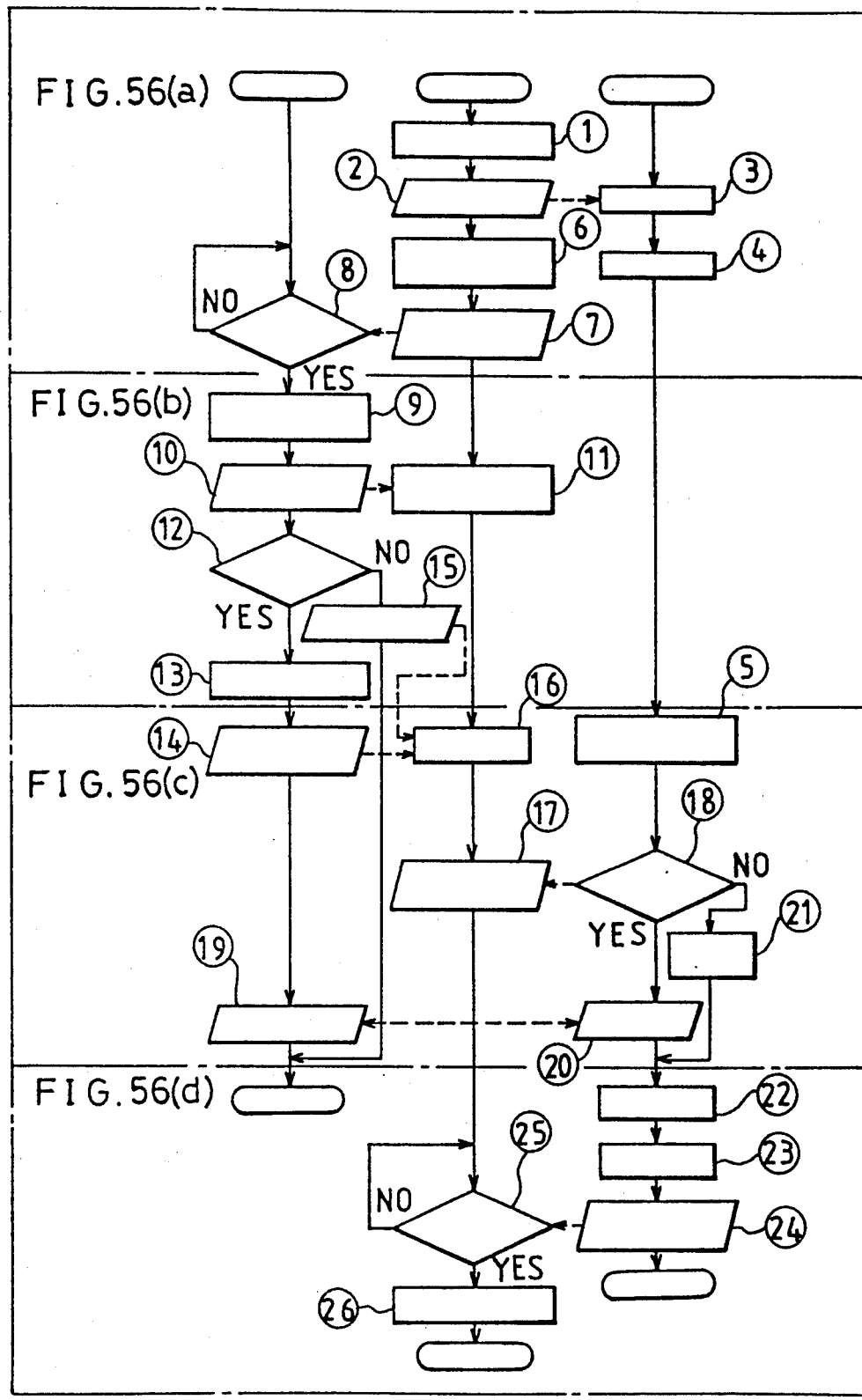
FIG. 56, shown in detail in FIGS. 56 (a) through 56 (d), is a flow chart showing the steps of assembling works of parts.
Figure 56A:
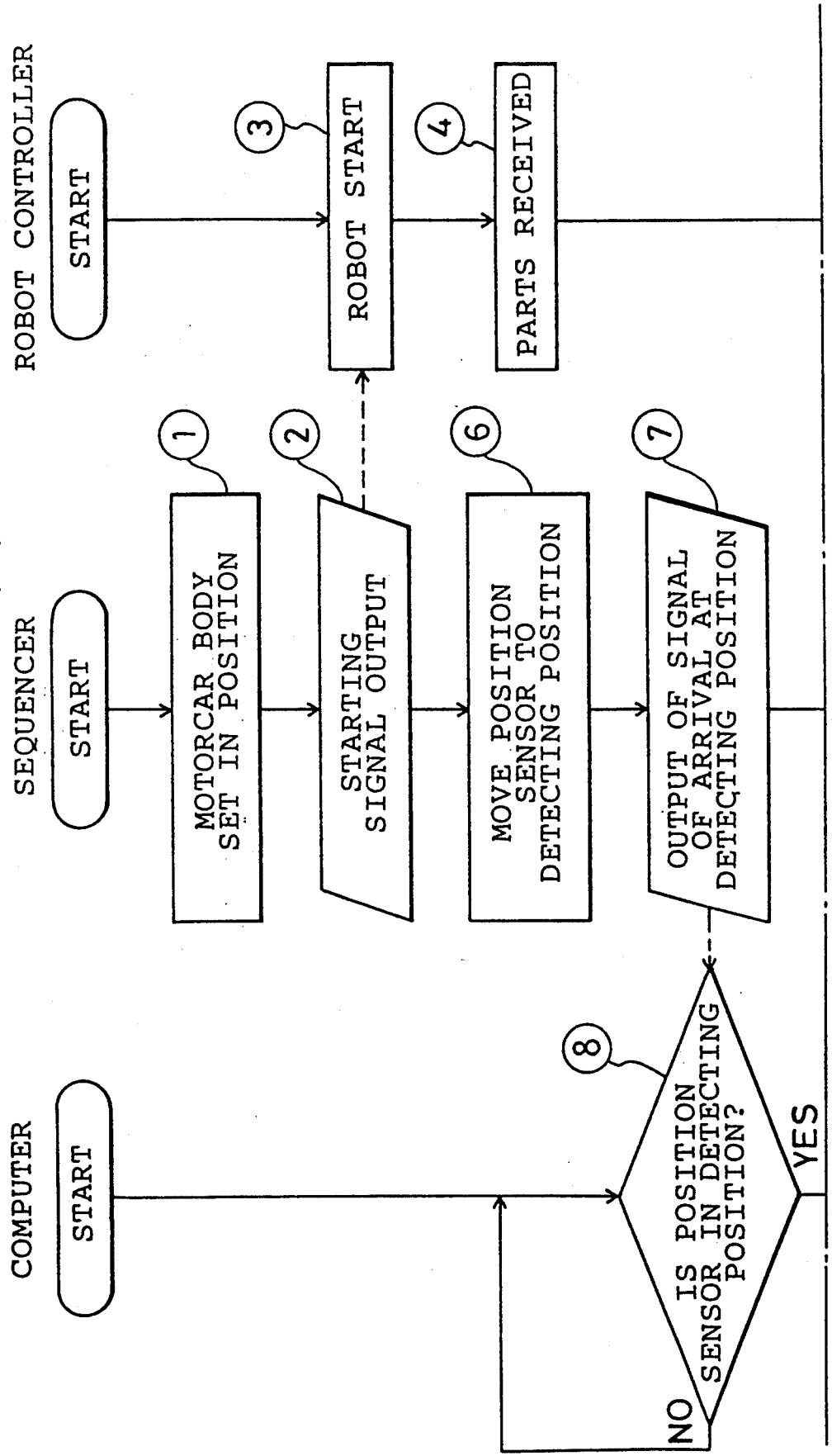
Figure 56C:
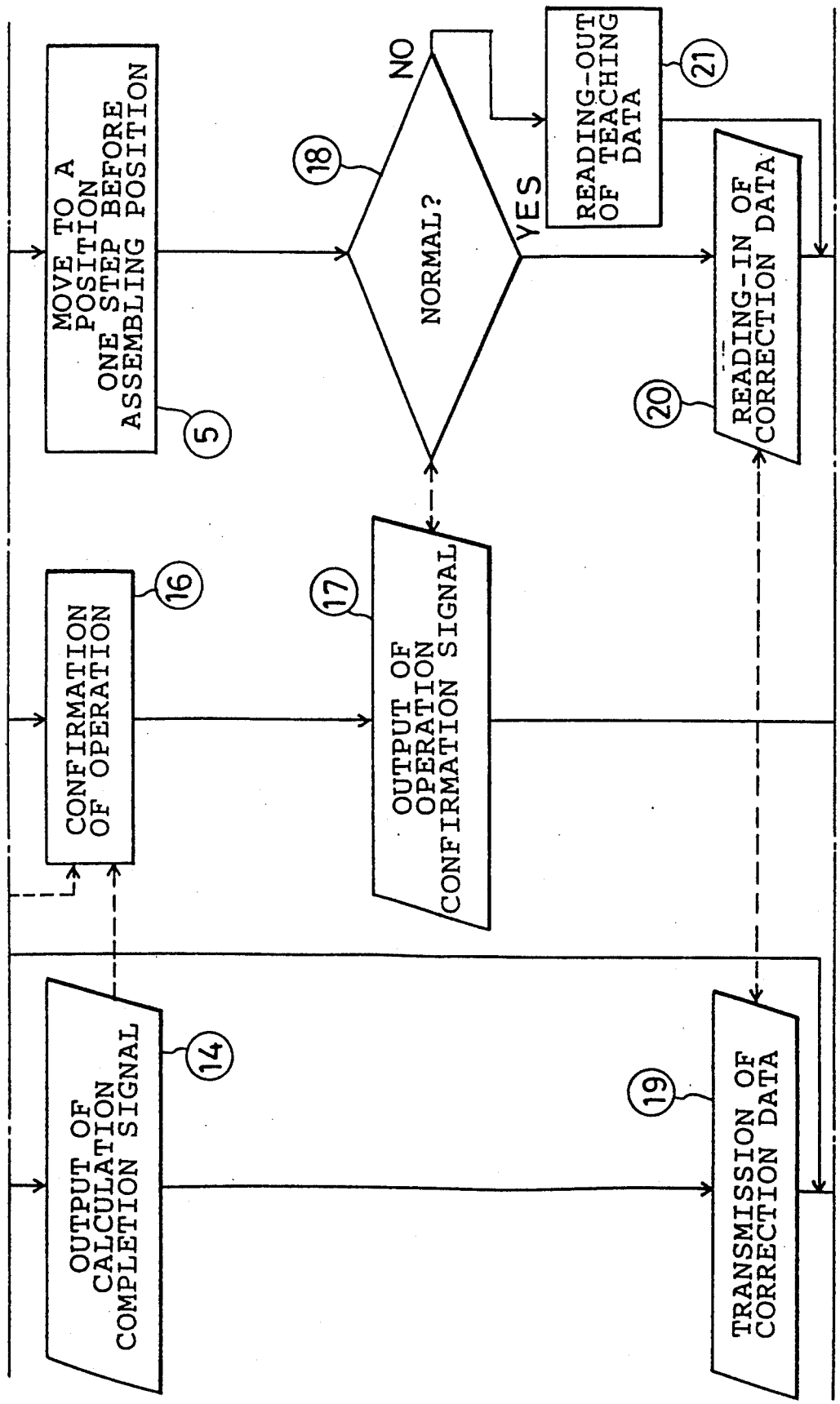
Figure 56D:
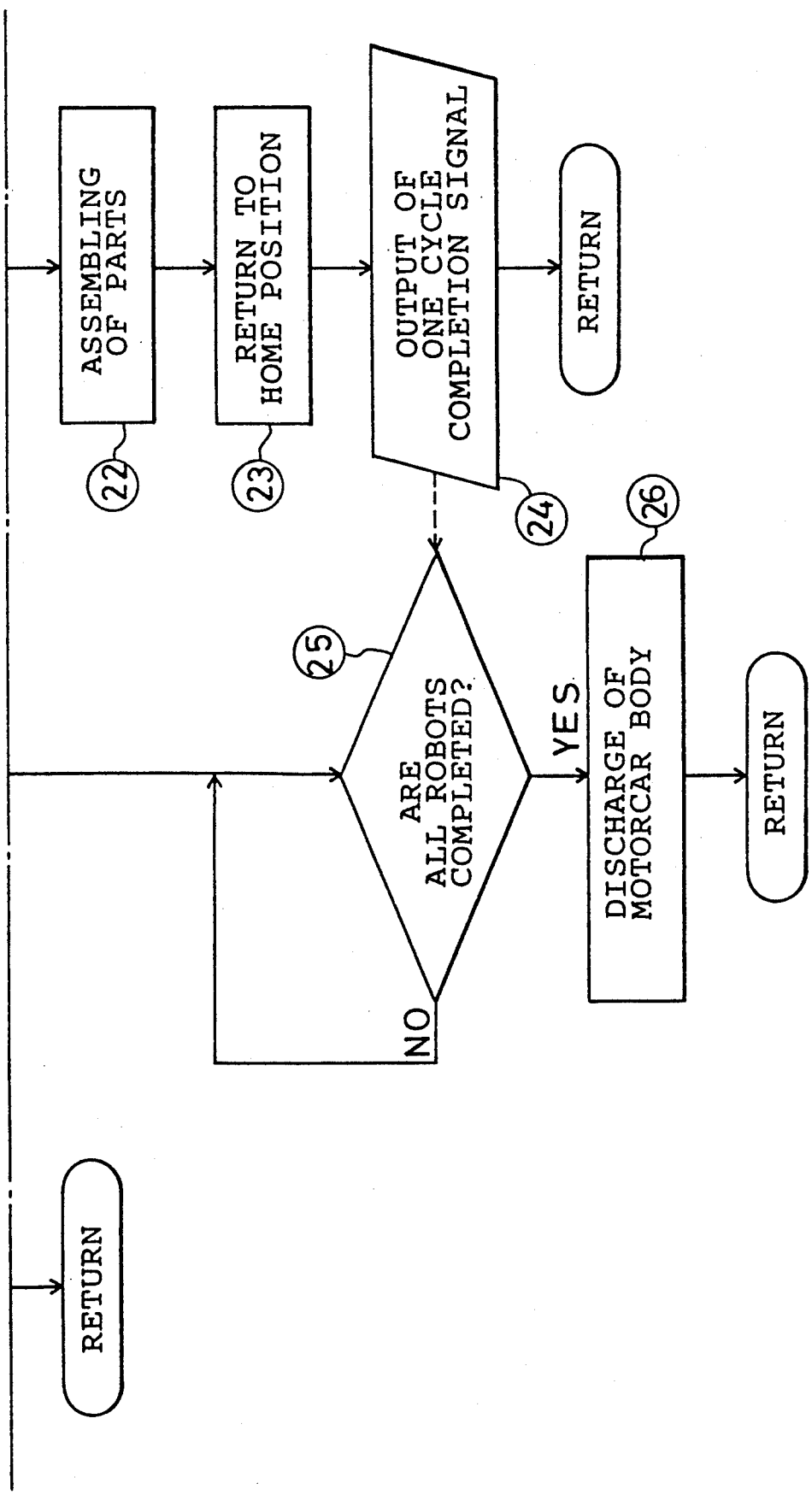

The calculations of the above-mentioned correction data are performed by a computer. By exchanging the signals among this computer, a sequencer and a robot controller for each of the assembling robots, the position detection of the motorcar body a, calculations of correction data and assembling of each of the parts to the motorcar body a are performed in a sequence as shown in FIG. 56.

The sequence is described in detail hereinbelow. When the motorcar body a is conveyed into the assembling station (step 1), a starting signal is transmitted from the sequencer to each of the robot controllers (step 2). According to the teaching data which are inputted into each robot controller, each of the assembling robots is moved to the parts receiving position. Each of the robots receives each part which is supplied by the above-mentioned drop lifter (steps 3, 4). Then, each robot is moved to a position which is one step before the step at which the assembling of the parts to the motorcar body a is performed (step 5).

After the above starting signal has been outputted, each of the above-mentioned position sensors 103, 104, 105 is moved to the detecting position (step 6). When they have reached the detecting positions, arrival signals are outputted from the sequencer to the computer (step 7). After having confirmed the arrival of the position sensors at the detecting positions with these signals (step 8), the computer reads that positional information of each reference point A, B, C of the motorcar body a which has been detected by the position sensors (step 9). When the reading has been completed, a signal of reading completion is transmitted from the computer to the sequencer, and the position sensors are returned to the retracted (clearing) positions (steps 10, 11). In the computer, on the other hand, a check is made whether an extraordinarily abnormal information is contained in the positional information or not in the read positional information to judge whether the position sensors are in good operating order or not (step 12). If the read information is normal, correction data for the assembling positions of each part are calculated as described above (step 13). Then, a signal showing the completion of calculation is transmitted from the computer to the sequencer (step 14). In case the position sensors are judged to be abnormal in the step 12, a signal "abnormal" is transmitted from the computer to the sequencer (step 15). Also, when the computer has become abnormal, a signal "abnormal" is transmitted to the sequencer. The sequencer thus confirms the operations as to whether calculations have been performed normally or not or as to whether the computer has gone abnormal or not (step 16). When each of the assembling robots has reached the position one step before the assembling position, operation confirmation signals showing normality or abnormality are transmitted from the sequencer to the controller of each robot in response to the signal from each robot controller (step 17). Each robot controller judges the normality or abnormality based on the operation confirmation signals (step 18) and, if normal, a signal of reading out the correction data is transmitted from each robot controller to the computer. Then, correction data corresponding to each robot are transmitted from the computer to each robot controller. Those data are: data to be transmitted to the controller for the front fender assembling robot 4 for correcting the assembling position of the front fender b; data to be transmitted to the robot controller for each of the door ($c_1$, $c_2$) assembling robots 5 for correcting the assembling positions of the doors ($c_1$, $c_2$); and data to be transmitted to the robot controller for the bonnet assembling robot 7 for correcting the assembling position of the bonnet d (steps 19, 20). Each of the assembling robots is moved from the position one step before in accordance with the correction data, and each of the parts is assembled to the corrected assembling position (step 22).

On the other hand, when the signals are judged to be abnormal in step 18, those teaching data about the assembling positions of parts which have been inputted into each of the robot controllers are read out (step 21). Each of the assembling robots is moved according to these teaching data to assemble each part to the assembling positions according to the teaching data.

In either case of assembling according to the above-mentioned correction data and assembling according to the teaching data, mounting holes provided in each part may be off the centers of the threaded holes on the motorcar body. Recently, due to an improvement in the positioning accuracy and assembling accuracy of the motorcar body a, the amount of displacement of the threaded holes has become kept within a certain range. Therefore, if the mounting holes g are formed larger, as shown in FIG. 13, to make allowance for this amount of displacement, the threaded hole faces either part of the mounting hole g. Thus, by virtue of the floating operation of the socket of each nut runner, the fastening bolt f can be fastened into the threaded hole through the mounting hole g, as shown above. Although not shown, when abnormality occurs in the transmission of correction data, the parts are assembled also according to the teaching data.

When the assembling has been completed in the above-mentioned manner, each of the assembling robots returns to its original (home) position (step 23) and a signal of work completion is transmitted from each robot controller to the sequencer (step 24). When the work of all the assembling robots has been completed, the motorcar body a is discharged from the assembling station (steps 25, 26).

By the way, the parts assembled during the occurrence of abnormality must be corrected with regard to their positions. Therefore, at the time of occurrence of abnormality, the information to the same effect is transmitted to an outside control apparatus.

When the above-mentioned $\Delta X_F$ exceeds the second allowable value $\beta$, even though no abnormality in the position sensors or the computer has occurred, correction of the assembling positions or assembling of the parts is not performed.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling exterior parts of a motorcar comprising:

assembling robots for assembling exterior side parts to a motorcar body, said assembling robots being disposed on sides of an assembling station in which said motorcar body is stationarily placed;

an overhead frame provided in said assembling station while leaving a space thereunder through which said motorcar body can be conveyed;

an additional assembling robot for assembling lid-like exterior parts, said additional assembling robot being mounted on said overhead frame;

hanger conveyor means for conveying said exterior side parts and said lid-like exterior parts to a position above said overhead frame;

an apparatus frame for drop lifters, said apparatus frame being provided in said assembling station such that it extends upwards above said overhead frame;

drop lifters for said exterior side parts and drop lifters for said lid-like exterior parts, said drop lifters being vertically movably provided on said apparatus frame for respectively transferring said exterior side parts and said lid-like exterior parts from said hanger conveyor means to respective assembling jigs mounted on each of said assembling robots.

2. An apparatus for assembling exterior parts of a motorcar as claimed in claim 1 wherein:

said exterior side parts are front fenders and doors;

said hanger conveyor means for conveying said exterior side parts is constituted by a common hanger conveyor for conveying a front fender and at least one door; and said drop lifter for said exterior side parts is constituted by a common drop lifter for transferring a front fender and a door.

3. An apparatus for assembling exterior parts of a motorcar as claimed in claim 1 wherein:

said hanger conveyor means for conveying said lid-like exterior parts is constituted such that said lid-like exterior parts are conveyed while being maintained in substantially a vertical posture;

each of said drop lifters for said lid-like exterior parts is provided with a reversing jig which, capable of being erected and laid down, holds said lid-like exterior part and reverses it from a vertical posture to a substantially horizontal posture; and each of said assembling robots for said lid-like exterior parts is provided with an assembling jig which holds a lid-like exterior part, said lid-like exterior part being held in a substantially horizontal posture after said reversing jig is laid down at a lowered position of said drop lifter.

4. An apparatus for assembling exterior parts of a motorcar as claimed in claim 3 wherein:

said reversing jig is formed in a U-shaped form such that, in a laid down condition thereof in which said lid-like exterior part is held in a substantially horizontal posture, the opened portion thereof faces towards said assembling robot for said lid-like exterior part, and sized such that said assembling jig can be accommodated therein.

5. An apparatus for assembling exterior parts of a motorcar as claimed in claim 1 wherein:

each of said assembling robots is provided with an assembling jig which holds respective parts, said assembling jig being mounted on a movable frame at an operation end thereof via a wrist portion of three-axis construction;

said wrist portion comprising a wrist main body supported on said movable frame and rotatable about a first axial line; a swing frame supported on said wrist main body and swingable about a second axial line which crosses at right angles to said first axial line; and a head frame supported on said swing frame and swingable about a third axial line which crosses at right angles to said second axial line, said first through third axial lines being so arranged that they cross each other at one point;

a first nut member is mounted on one of said movable frame and said wrist main body, and a first driving source for rotating a first ball thread, which is inserted in a threaded manner into the first nut member, in normal and reverse directions is mounted on the other of said movable frame and said wrist main body, said first nut member and said first driving source being mounted so as to be swingable about an axis which is parallel to said first axial line;

a second nut member is mounted on one of said wrist main body and said swing frame, and a second driving source for rotating a second ball thread, which is inserted in a threaded manner into the second nut member, in normal and reverse directions is mounted on the other of said wrist main body and said second driving source, said second nut member and said second driving source being mounted so as to be swingable about an axis which is parallel to said second axial line; and a third nut member is mounted on one of said swing frame and said head frame, and a third driving source for rotating a third ball thread, which is inserted in a threaded manner into the third nut member, in normal and reverse directions is mounted on the other of said swing frame main body and said head frame, said third nut member and said third driving source being mounted so as to be swingable about an axis which is parallel to said third axial line.

* * * * *